United States Patent
Lavian et al.

(10) Patent No.: US 9,690,877 B1
(45) Date of Patent: Jun. 27, 2017

(54) SYSTEMS AND METHODS FOR ELECTRONIC COMMUNICATIONS

(75) Inventors: Tal Lavian, Sunnyvale, CA (US); Zvi Or-Bach, San Jose, CA (US)

(73) Assignees: Tal Lavian, Sunnyvale, CA (US); Zvi Or-Bach, San Jose, CA (US)

( * ) Notice: Subject to any disclaimer, the term of this patent is extended or adjusted under 35 U.S.C. 154(b) by 19 days.

(21) Appl. No.: 13/310,696

(22) Filed: Dec. 2, 2011

Related U.S. Application Data

(63) Continuation-in-part of application No. 13/245,804, filed on Sep. 26, 2011, now abandoned, and a continuation-in-part of application No. 13/272,212, filed on Oct. 12, 2011, now abandoned, and a continuation-in-part of application No. 13/273,187, filed on Oct. 13, 2011, now abandoned.

(51) Int. Cl.
 G06F 17/30 (2006.01)
(52) U.S. Cl.
 CPC .. G06F 17/30997 (2013.01); G06F 17/30943 (2013.01)
(58) Field of Classification Search
 None
 See application file for complete search history.

(56) References Cited

U.S. PATENT DOCUMENTS

| | | | |
|---|---|---|---|
| 5,307,456 A * | 4/1994 | MacKay | 715/782 |
| 5,410,326 A * | 4/1995 | Goldstein | 348/734 |
| 6,711,249 B2 * | 3/2004 | Weissman et al. | 379/221.06 |
| 7,009,594 B2 * | 3/2006 | Wang et al. | 345/156 |
| 7,127,305 B1 * | 10/2006 | Palmon | 700/83 |
| 7,318,112 B2 * | 1/2008 | Park | 710/36 |
| 7,636,922 B2 * | 12/2009 | Odins-Lucas et al. | 719/328 |
| 7,703,073 B2 * | 4/2010 | Illowsky et al. | 717/121 |
| 8,250,614 B1 * | 8/2012 | Ellis et al. | 725/87 |
| 2002/0077114 A1 * | 6/2002 | Isham | 455/454 |
| 2002/0087498 A1 * | 7/2002 | Yoshida | 706/45 |
| 2003/0132963 A1 * | 7/2003 | Barker et al. | 345/762 |
| 2003/0149557 A1 * | 8/2003 | Cox et al. | 704/2 |
| 2003/0227568 A1 * | 12/2003 | Stahl et al. | 348/552 |
| 2004/0263475 A1 * | 12/2004 | Wecker et al. | 345/157 |
| 2005/0033707 A1 * | 2/2005 | Ehlers et al. | 705/412 |
| 2006/0190112 A1 * | 8/2006 | Buesgen et al. | 700/97 |
| 2007/0077665 A1 * | 4/2007 | Bump et al. | 438/14 |
| 2007/0276691 A1 * | 11/2007 | Grant | 705/1 |
| 2008/0209348 A1 * | 8/2008 | Grechanik et al. | 715/762 |
| 2008/0319952 A1 * | 12/2008 | Carpenter et al. | 707/3 |
| 2009/0006342 A1 * | 1/2009 | Wong et al. | 707/4 |
| 2009/0063559 A1 * | 3/2009 | Rhodes et al. | 707/104.1 |

(Continued)

*Primary Examiner* — Tyler Torgrimson

(57) ABSTRACT

Embodiments of the invention provide a system for enhancing user interaction with the Internet of Things. The system includes a processor, and a memory coupled to the processor. The memory includes a database having one or more options corresponding to each of the Internet of Things. The memory further includes instructions executable by the processor to share at least one of the one or more options with one or more users of the things. Further, the instructions receive information corresponding to selection of the at least one option by the one or more users. Additionally, the instructions update the database based on the selection of the at least one option by the one or more users. Further, a device for enhancing interaction with the things is also disclosed.

12 Claims, 50 Drawing Sheets

(56) References Cited

U.S. PATENT DOCUMENTS

| | | | |
|---|---|---|---|
| 2009/0300120 A1* | 12/2009 | Schmidt | 709/206 |
| 2010/0274563 A1* | 10/2010 | Malo et al. | 704/270.1 |
| 2011/0071895 A1* | 3/2011 | Masri | 705/14.27 |
| 2011/0083167 A1* | 4/2011 | Carpenter et al. | 726/4 |
| 2011/0136516 A1* | 6/2011 | Ellis | 455/458 |
| 2011/0167452 A1* | 7/2011 | Baumgartner et al. | 725/44 |
| 2011/0238508 A1* | 9/2011 | Koningstein | 705/14.73 |
| 2011/0251992 A1* | 10/2011 | Bethlehem et al. | 707/610 |
| 2011/0271332 A1* | 11/2011 | Jones et al. | 726/7 |
| 2012/0084643 A1* | 4/2012 | Govindan et al. | 715/255 |
| 2012/0110490 A1* | 5/2012 | Keller et al. | 715/771 |
| 2012/0233002 A1* | 9/2012 | Abujbara | 705/15 |

* cited by examiner

SYSTEMS AND METHODS FOR ELECTRONIC COMMUNICATIONS

CROSS REFERENCE TO RELATED APPLICATIONS

This application is a Continuation-In-Part (CIP) of U.S. Non-Provisional application Ser. No. 13/245,804 entitled 'Systems and Methods for Electronic Communications' filed on Sep. 26, 2011 now abandoned, Ser. No. 13/272,212 entitled 'Systems and Methods for Electronic Communications' filed on Oct. 12, 2011 now abandoned, and Ser. No. 13/273,187 entitled 'Systems and Methods for Electronic Communications' filed on Oct. 13, 2011 now abandoned.

FIELD OF THE INVENTION

The present invention is related to electronic communications in a network and more specifically to systems and method for accessing and controlling one or more objects (physical or virtual) such as remote devices and services from a remote location by a user.

BACKGROUND OF THE INVENTION

Electronic devices are frequently used in day to day life. The electronic devices may include television, refrigerator, air conditioners, fans, tube lights, cameras or other electronic equipments such as transmitters, antennas etc. All the electronic devices consume power regularly or at frequent intervals of time. For efficient power consumption, the electronic devices must be controlled or switched ON/OFF.

Appliances such as fans, tube lights or microwave may be controlled by regulating the electrical parameters associated with the appliances. For example, a user may control speed of fan, regulate operating power of the microwave as per requirement. However, it requires physical presence of the user to regulate or switch ON/OFF the appliances. A technique for controlling the appliances by a remote control device is well known. The remote control device may transmit signals for controlling the appliances. For example, the remote control device may simultaneously control air conditioners, fans or cameras as per the requirement. However, the technique is limited by location of the user. Moreover, the technique is incapable of updating the real-time status of the appliances to the user.

Another available technique discloses a smart device for controlling the appliances. The smart device is configured with internet and connected with the appliances. A user connected with the smart device via the internet may control the appliances from a remote location. Moreover, the user may control the appliances by connecting with processing device via communication channel. The processing device may be located nearby to the smart device and may further receive signals from the user to control the appliances. However, the technique requires installation of a smart device and/or processing device for controlling the appliances from a remote location.

Another available technique discloses real-time position monitoring of vehicles. The user may monitor real time coordinates of the vehicles based on the information received from a transmitter located in the vehicle. The user receives the position coordinates from the transmitter via a GPS server 114. However, the user is unable to control or update the positional coordinates of the vehicle as per choice.

In light of the above discussion, systems and methods are desired for providing real-time control of the electronic devices and services from a remote location.

SUMMARY

Embodiments of the invention provide a system for enhancing interaction of a user with objects connected to a network. The system includes a processor, a display screen, and a memory coupled to the processor. The memory comprises a database including a list of two or more objects and instructions executable by the processor to display a menu on the display screen. The menu is associated with at least two independent objects. Further, the two independent objects are produced by at least two independent vendors.

Embodiments of the invention further provide a system for enhancing interaction of a user with objects connected to a network. The system includes a processor, a display screen and a memory coupled to the processor. The memory includes a database comprising a list of one or more objects and instructions executable by the processor to display the objects to the user through the display screen. The menu includes icon which may indicate one object made by a vendor. Further, the icon is substantially different than the one provided by said vendor.

Herein, the objects may include at least one of one or more services and one or more remote devices that may be controlled by the user. Further, a service provider ('vendor') may provide one or more services that may be utilized by the user by managing the corresponding objects.

Further, embodiments of the invention provide a system for enhancing interaction with the Internet of Things. The system includes a processor and a memory coupled to the processor. The memory includes a database including one or more options corresponding to each of the Internet of Things. Further, the memory includes instructions to share at least one of the one or more options with one or more users of the things. Furthermore, the memory includes instructions to receive information corresponding to selection of the at least one option by the one or more users. Additionally, the memory includes instructions to update the database based on the selection of the at least one option by the one or more users. The instructions are executable by the processor.

Here, the one or more users may be referred to users of one or more second devices. In an embodiment, a user of a first device (hereinafter may be referred to as 'first user') may share the one or more options, corresponding to the Internet of things, with the users of the second devices (hereinafter may be referred to as 'the second users'). The one or more options may be shared by defining rights for the second users for enabling them to control the Internet of Things. Further, the one or more options may be shared with the second users to enable them to personalize the one or more options according to their preferences. According to the rights defined by the first user, the second users may perform one or more operations, for controlling the Internet of Things, by selecting at least one option from the one or more options.

Additionally, the one or more options may be shared for a specific time and on the occurrence of a specific event that may be defined by the first user. The second users may modify the shared one or more options as per their preferences. Further, the first user may be enabled to discard such modifications.

Furthermore, embodiments of the invention provide a system for enhancing interaction with the Internet of Things. The system includes a processor and a memory coupled to the processor. The memory includes a database having a visual menu corresponding to the things. Further, the memory includes instructions executable by the processor to share the visual menu with one or more second users of the things. The one or more second users correspond to one or more second devices. Furthermore, the memory includes instructions executable by the processor to translate the visual menu based on one or more preferences of the one or more second users. Additionally, the memory includes Instructions executable by the processor to display the translated visual menu to the second users at the corresponding second devices.

Herein, the visual menu is shared with the one or more second users by defining rights for enabling the second users to perform one or more operations corresponding to the things. The one or more operations being performed by selecting one or more icons present in the visual menu.

Furthermore, embodiments of the invention provide a device for enhancing interaction with the Internet of Things. The device includes a processor and a memory coupled to the processor. The memory includes a database and instructions executable by the processor. The database includes one or more options corresponding to the things. Further, the instructions share at least one of the one or more options with one or more users of the things. Furthermore, instructions receive information corresponding to selection of the at least one option by the one or more users. Additionally, instructions update the database based on the selection of the at least one option by the one or more users.

Herein, the one or more users may be referred to users of one or more second devices. In this embodiment, a user of a first device (hereinafter may be referred to as 'first user') may share the one or more options, corresponding to the Internet of things, with the users of the second devices (hereinafter may be referred to as 'the second users'). The one or more options may be shared by defining rights for the second users for enabling them to control the Internet of Things. Further, the one or more options may be shared with the second users to enable them to personalize the one or more options according to their preferences. Additionally, the memory further includes instructions to receive permission request from the one or more users. The request is received for enabling the one or more users to personalize the at least one option.

Embodiments of the invention provide a method for accessing and controlling remote devices in a network. The method includes accessing a database of visual access menus through a graphical user interface (GUI) at a device. Further, the method includes displaying a visual access menu at the device. The visual access menu may include one or more options. The device may include an Internet of Things application such as a VMThings for displaying the visual access menu at the device. The VMThings also enables a user of the device to control the remote devices. The VMThings may be configured to create an Internet of Things menu including representations of recognizable objects. The objects may be physical objects or virtual objects. The Internet of Things menu may be a menu of identifiable objects (physical or virtual objects) connected in an Internet like structure. The user may control the remote devices irrespective of the location of the remote devices through the visual access menu. The user may select an option from the visual access menu. The method further includes displaying an enhanced visual access menu based on a selection of an option received from the user. The enhanced visual access menu may include one or more device options depending on the selection of the option. The device options are representation corresponding to the remote devices. The method further includes receiving a selection of a device option from the user. The method further includes connecting to a remote device based on the selection of the device option. Further, the method includes controlling the one or more operations of the connected remote device based on the selection of the device option.

Embodiments of the invention provide a method for accessing and controlling services from a remote location. The method includes accessing, by a user of a device, a database of visual access menus through a graphical user interface (GUI) at the device. Further, the method includes displaying a visual access menu at the device. The visual access menu may include one or more options. The device may include an Internet of Things application i.e. a VMThings for displaying the visual access menu at the device. Further, the VMThings may create an Internet of Things menu including one or more identifiable objects connected to each other in an Internet like structure. The VMThings may display visual access menu at the device to enable the user to control the remote services. The method further includes displaying an enhanced visual access menu based on a selection of an option received from the user. The enhanced visual access menu may include one or more service options depending on the selection of the option. The service options are representation corresponding to the services. The method further includes receiving a selection of a service option from the user. The method further includes connecting to a service based on the selection of the service option. Further, the method includes connecting the device to the service. Furthermore, the method includes controlling and displaying information about the service at the device based on the selection of the service option.

Embodiments of the invention also provide a device for accessing and controlling remote devices in a network. The device may include an Internet of Things application i.e. a VMThings configured to enable a user of the device to access a database including visual access menus through a GUI. Further, the VMThings is configured to create an Internet of Things menu including one or more identifiable objects connected in an Internet like structure. The VMThings may display a visual access menu including one or more options at the device. Further, the VMThings may display an enhanced visual access menu at the device based on a selection of an option received from the user. The enhanced visual access menu may include one or more device options depending on the selection of the option. The device options are representation corresponding to the remote devices. The VMThings may further receive a selection of a device option from the user. The VMThings may also connect the device to a remote device based on the selection of the device option. The VMThings may control one or more operations of the connected remote device based on the selection of the device option.

Embodiments of the invention also provide a device for accessing and controlling services in a network from a remote location. The device may include an Internet of Things application such as a VMThings configured to enable a user of the device to access a database including visual access menus through a GUI. The VMThings is also configured to display a visual access menu including one or more options at the device. Further, the VMThings may display an enhanced visual access menu at the device based on a selection of an option received from the user. The enhanced visual access menu may include one or more service options depending on the selection of the option. The service options are representation corresponding to the services located remotely. The VMThings may further receive a selection of a service option from the user. The VMThings may also connect the device to a service based on the selection of the service option. The VMThings may control and display information of the service t the device based on the selection of the service option.

Embodiments of the invention also provide a system for accessing and controlling remote devices. The system includes a display device configured to display one or more visual access menus. Further, the system includes an access device connected to the display device. The access device may include an Internet of Things application i.e. a VMThings configured to display the one or more visual access menus including one or more options to control the remote devices, at the display device. The user may create or configure an Internet of Things menu through a Graphical User Interface at the device. In an embodiment of the invention, the VMThings may be configured to create the Internet of Things menu. The VMThings is further configured to enable a user of the access device to access a database including the visual access menus through a GUI. The VMThings may display an enhanced visual access menu at the device based on a selection of an option received from the user. The enhanced visual access menu may include one or more device options depending on the selection of the option. The device options are representation corresponding to the remote devices. The VMThings may further receive a selection of a device option from the user. The VMThings may also connect the device to a remote device based on the selection of the device option. The VMThings may control one or more operations of the connected remote device based on the selection of the device option.

Embodiments of the invention also provide a system for accessing and controlling services in a network from a remote location. The system may include a display device configured to display one or more visual access menus. Further, the system may include an access device connected to the display device. The access device may include an Internet of Things application i.e. a VMThings configured to display the one or more visual access menus including one or more options to control the remote devices at the display device. The VMThings is further configured to enable a user of the access device to access a database including the visual access menus through a Graphical User Interface (GUI). The GUI may be used for creating an Internet of Things Menu including a plurality of identifiable objects in a network like structure. The identifiable objects may be physical objects or virtual objects. Further, the VMThings may display an enhanced visual access menu at the device based on a selection of the option received from the user. The enhanced visual access menu may include one or more service options depending on the selection of the option. The service options are representation corresponding to the services. The VMThings may further receive a selection of a service option from the user. The VMThings may also connect the device to a remote device based on the selection of the service option. The VMThings may control and display information about the service based on the selection of the service option.

Embodiments of the invention further provide a method for accessing and controlling the remote devices in a network through a web browser. The method includes opening a webpage in the web browser at a device including a VMThings. The method may further include displaying a visual access menu at the device. The VMThings may create or display the visual access menu or an Internet of Things menu at the device. The Internet of Things menu may include a plurality of representations corresponding to identifiable objects. The identifiable objects may be physical objects or virtual objects. The visual access menu may include one or more options. Further, the method includes displaying an enhanced visual access menu at the device based on a selection of an option received from the user. The enhanced visual access menu may include one or more device options depending on the selection of the option. The device options are representation corresponding to the remote devices. The method further includes receiving a selection of a device option from the user. The method further includes connecting to a remote device based on the selection of the device option. Further, the method includes connecting the device to the remote device based on the selection of the device option. Further, the method includes controlling the one or more operations of the connected remote device based on the selection of the device option.

Embodiments of the invention further provide a method for accessing and controlling the services in a network through a web browser. The method includes opening a webpage in the web browser at a device including an Internet of Things application i.e. a VMThings. The VMThings is configured to enable a user of the device to access a database including the visual access menus through a GUI. The method further includes displaying a visual access menu at the device. The VMThings may display the visual access menu at the device. The visual access menu may include one or more options. Further, the method includes displaying an enhanced visual access menu at the device based on a selection of an option received from the user. The enhanced visual access menu may include one or more service options depending on the selection of the option. The service options are representation corresponding to the service. The method further includes receiving a selection of a service option from the user. The method further includes connecting to a service based on the selection of the service option. Further, the method includes connecting the device to the remote device based on the selection of the service option. Further, the method includes controlling and displaying the information of the service based on the selection of the service option.

An aspect of the invention is to enable a user to control one or more operations of the remote devices or services through voice commands or gestures or hand movements. For example, the user may switch on an air conditioner (AC) by showing a thumb up gesture in front of the device. The device may include a camera to detect the gesture. The VMThings at the device (or access device) may analyze the gesture and control a remote device based on the analysis.

An aspect of the invention is to transfer display of a device to another device. The other device may be connected to the device through wireless means.

Another aspect of the invention is to create a data base of visual access menus or enhanced visual access menus. The visual access menus or the enhanced visual access menus are the visual menus for controlling one or more objects such as, but are not limited to, remote devices, services, and so forth.

BRIEF DESCRIPTION OF THE DRAWINGS

Figure 1A:
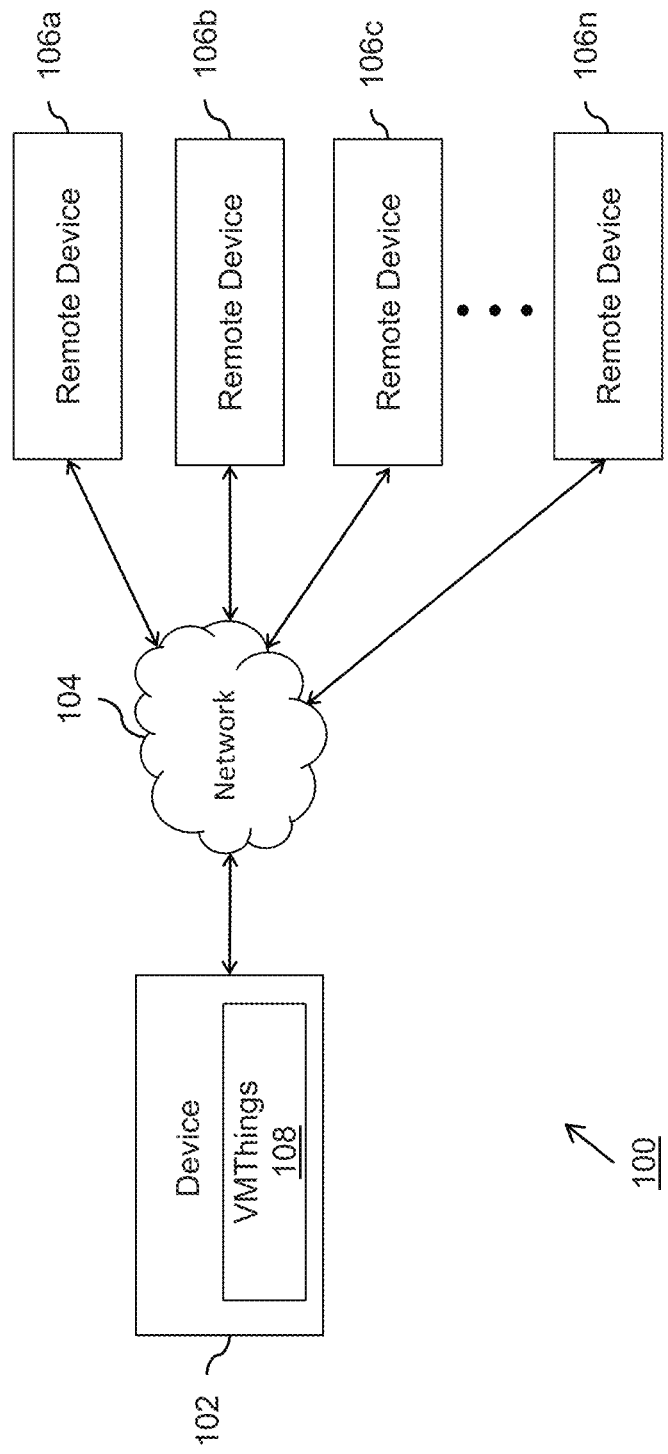
Figure 1B:
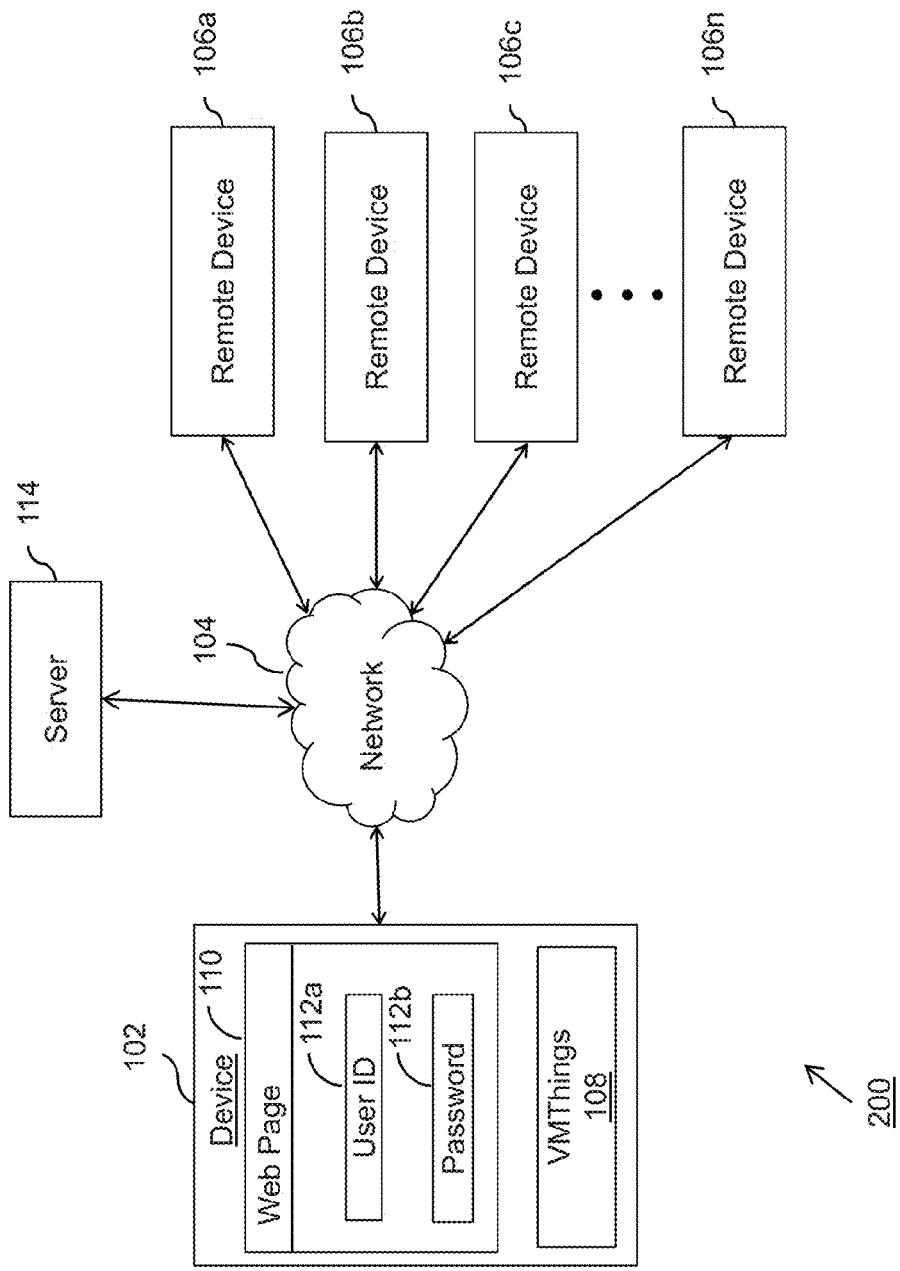
Figure 1C:
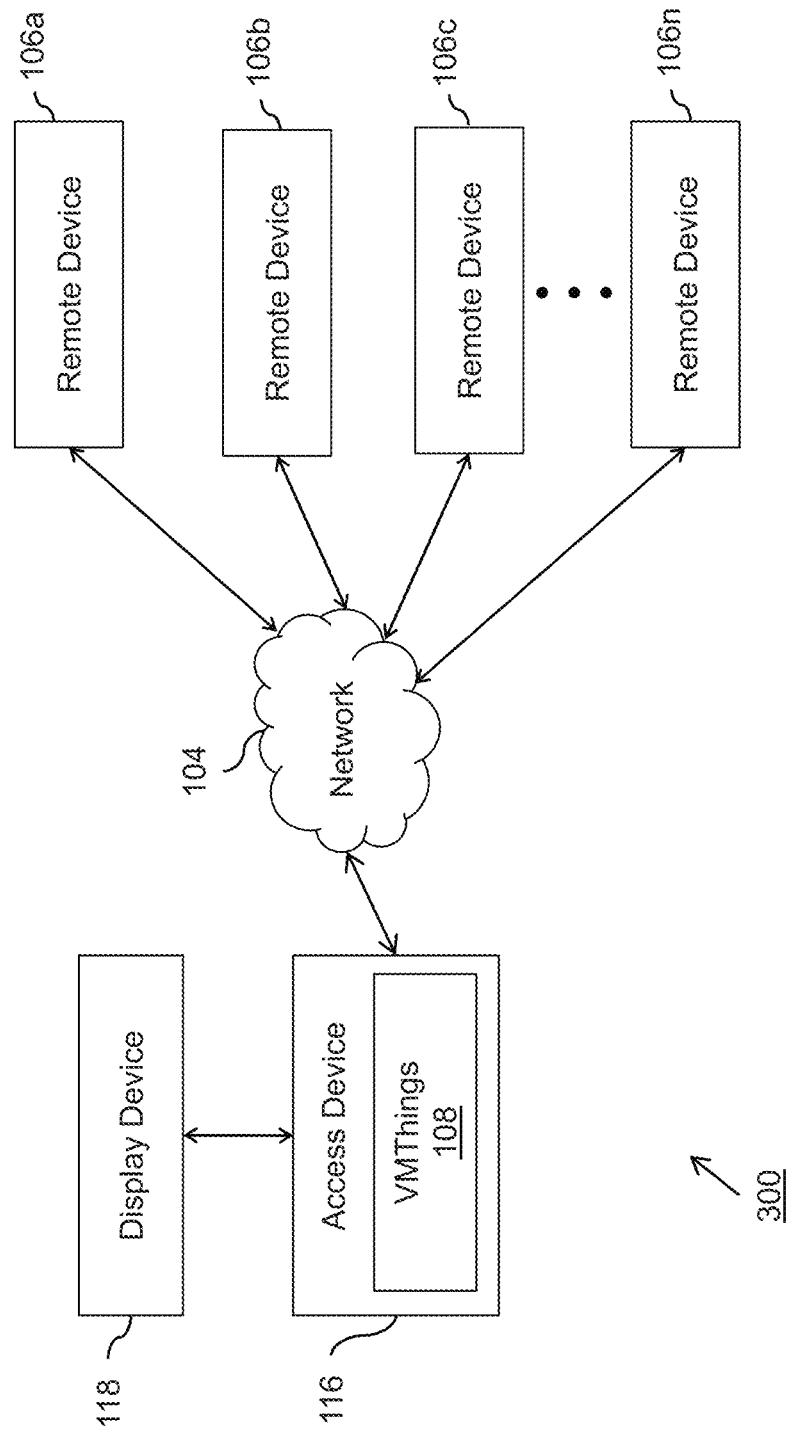
Figure 1D:
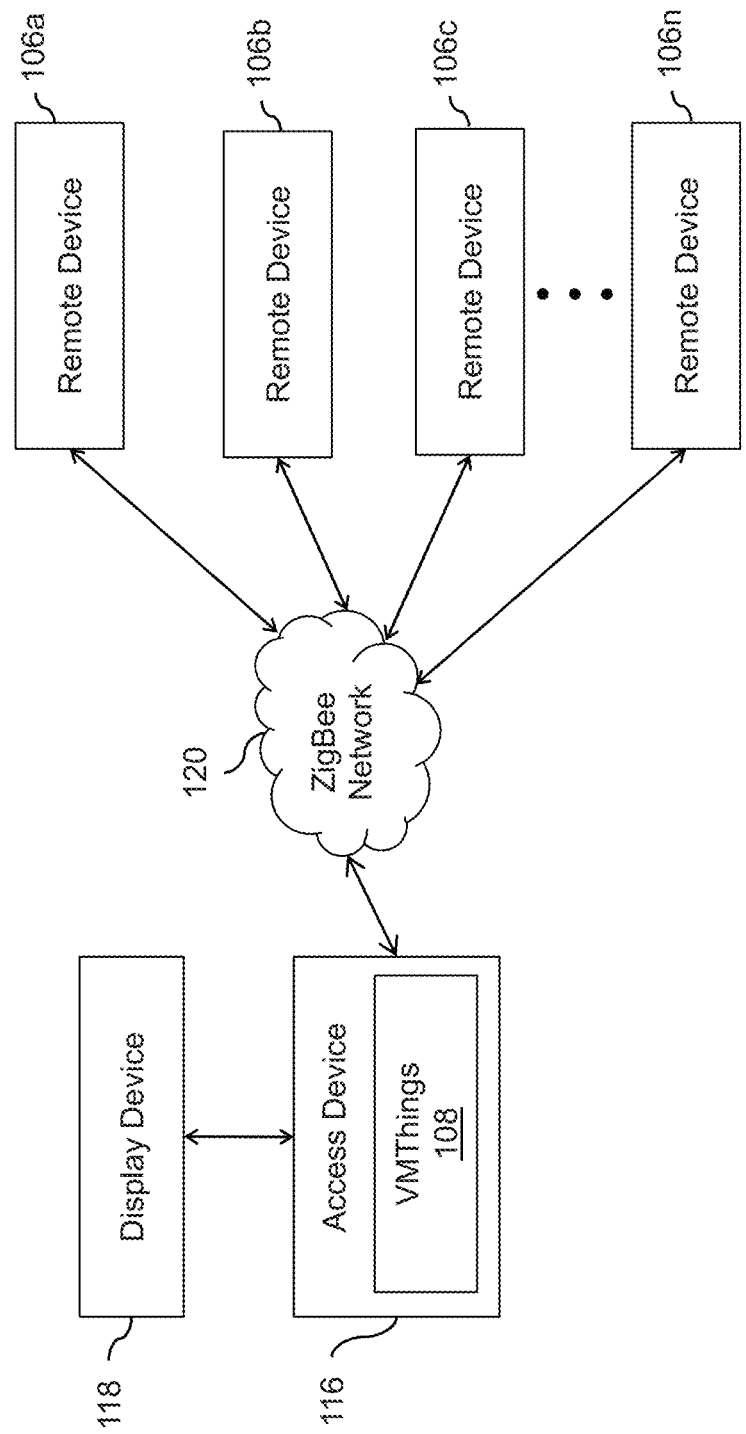
Figure 1E:
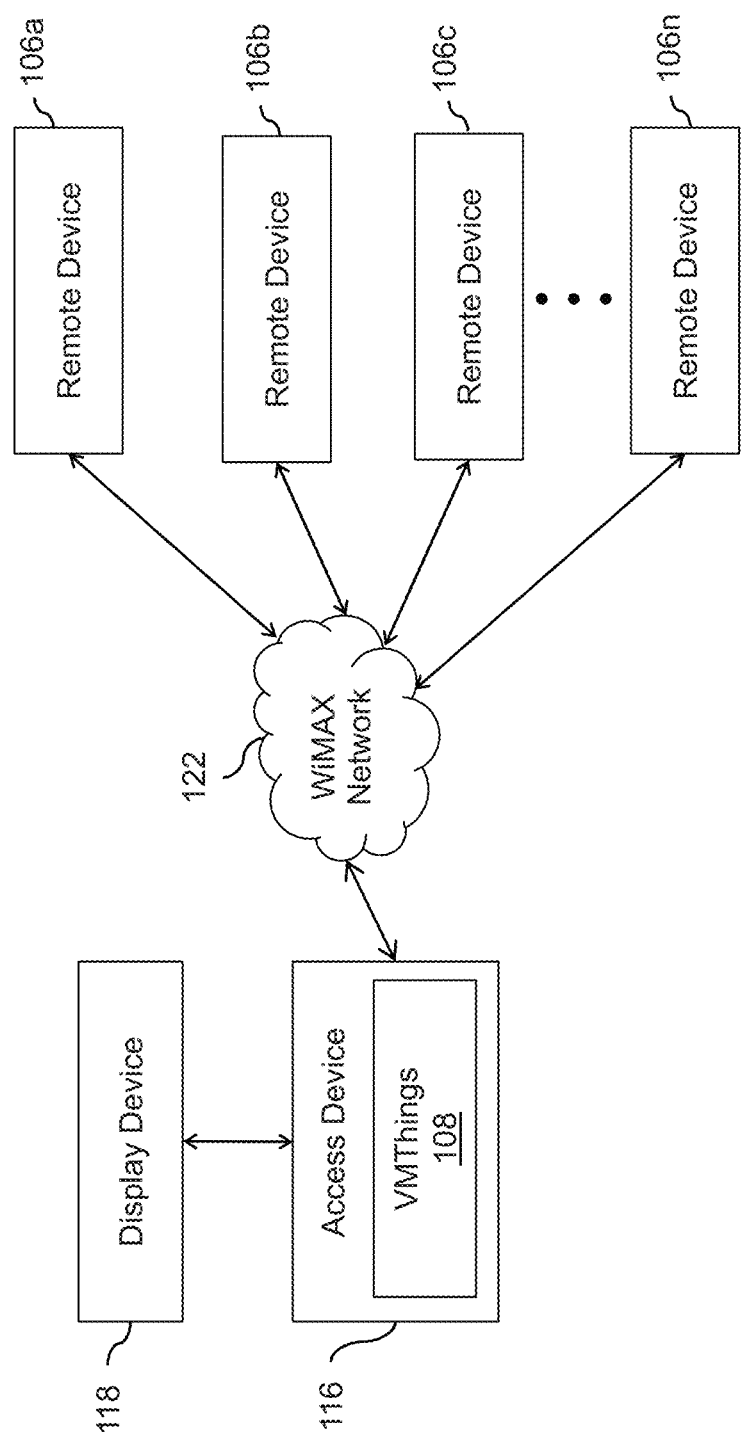
Figure 1F:
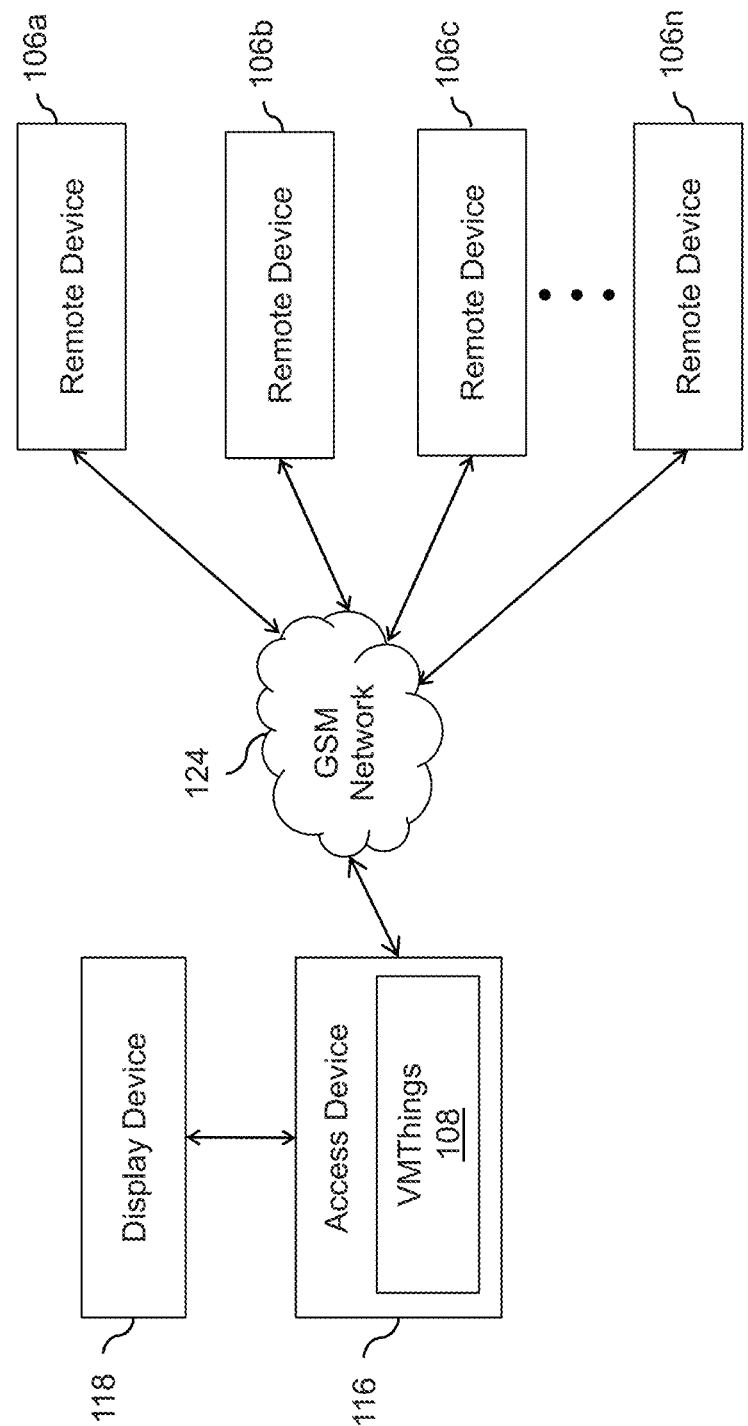
Figure 1G:
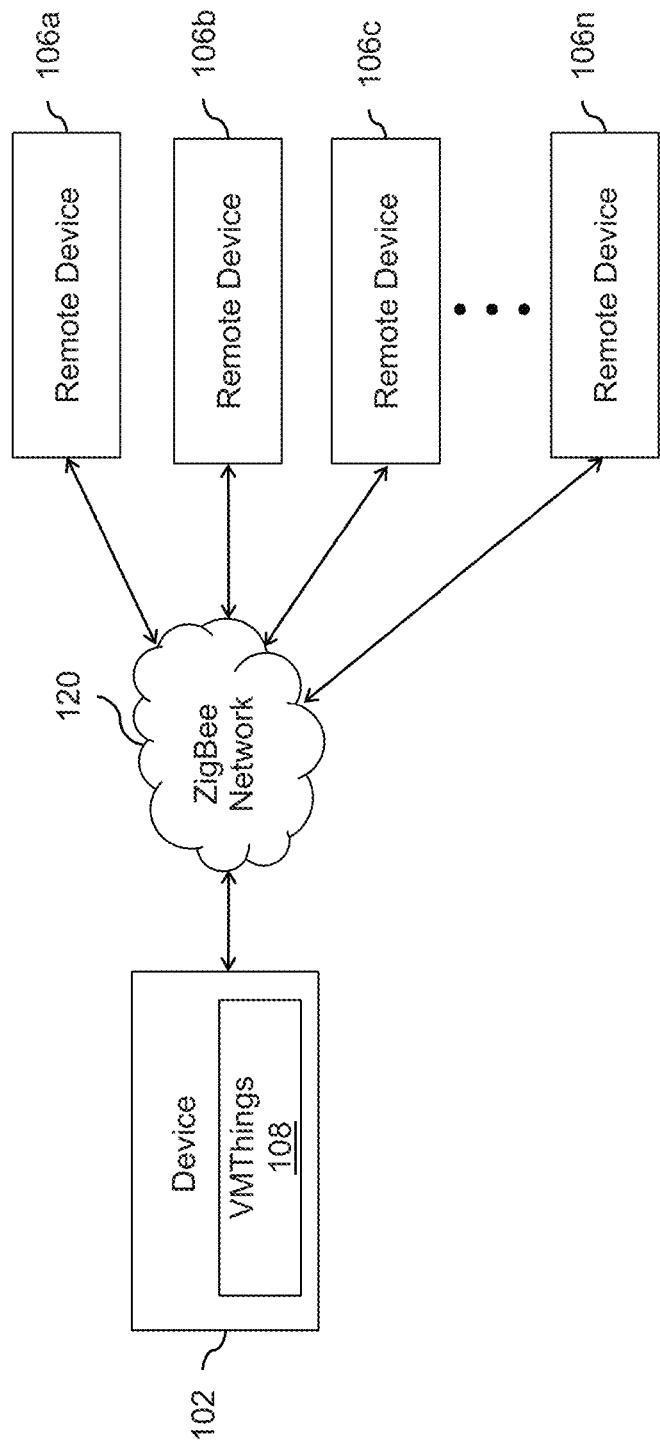
Figure 1H:
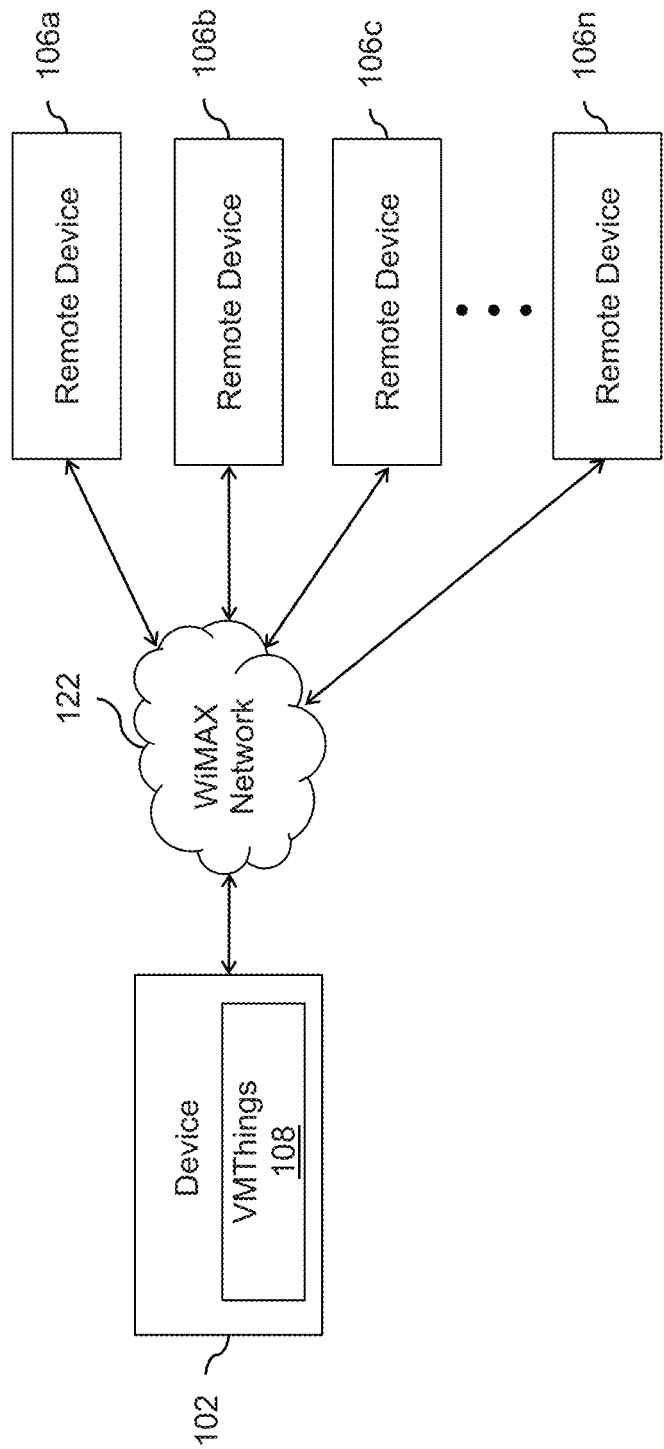
Figure 1I:
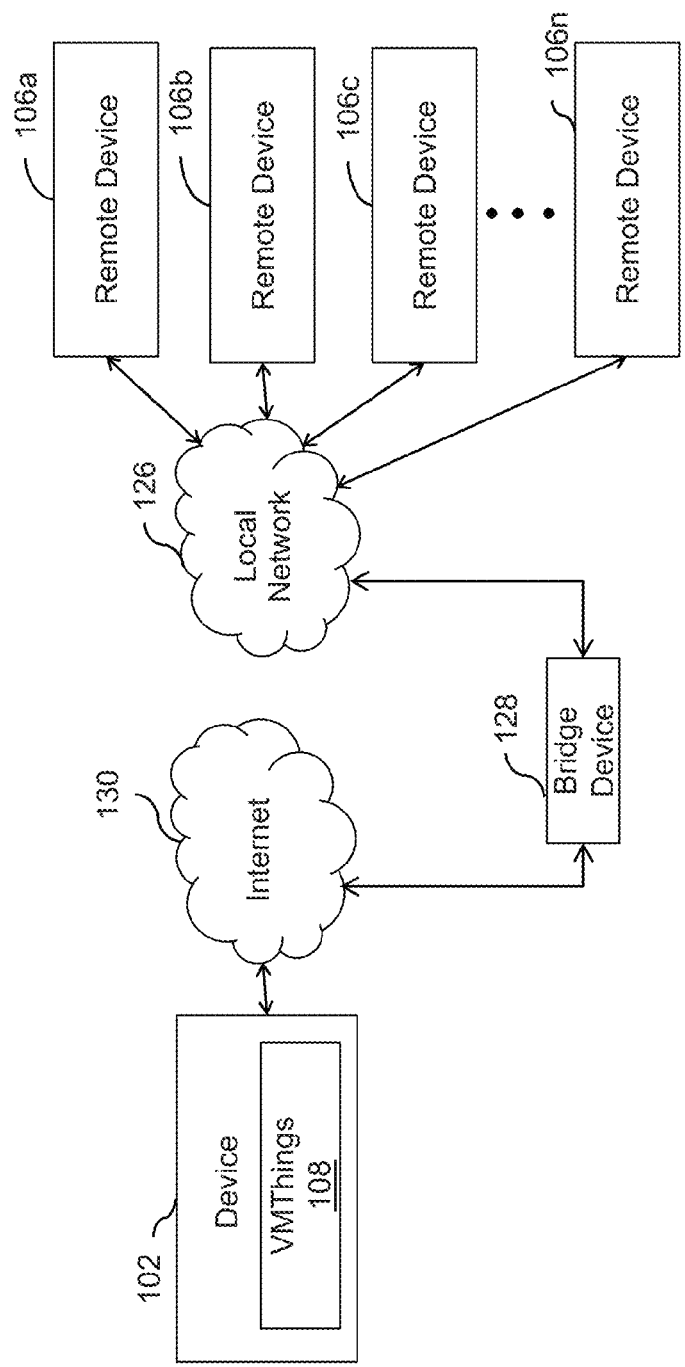
Figure 2A:
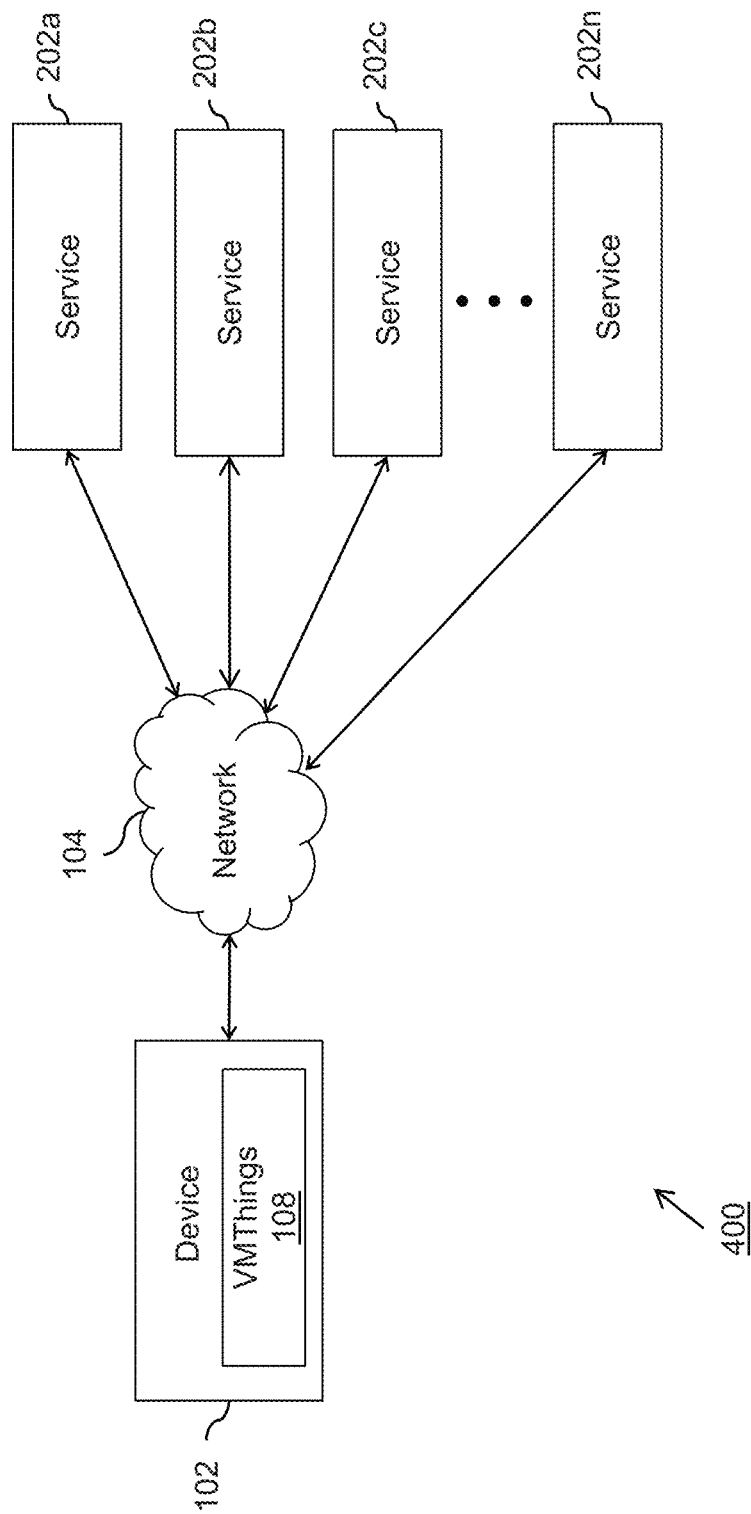
Figure 2B:
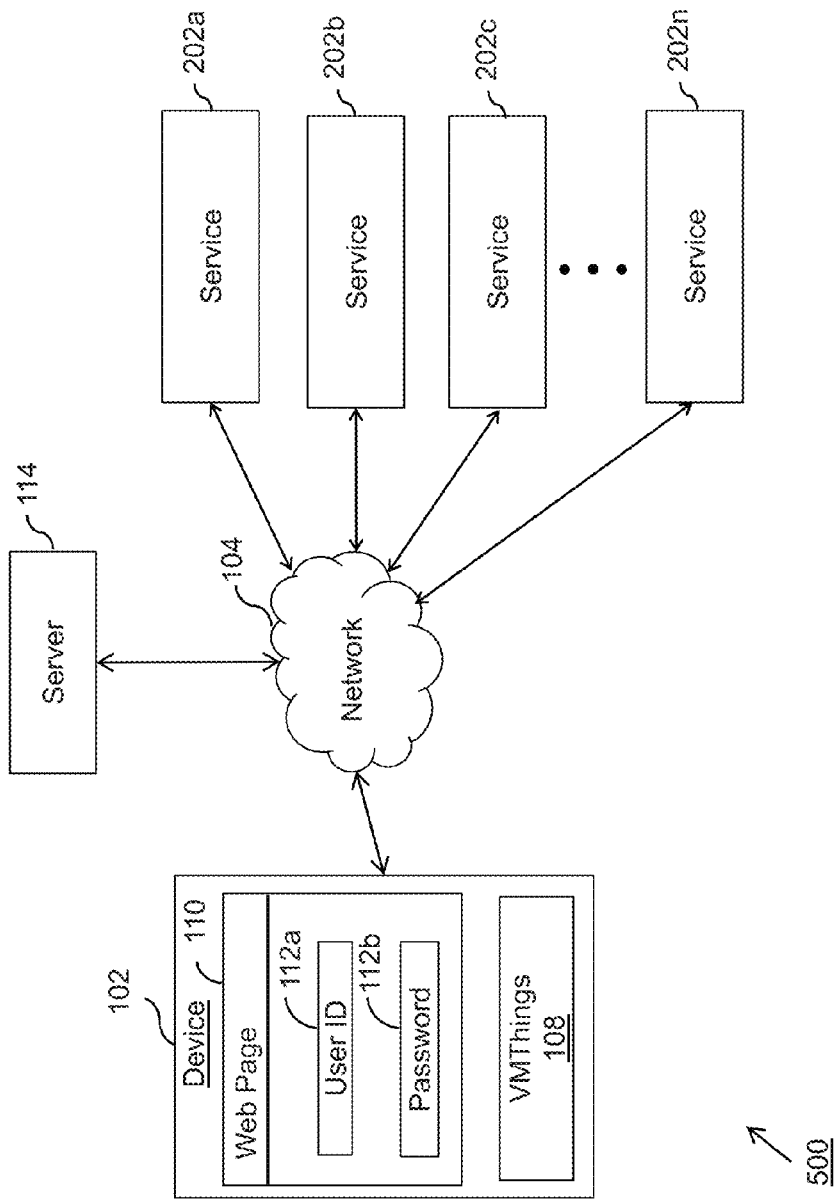
Figure 2C:
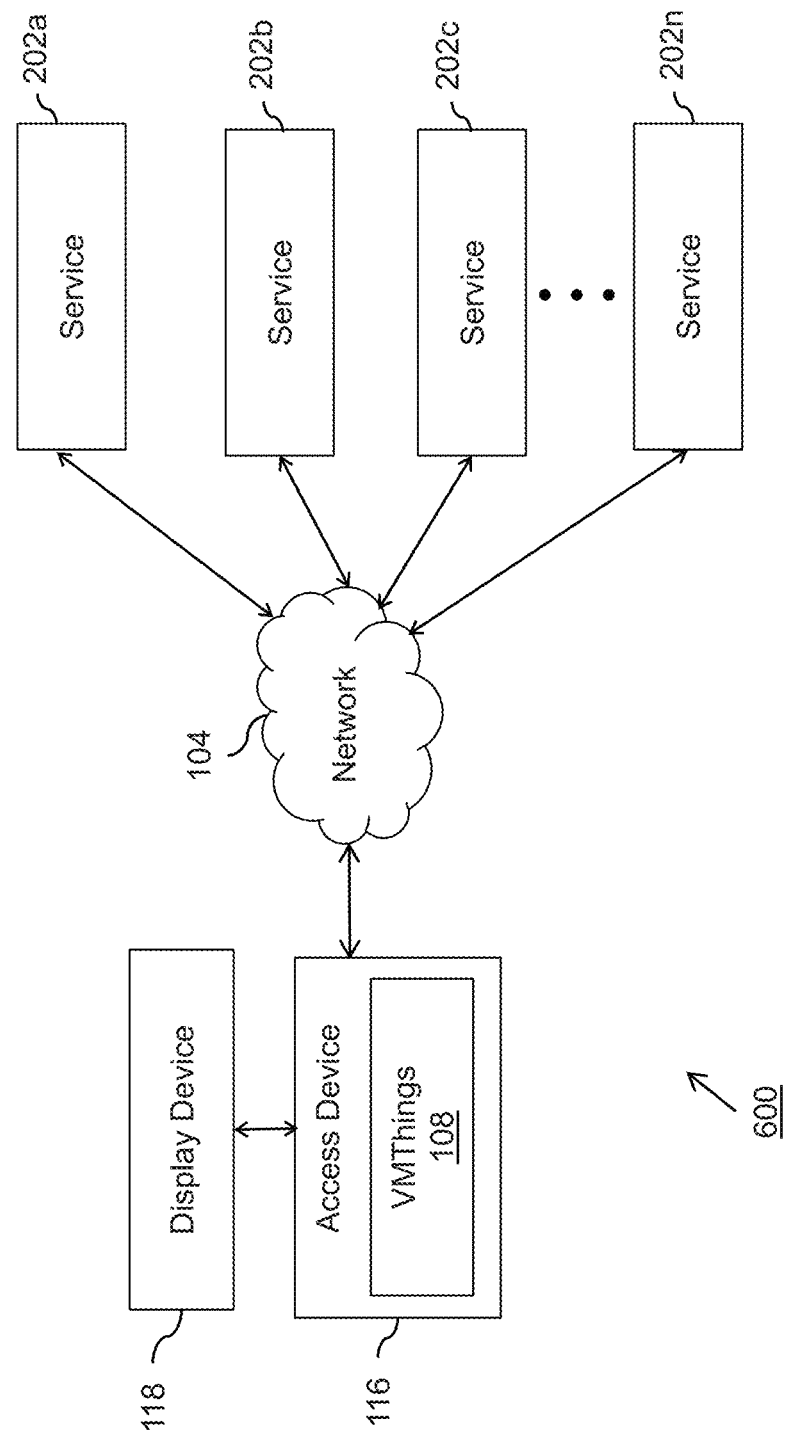
Figure 2D:
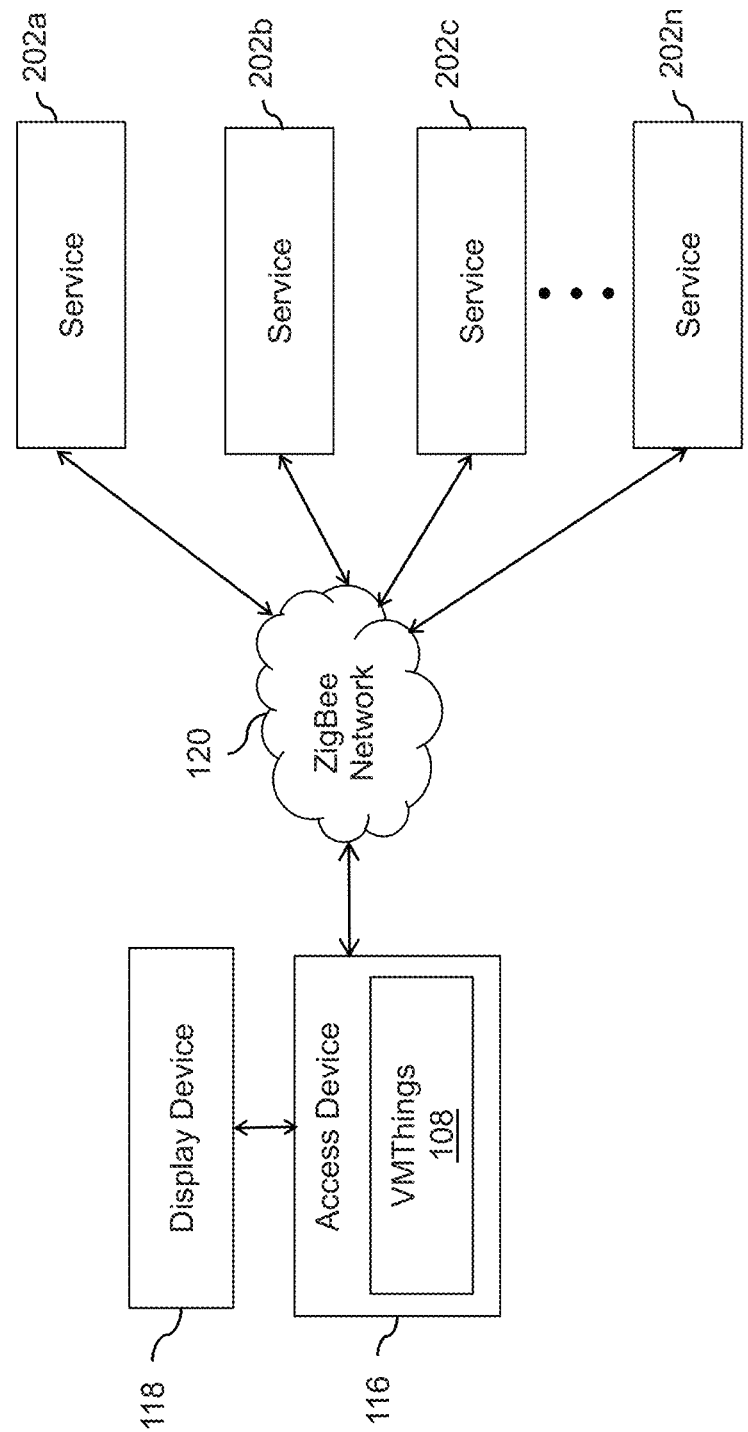
Figure 2E:
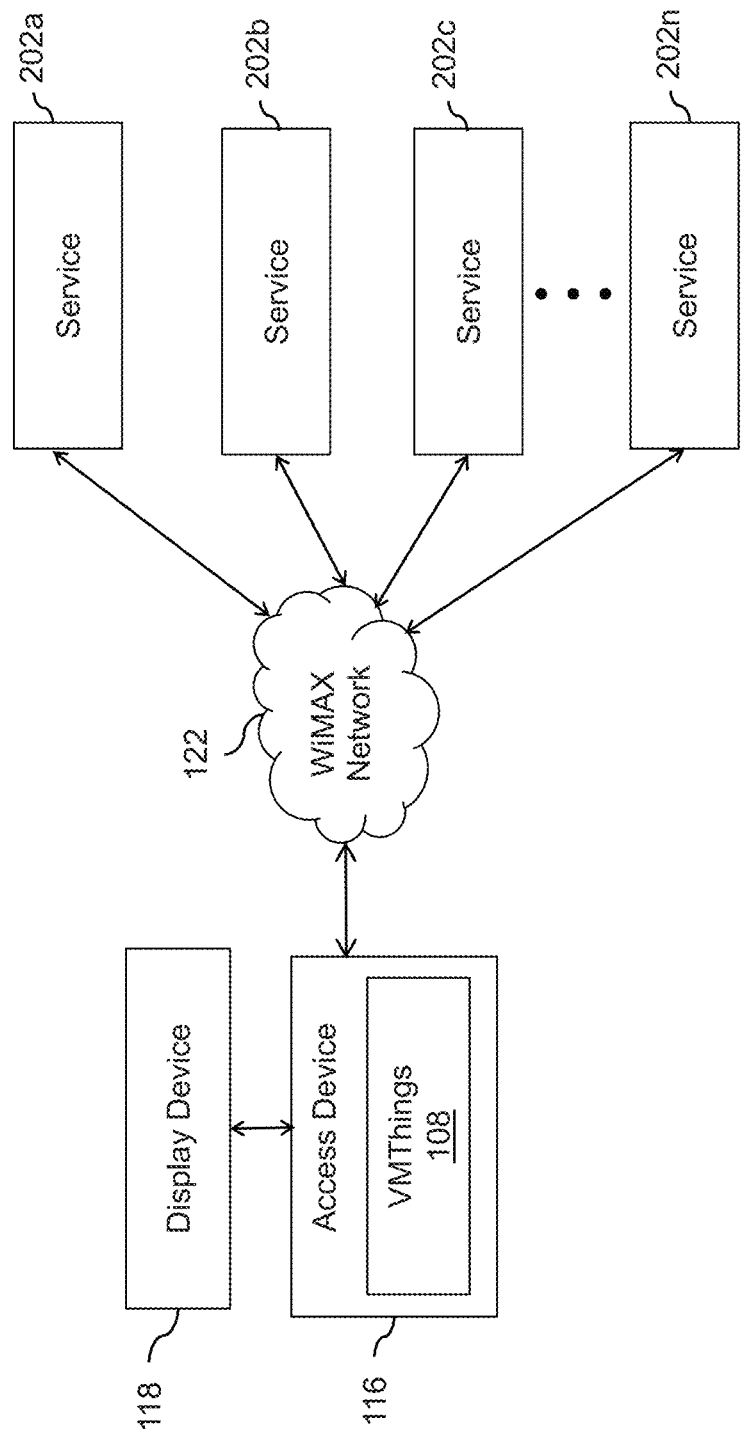
Figure 2F:
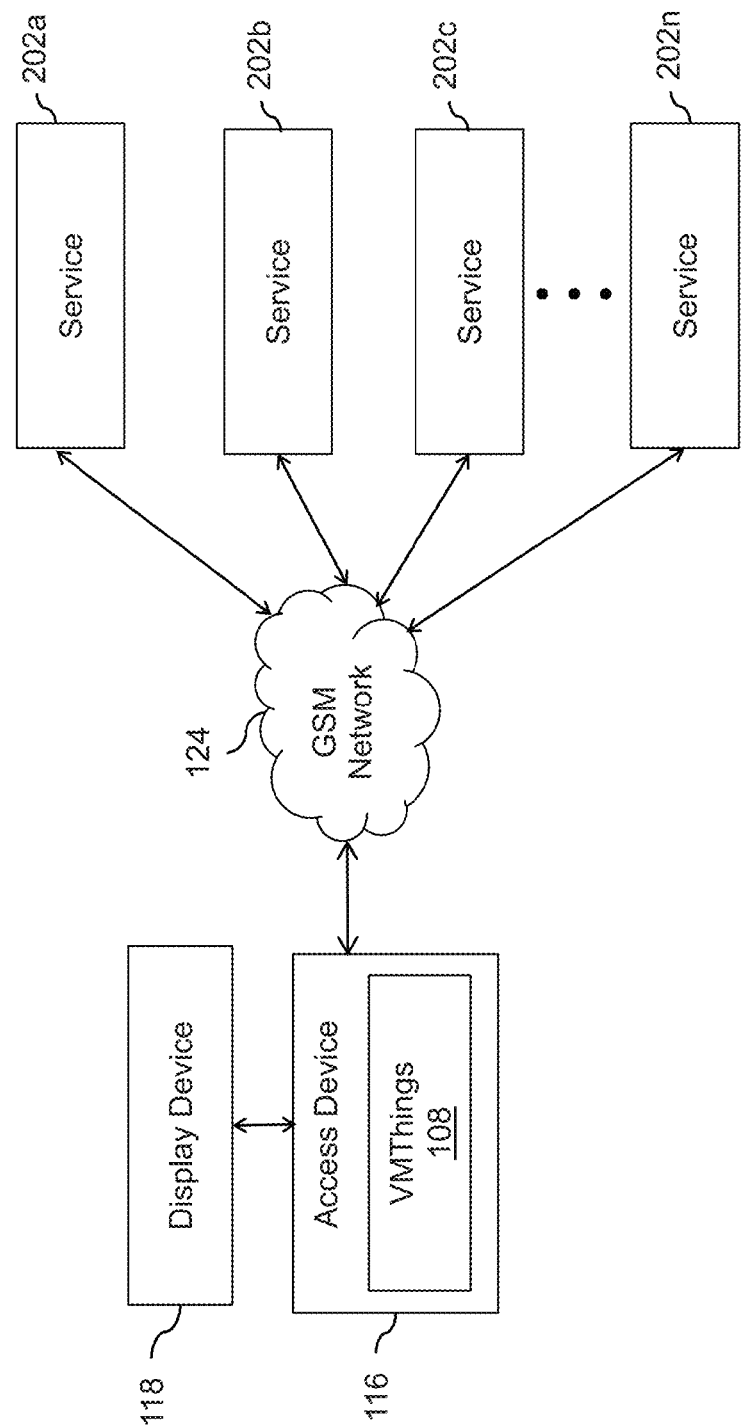
Figure 2G:
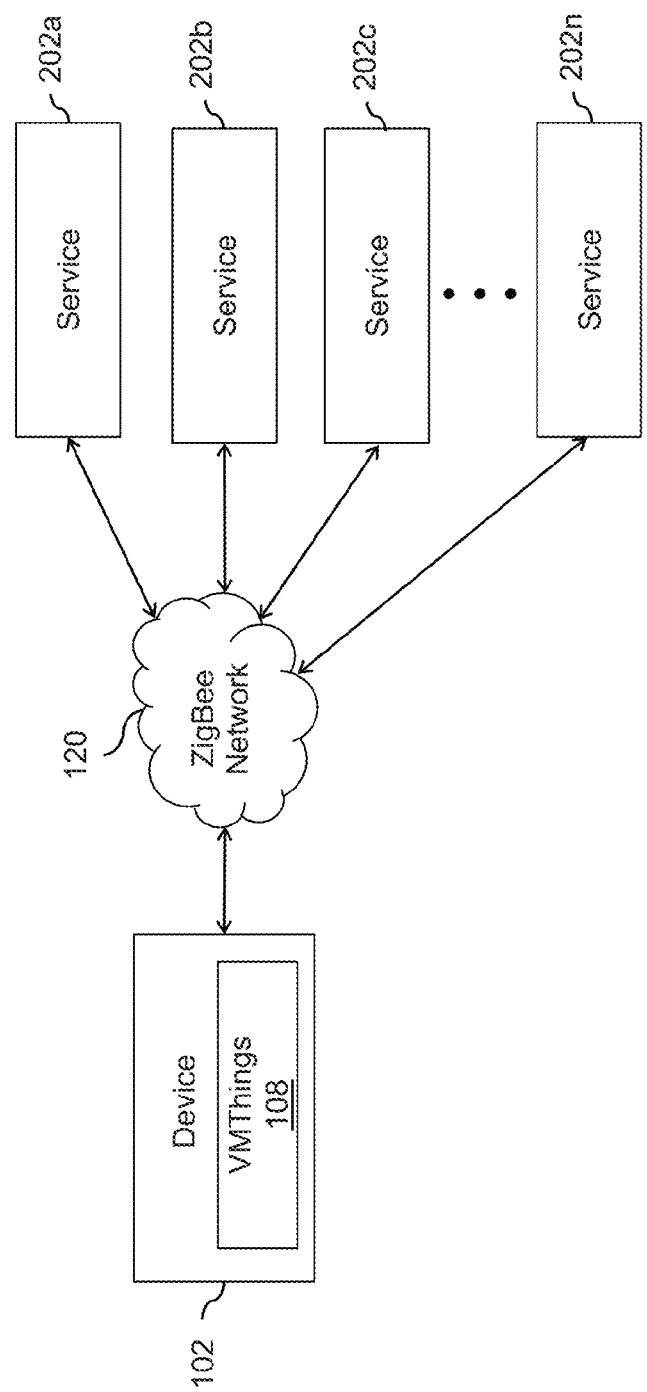
Figure 2H:
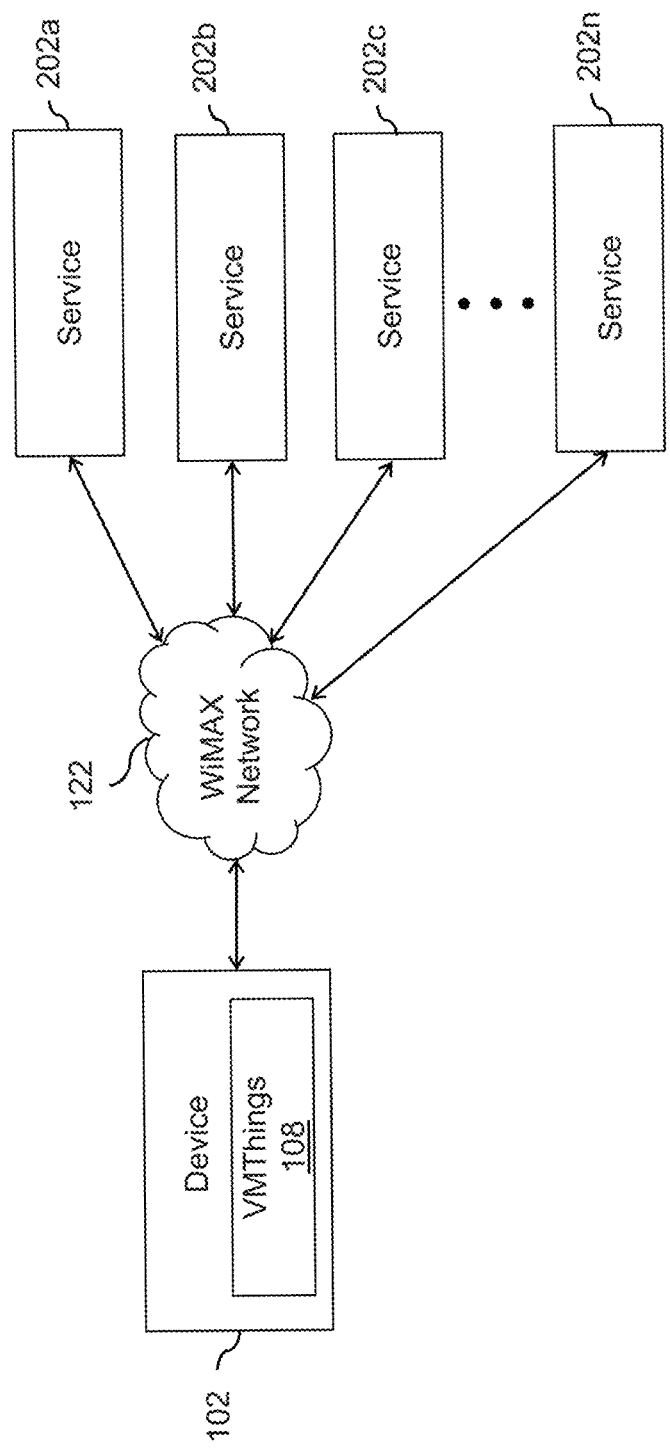
Figure 2I:
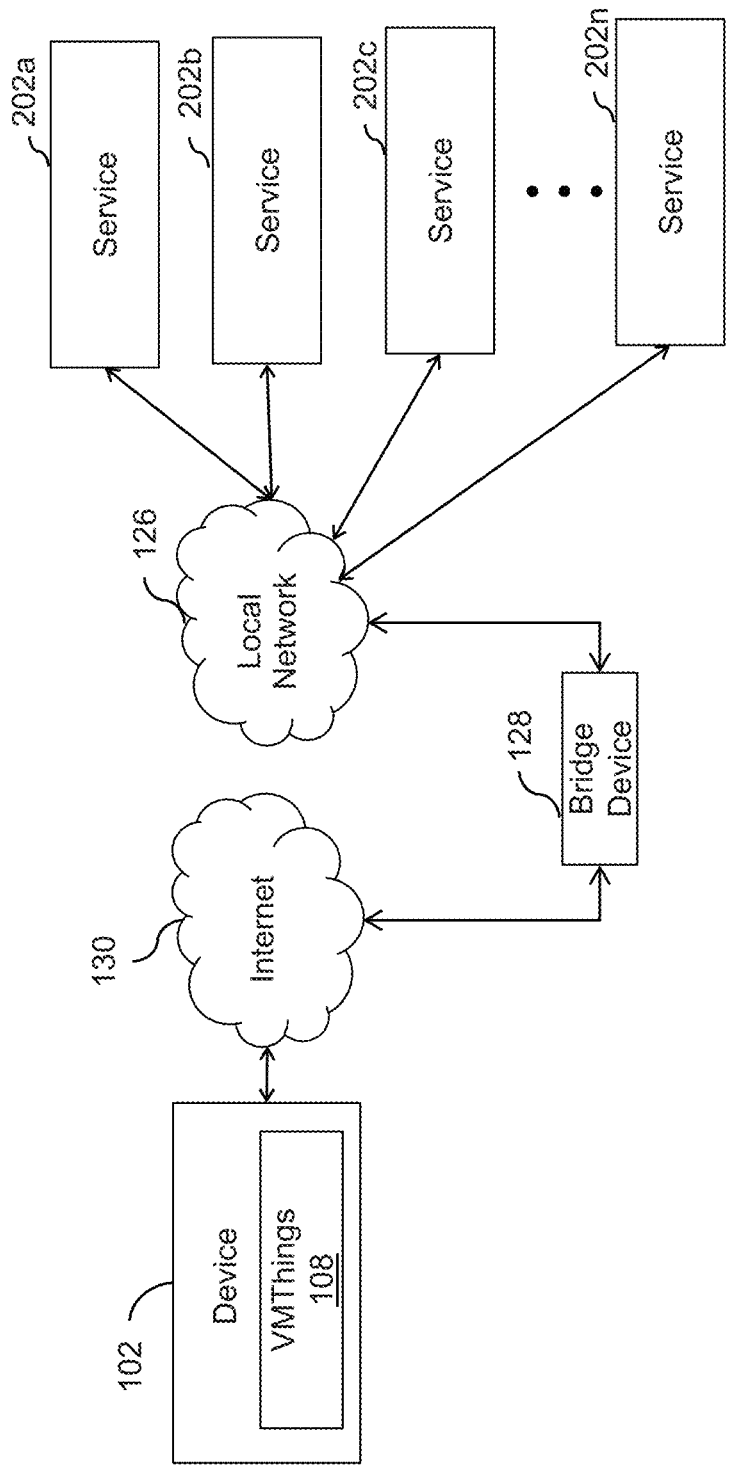
Figure 3A:
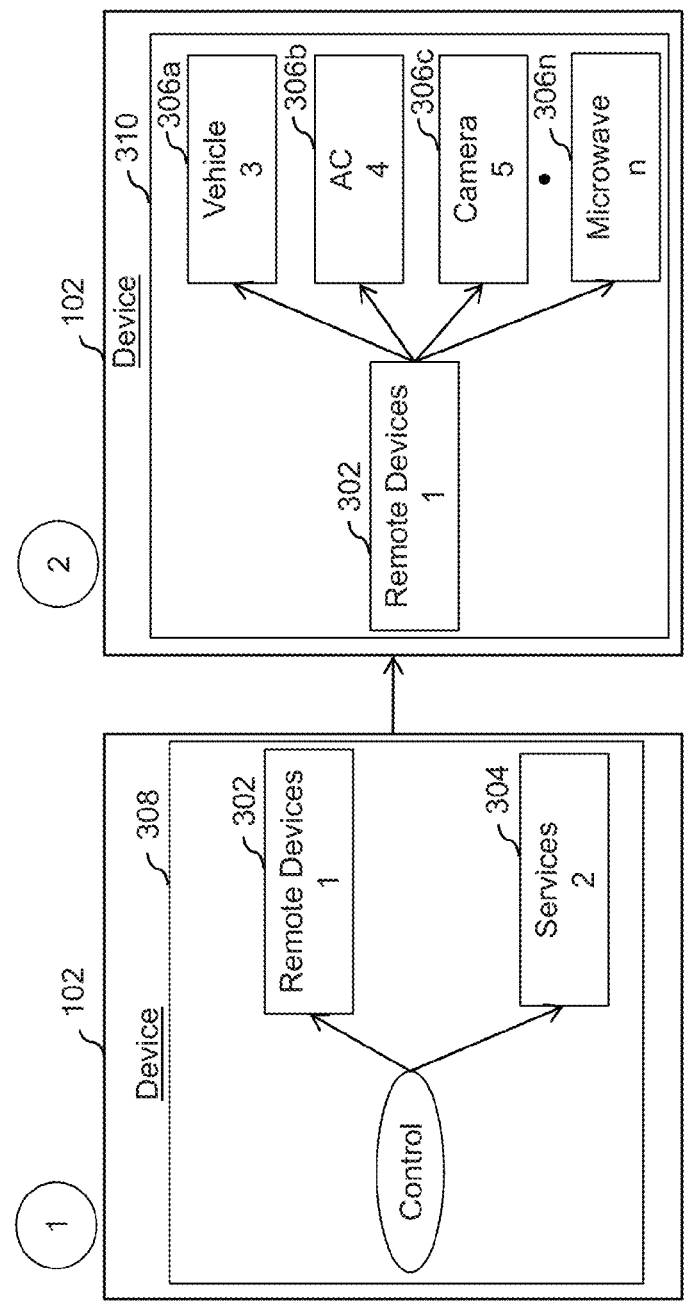
Figure 3B:
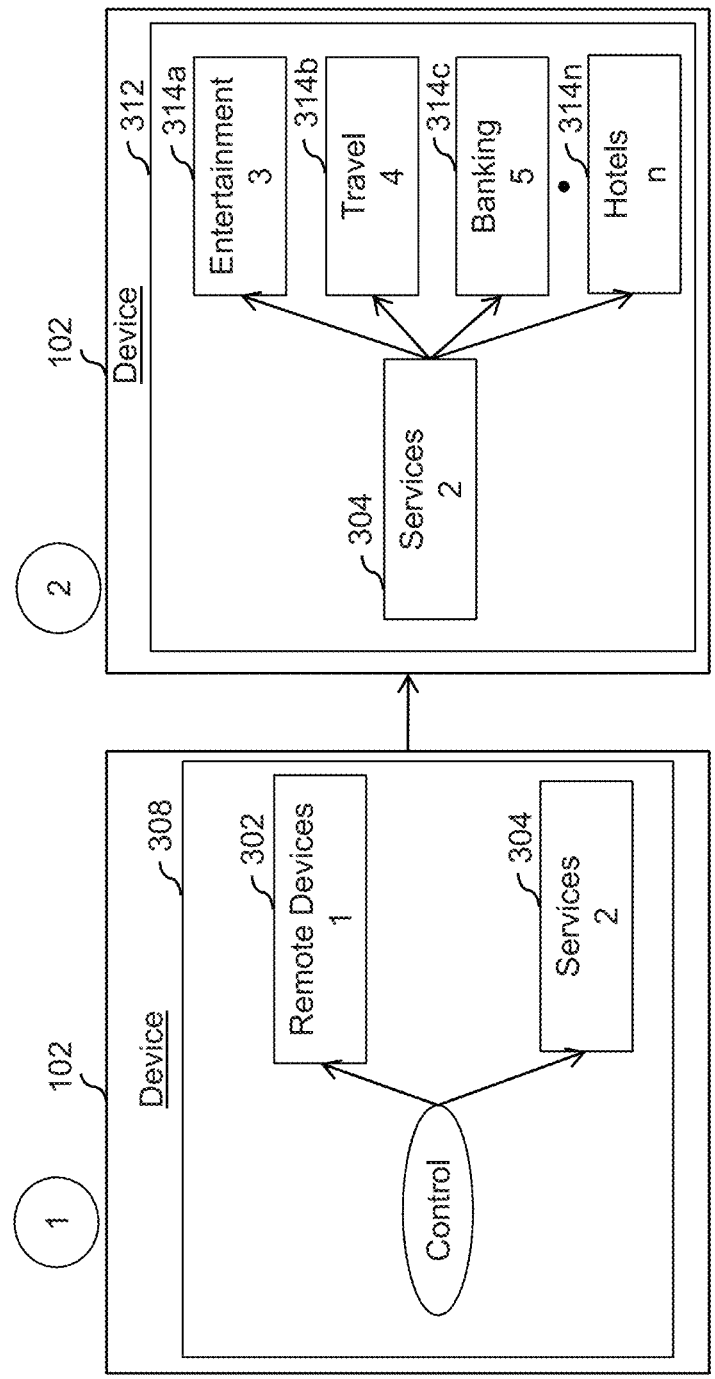
Figure 3C:
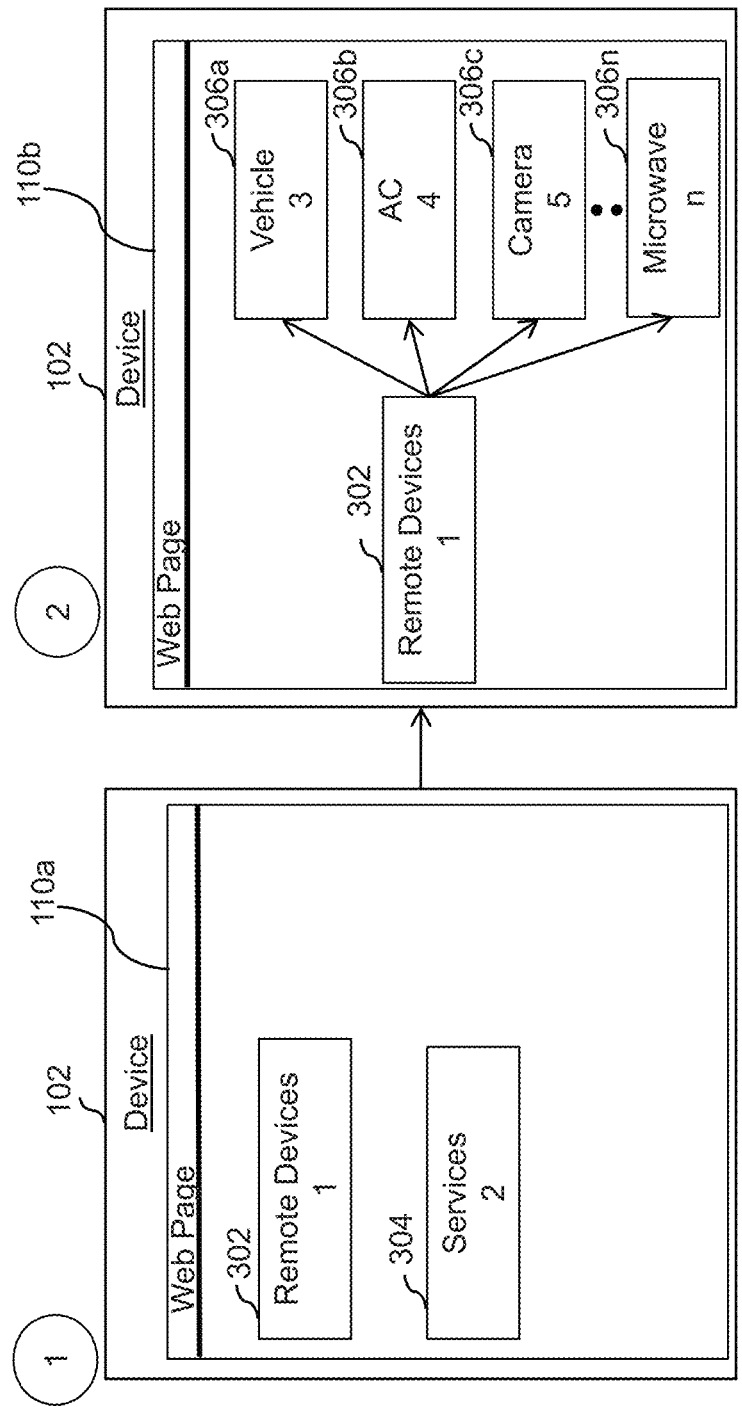
Figure 3D:
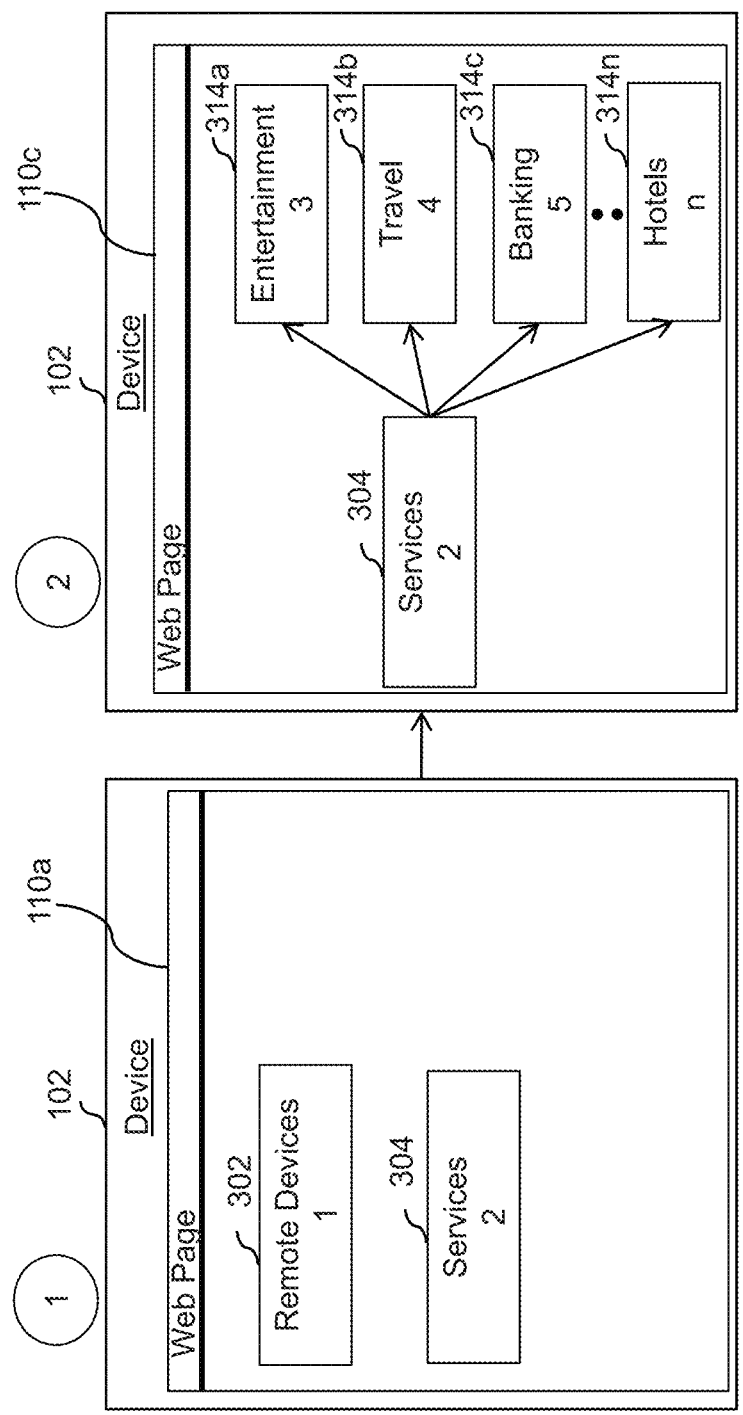
Figure 4:
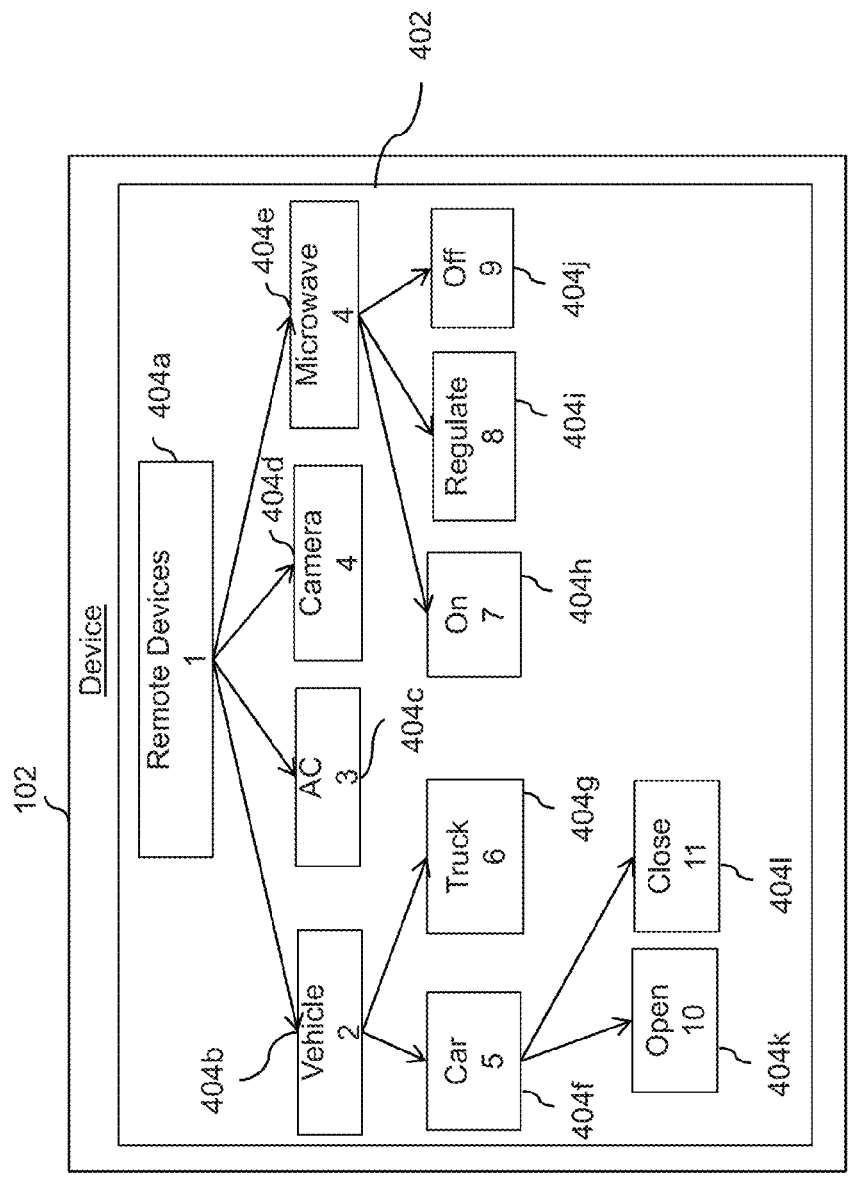

Having thus described the invention in general terms, reference will now be made to the accompanying drawings, which are not necessarily drawn to scale, and wherein:

FIG. 1A illustrates an exemplary environment, in accordance with an first embodiment of the invention;

FIG. 1B illustrates another exemplary environment, in accordance with the first embodiment of the invention;

FIG. 1C illustrates yet another exemplary environment, in accordance with the first embodiment of the invention;

FIG. 1D illustrates an environment based on a ZigBee network, in accordance with the first embodiment of the invention;

FIG. 1E illustrates an environment based on a WiMAX network, in accordance with the first embodiment of the invention;

FIG. 1F illustrates an environment based on a Global System for Mobile Communication (GSM) network, in accordance with the first embodiment of the invention;

FIG. 1G illustrates an environment based on a ZigBee network, in accordance with the first embodiment of the invention;

FIG. 1H illustrates an environment based on a WiMAX network, in accordance with the first embodiment of the invention;

FIG. 1I illustrates an environment based on a combination of a local network and the Internet, in accordance with the first embodiment of the invention;

FIG. 2A illustrates an exemplary environment, in accordance with a second embodiment of the invention;

FIG. 2B illustrates another exemplary environment, in accordance with the second embodiment of the invention;

FIG. 2C illustrates yet another exemplary environment, in accordance with the second embodiment of the invention;

FIG. 2D illustrates an environment based on a ZigBee network, in accordance with the second embodiment of the invention;

FIG. 2E illustrates an environment based on a WiMAX network, in accordance with the second embodiment of the invention;

FIG. 2F illustrates an environment based on a GSM network, in accordance with the second embodiment of the invention;

FIG. 2G illustrates an environment based on a ZigBee network, in accordance with the second embodiment of the invention;

FIG. 2H illustrates an environment based on a WiMAX network, in accordance with the second embodiment of the invention;

FIG. 2I illustrates an environment based on a combination of a local network and the Internet, in accordance with the second embodiment of the invention;

FIG. 3A illustrates an exemplary visual access menu and enhanced visual access menu at a device, in accordance with the first embodiment of the invention;

FIG. 3B illustrates an exemplary visual access menu and enhanced visual access menu at the device, in accordance with second embodiment of the invention;

FIG. 3C illustrates another exemplary visual access menu and enhanced visual access menu at the device, in accordance with first embodiment of the invention;

FIG. 3D illustrates another exemplary visual access menu and enhanced visual access menu at the device, in accordance with second embodiment of the invention;

FIG. 4 illustrates an exemplary enhanced visual access menu including one or more device options, in accordance with an embodiment of the invention.

Figure 5:
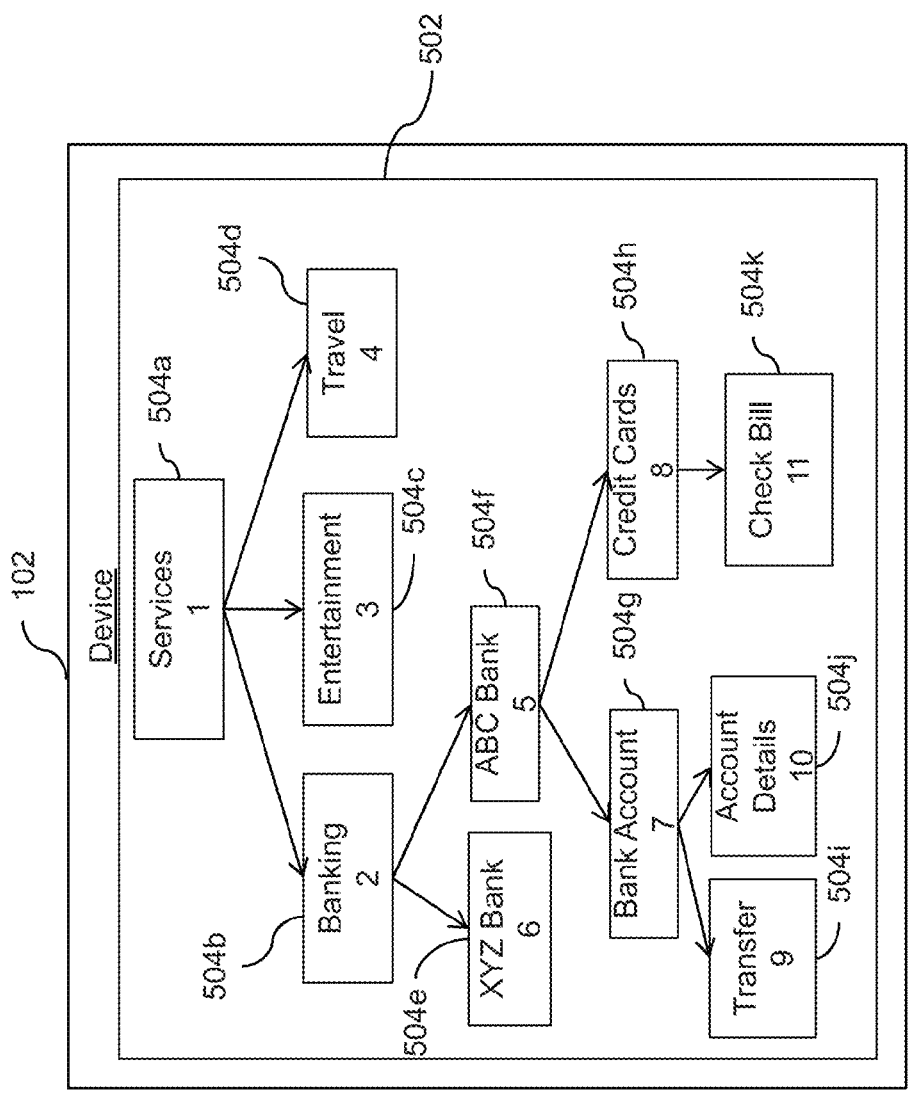

FIG. 5 illustrates an exemplary enhanced visual access menu including one or more service options, in accordance with an embodiment of the invention.

Figure 6:
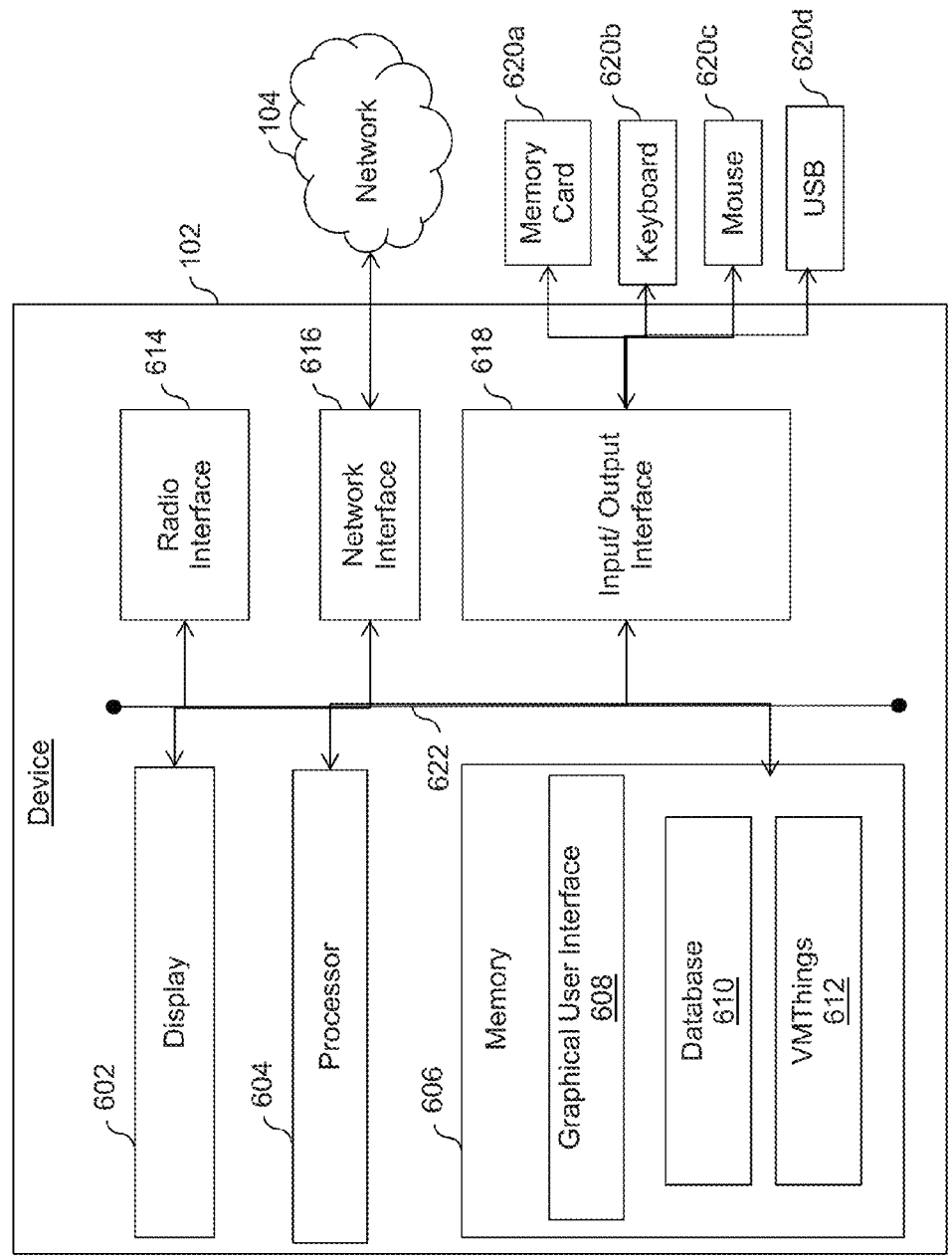
Figure 7:
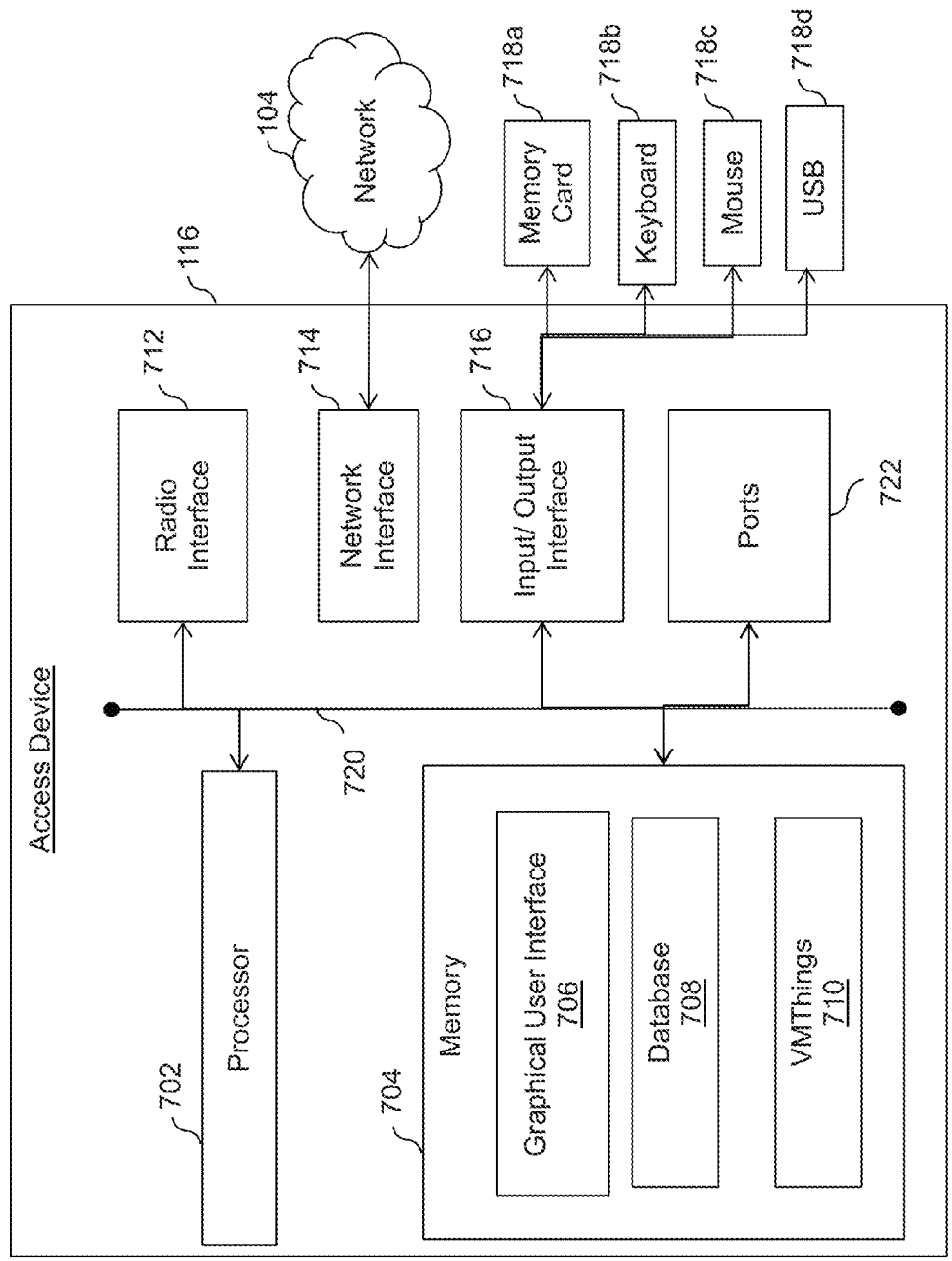
Figure 8:
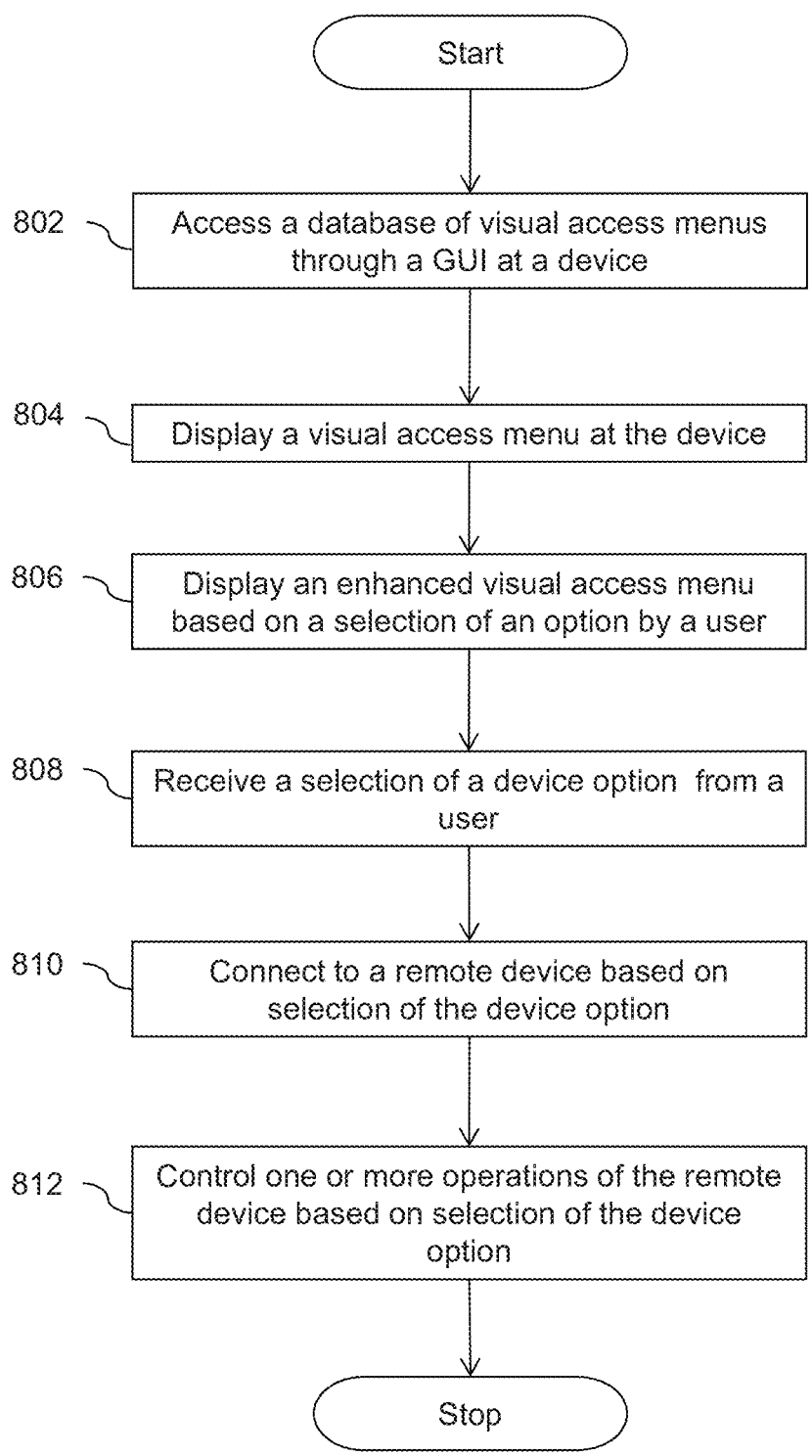
Figure 9:
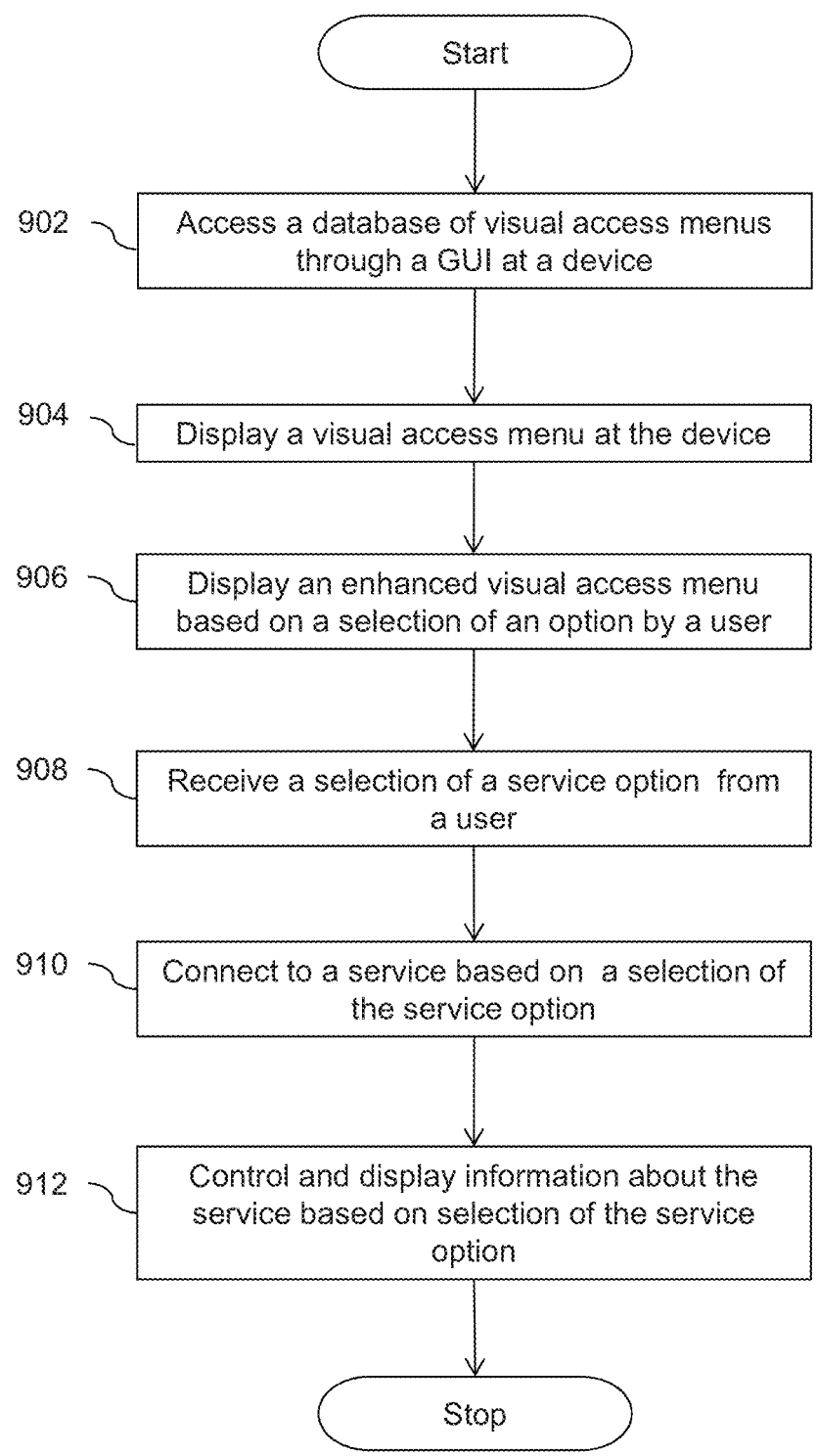
Figure 10A:
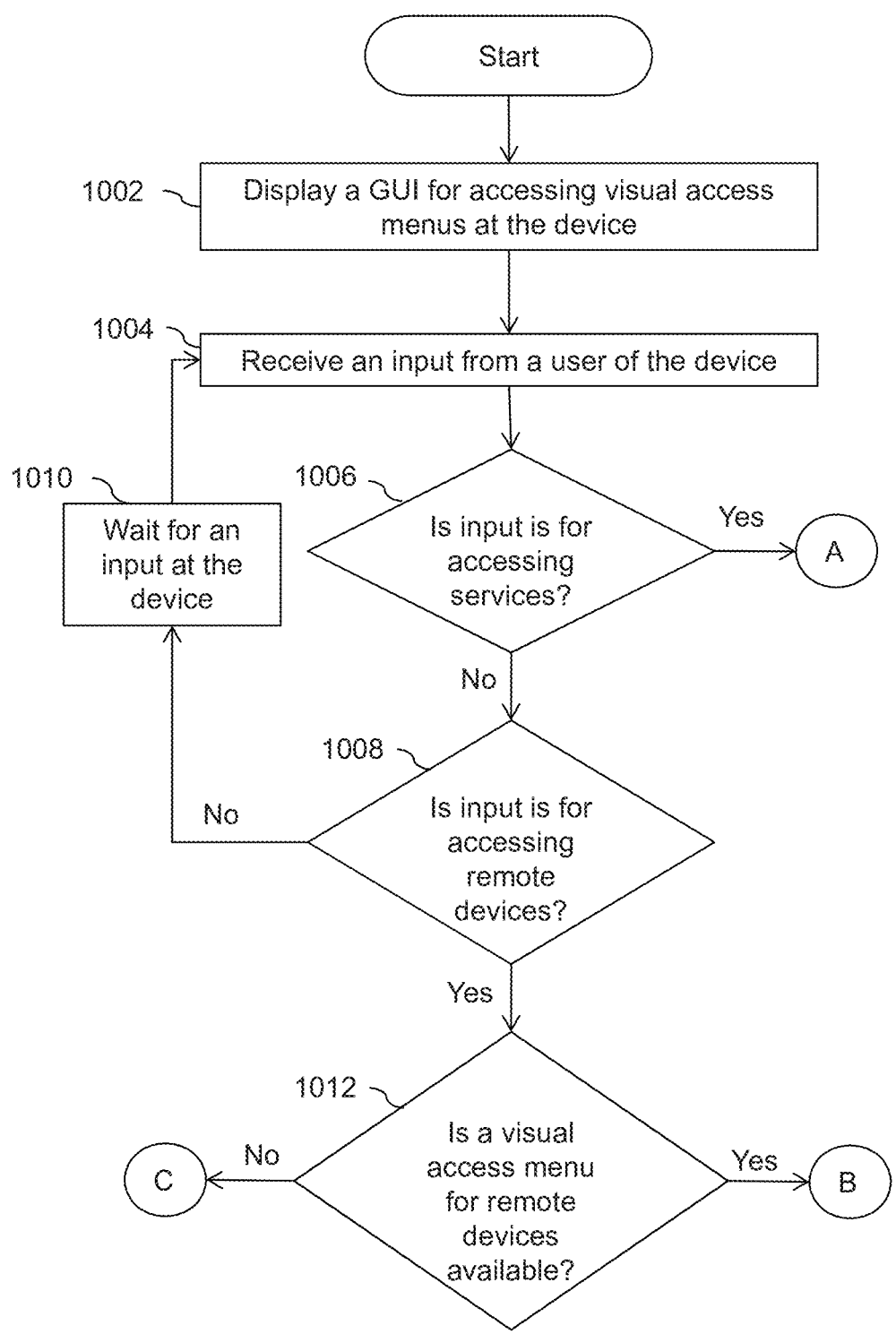
Figure 10B:
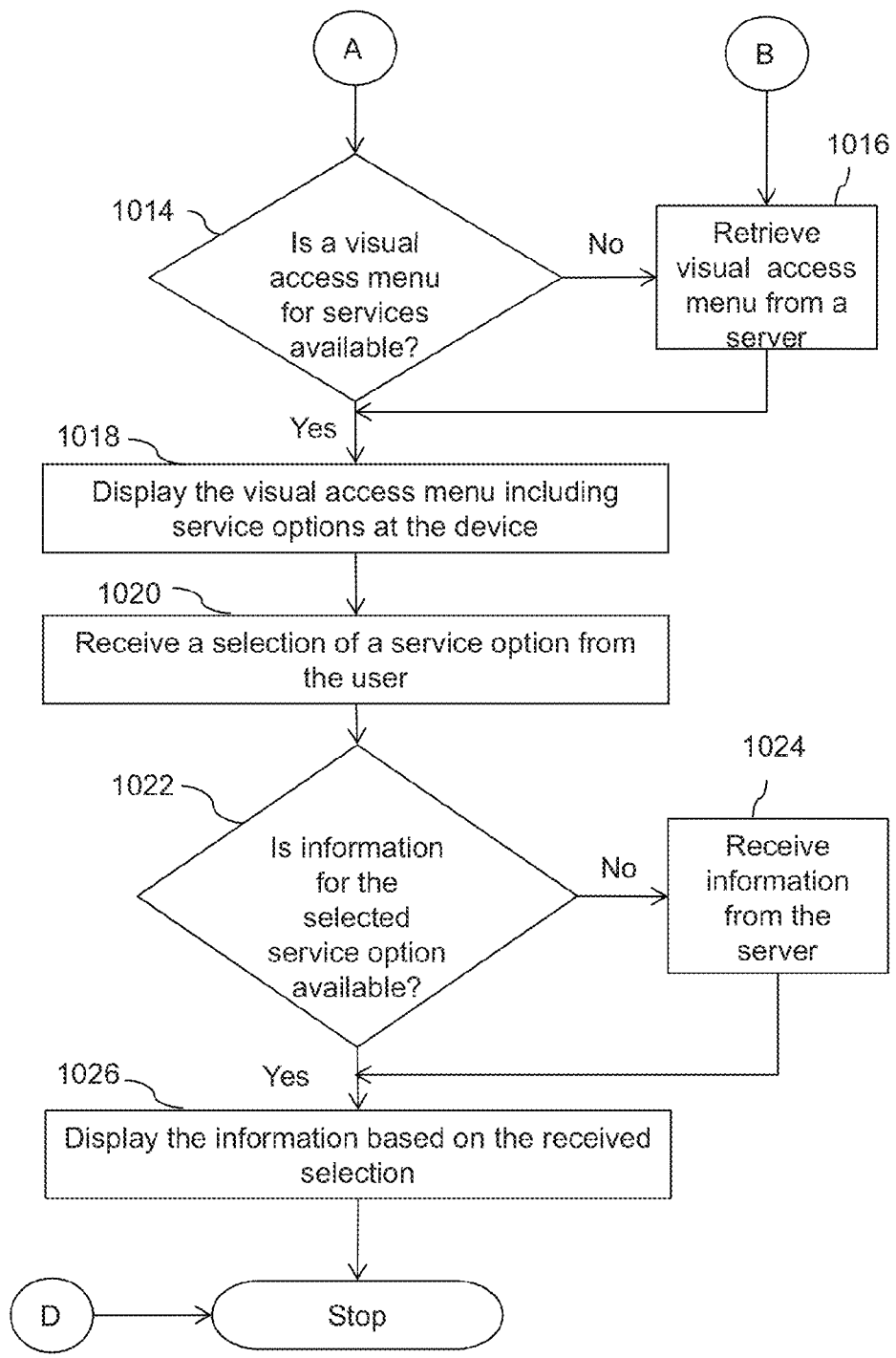
Figure 10C:
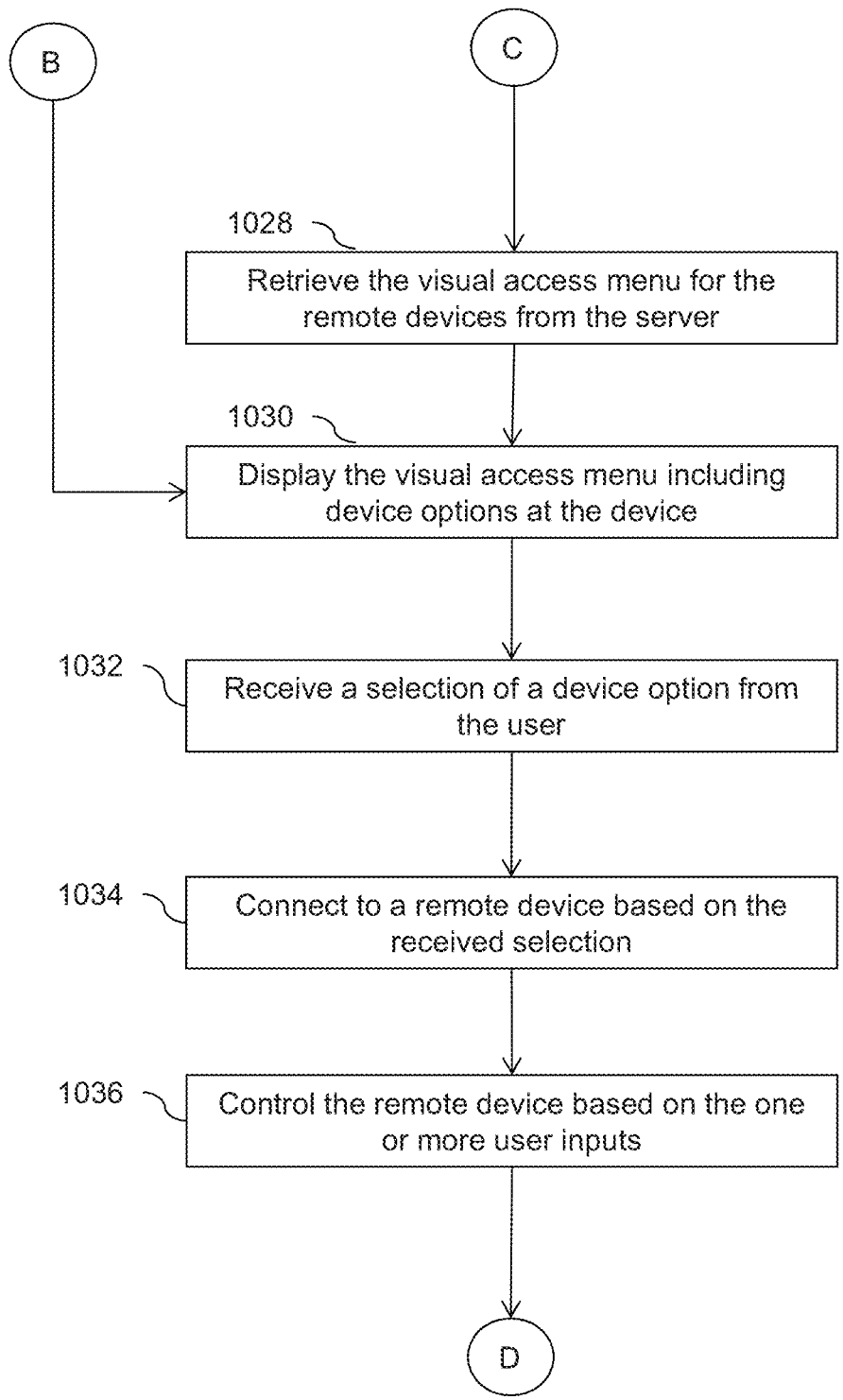
Figure 11:
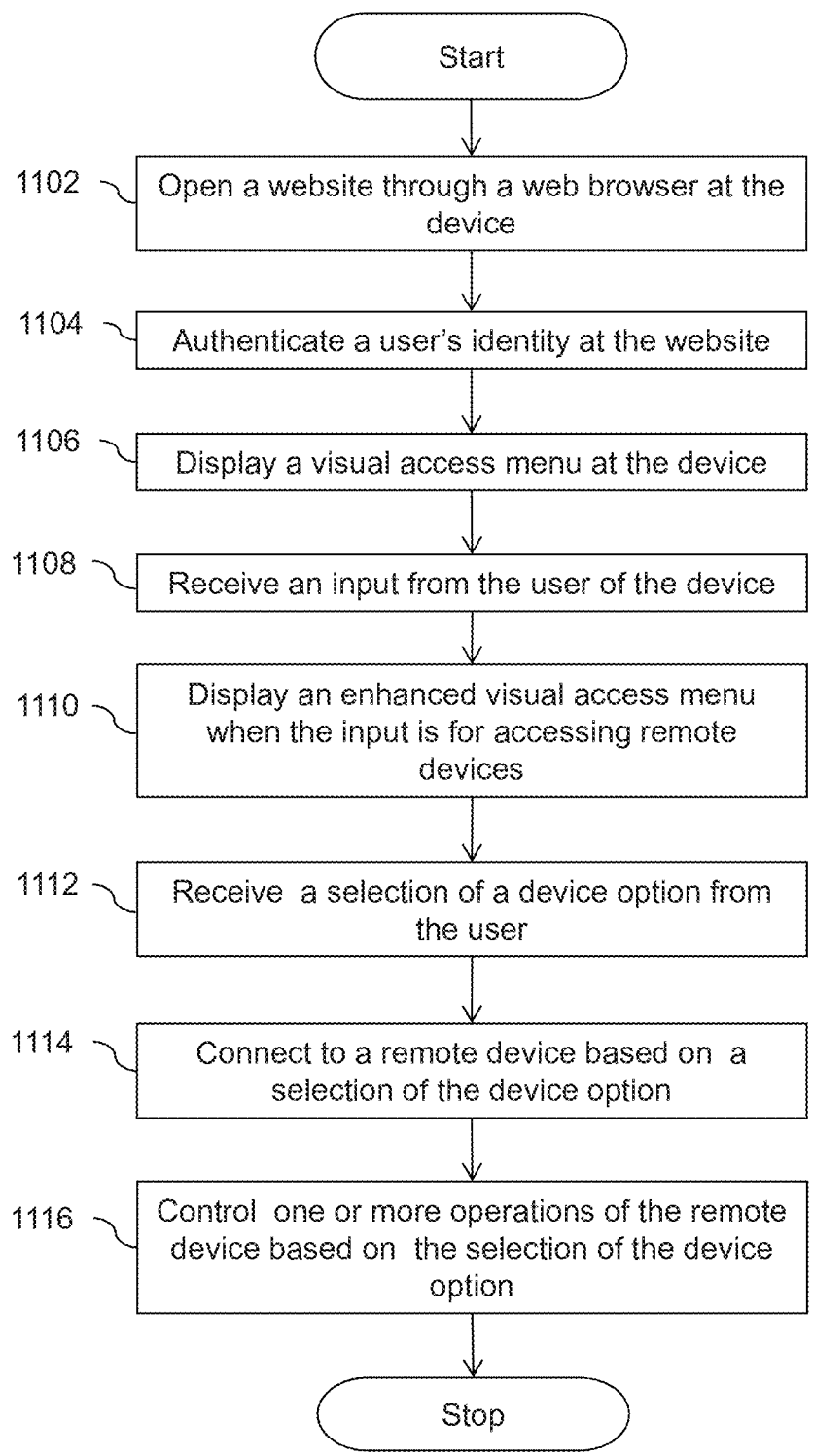
Figure 12:
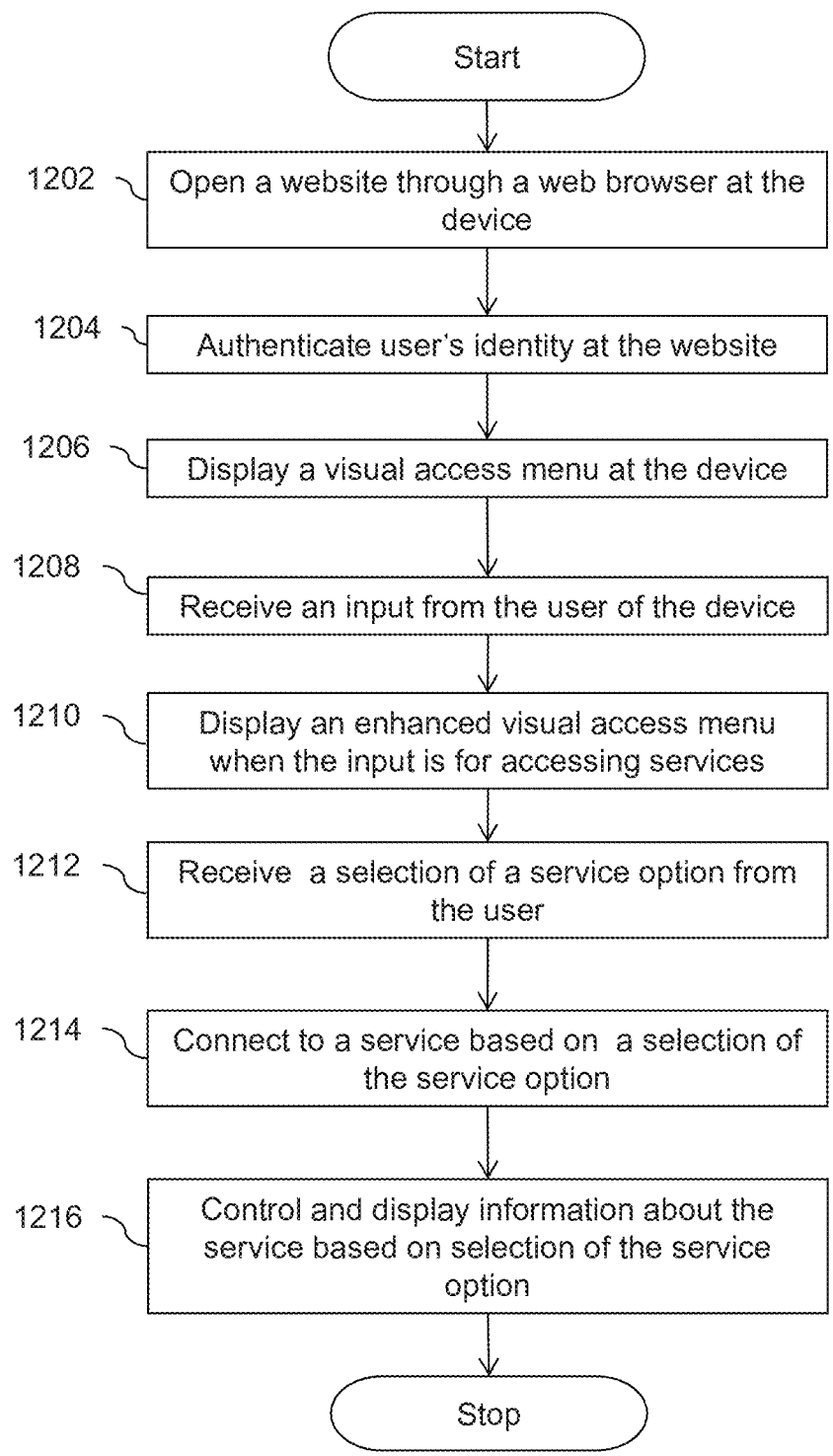
Figure 13A:
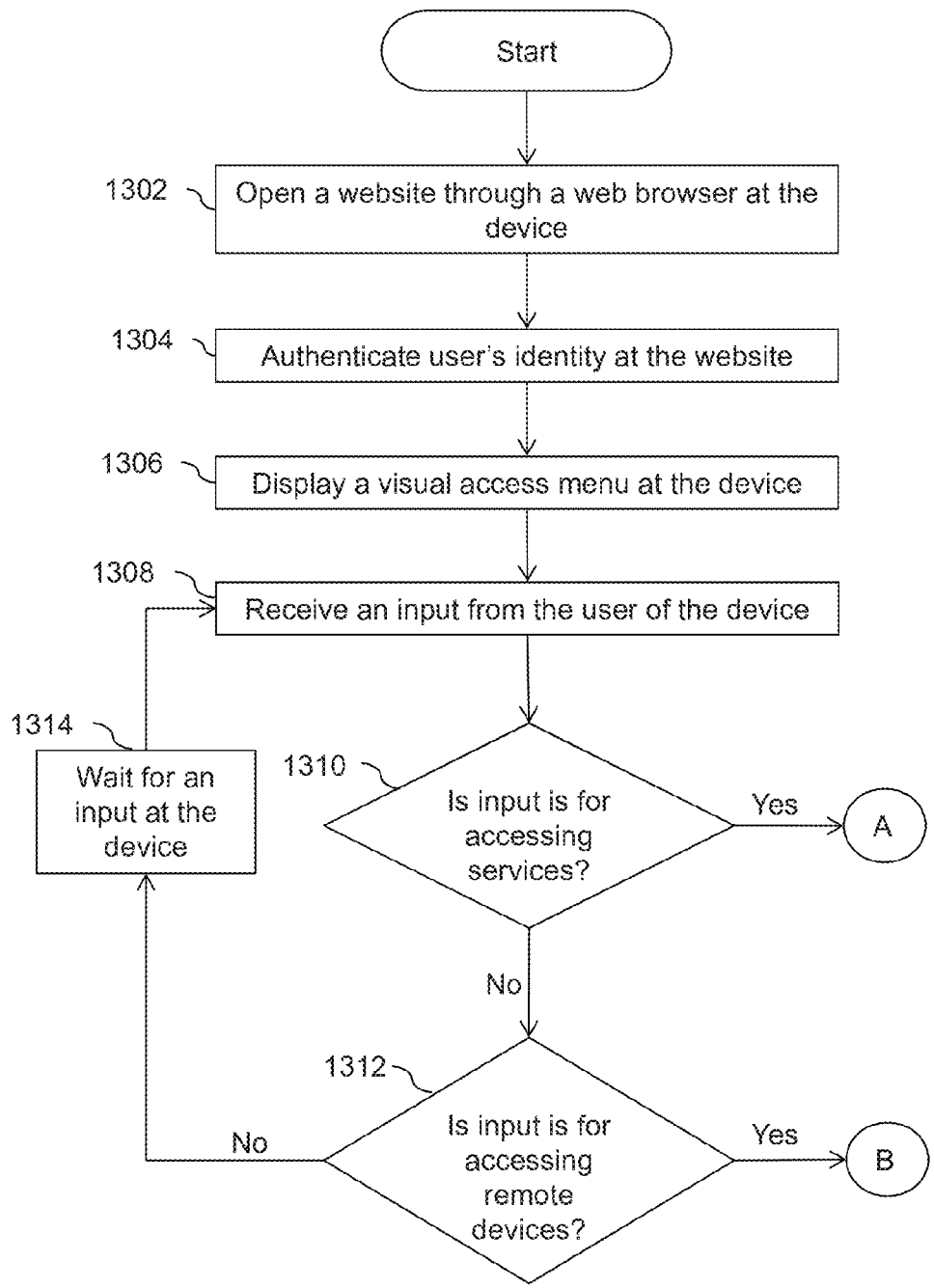
Figure 13B:
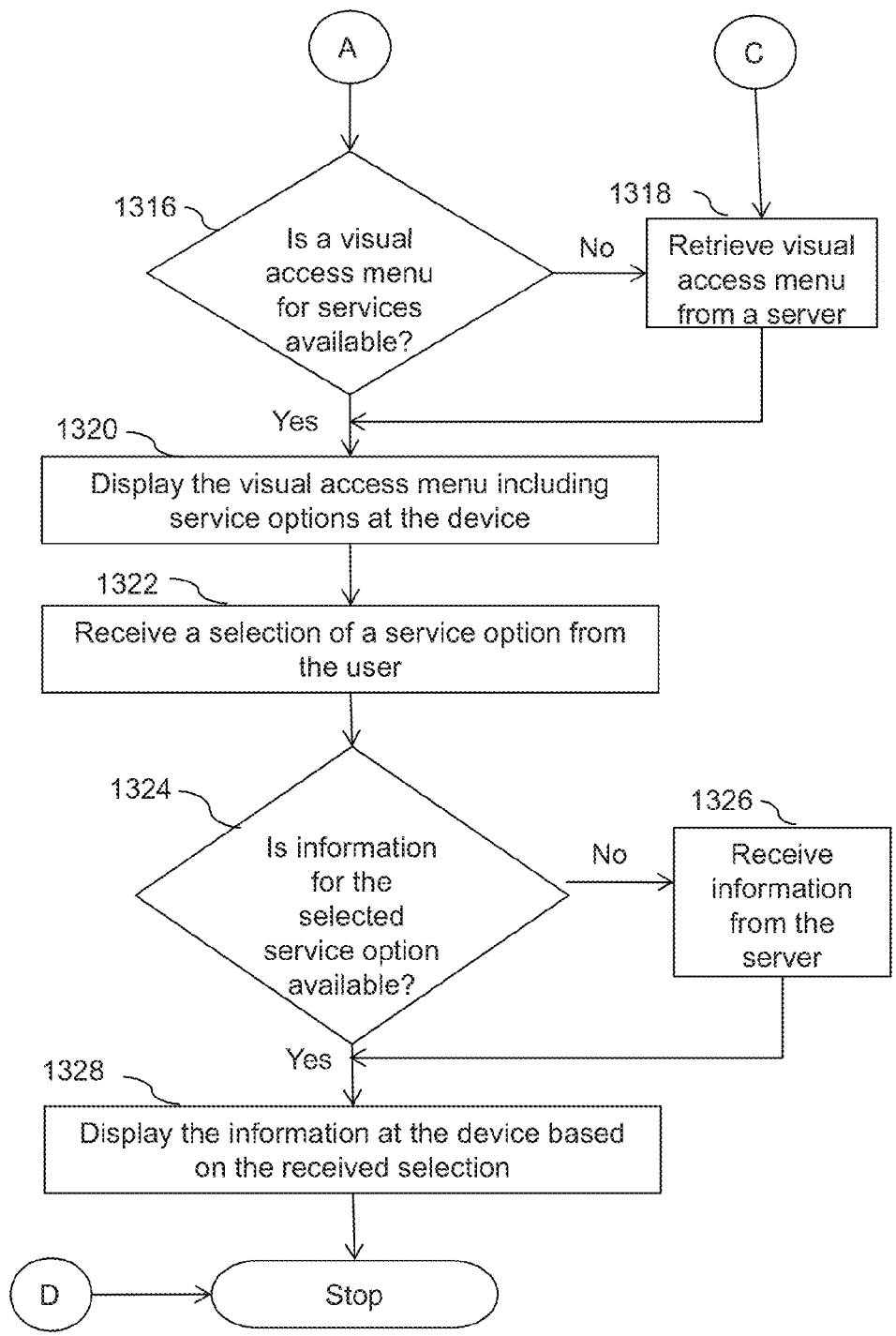
Figure 13C:
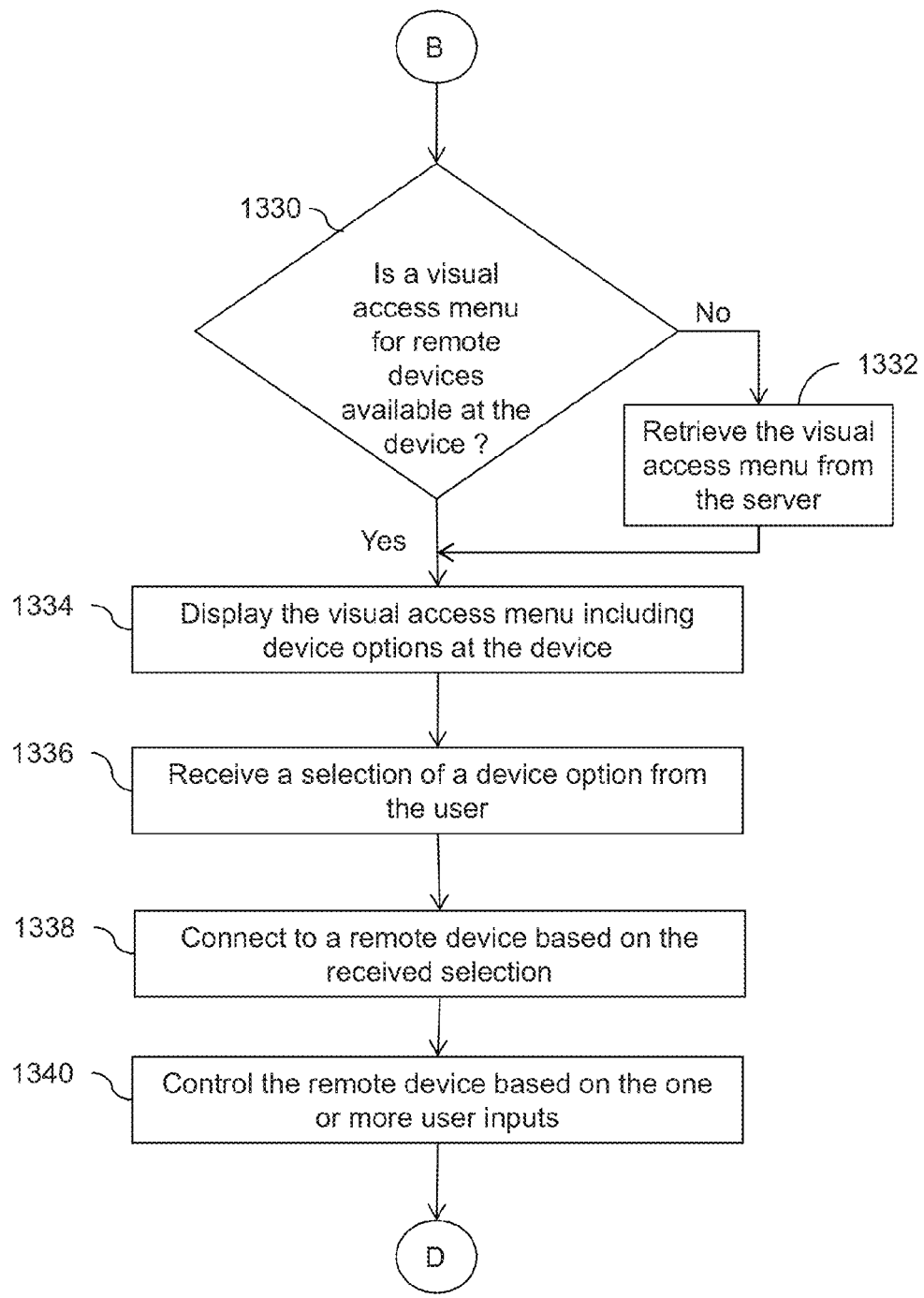
Figure 14:
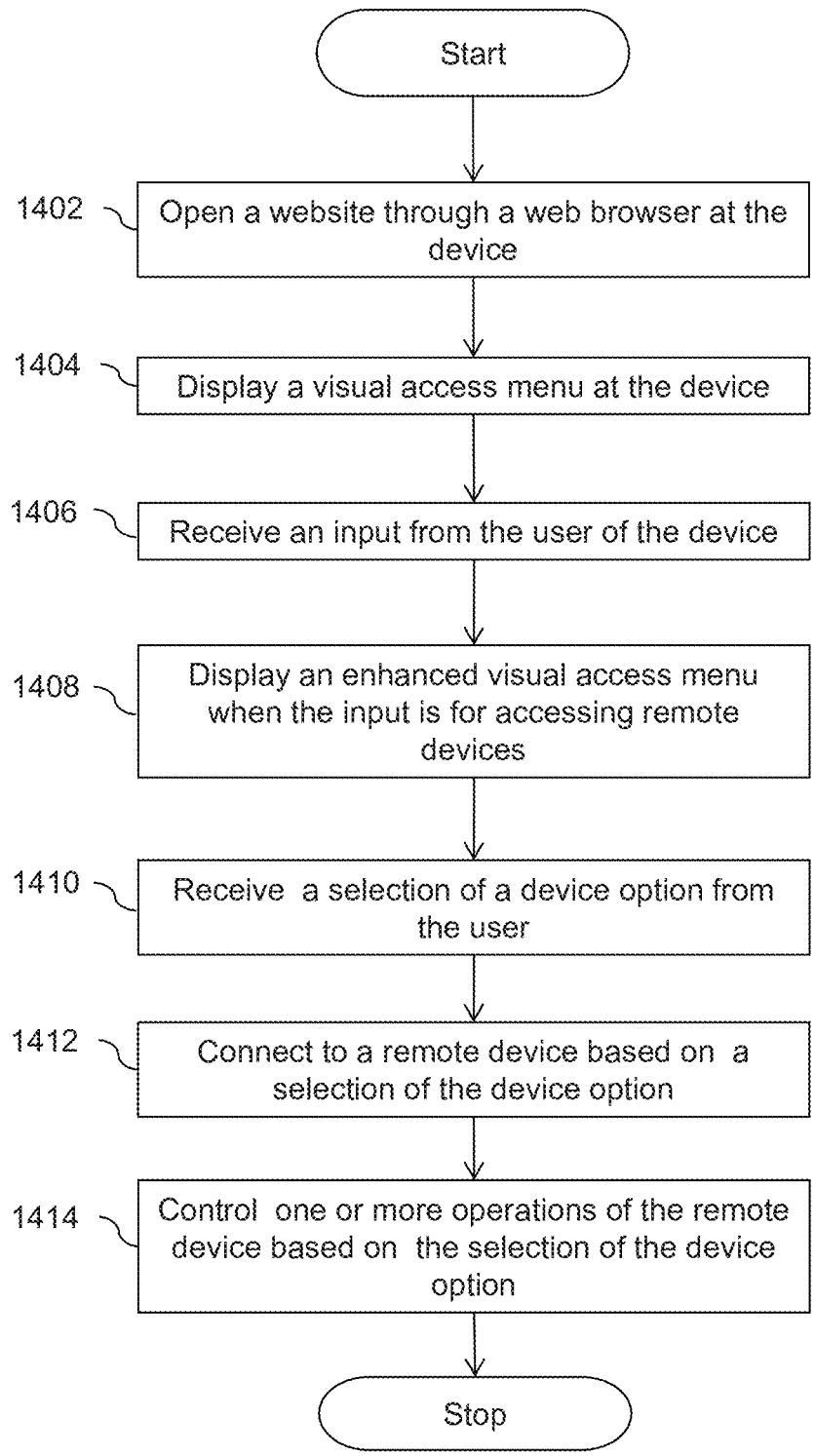
Figure 15:
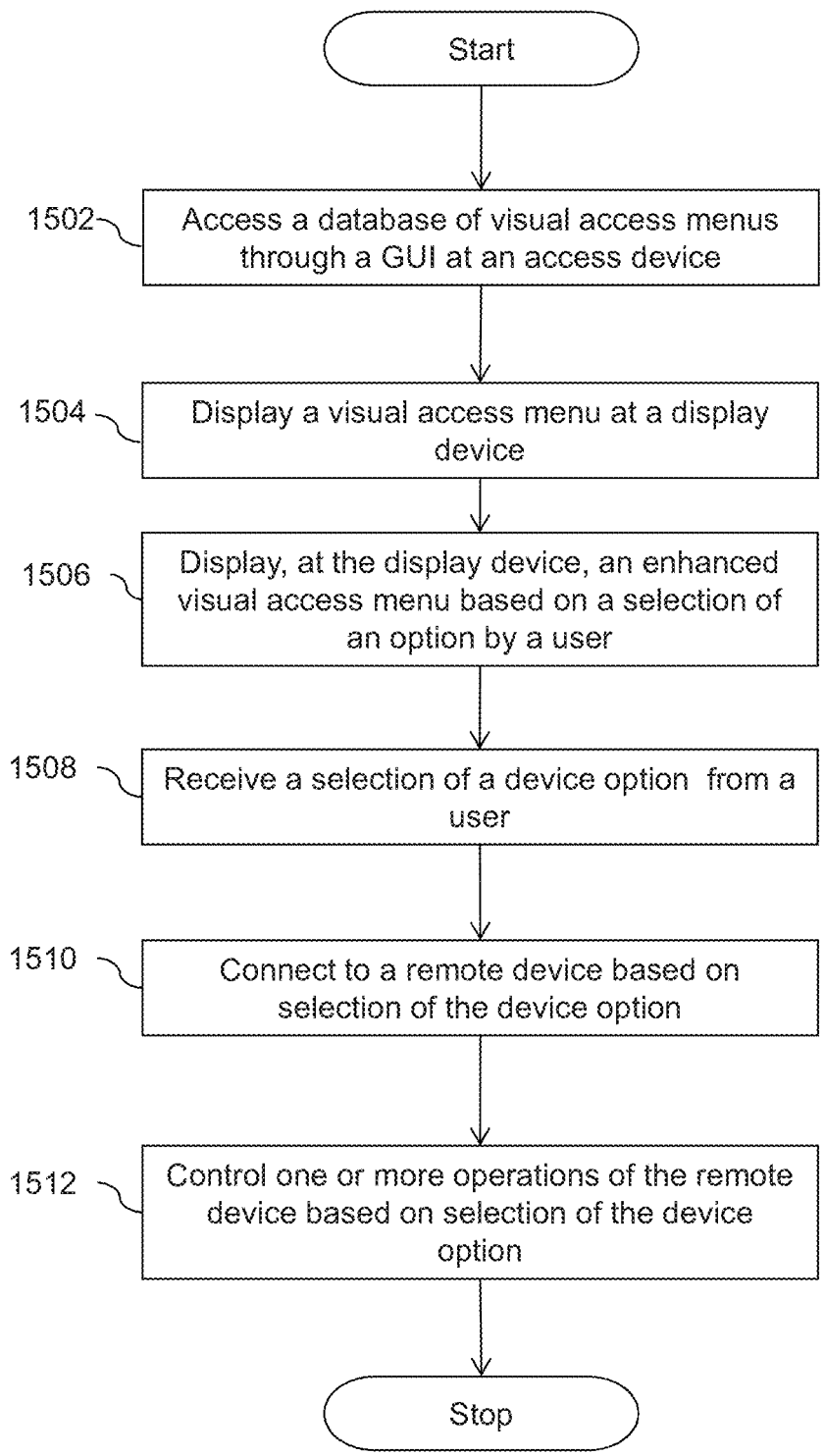
Figure 16:
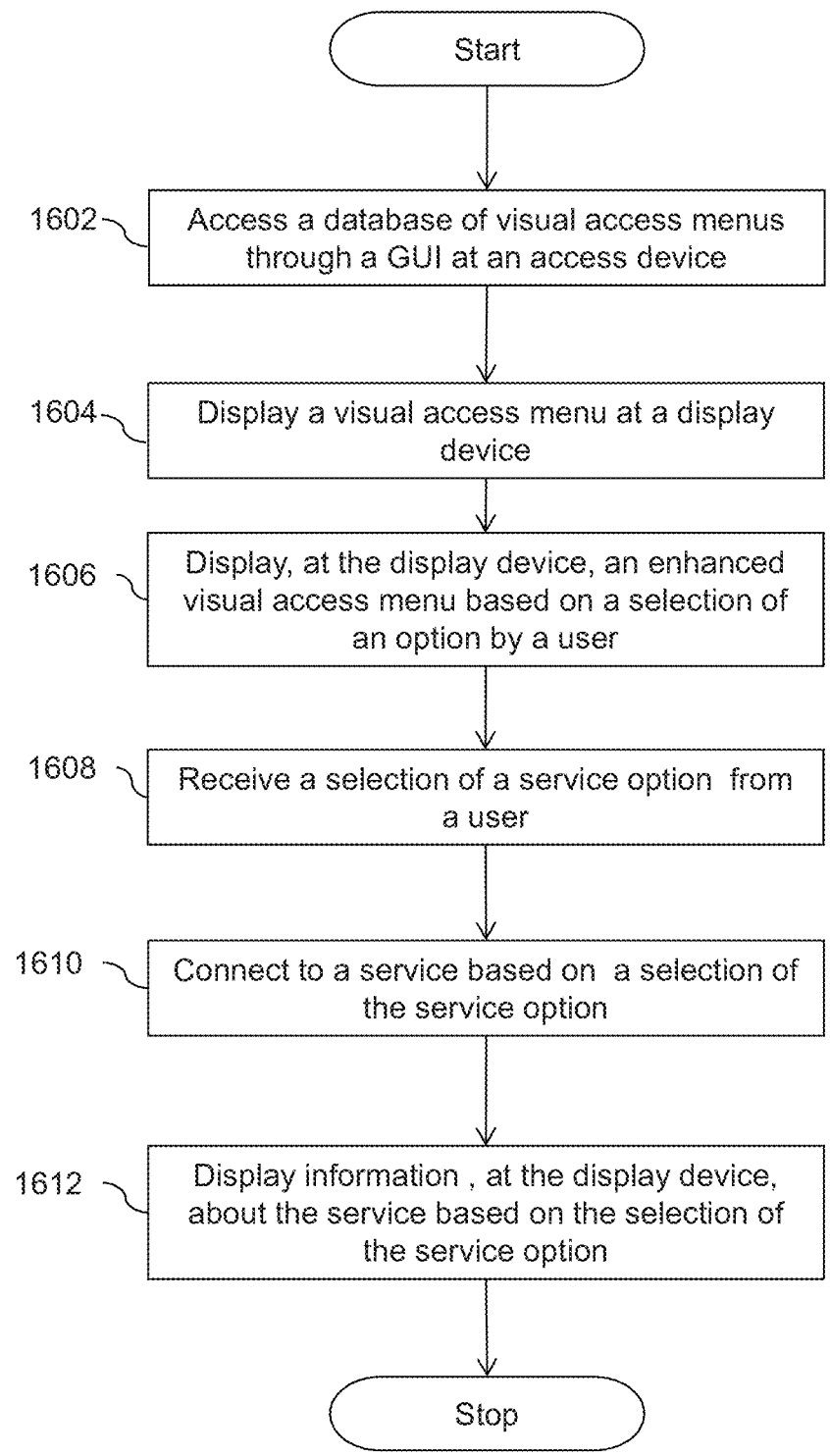
Figure 17A:
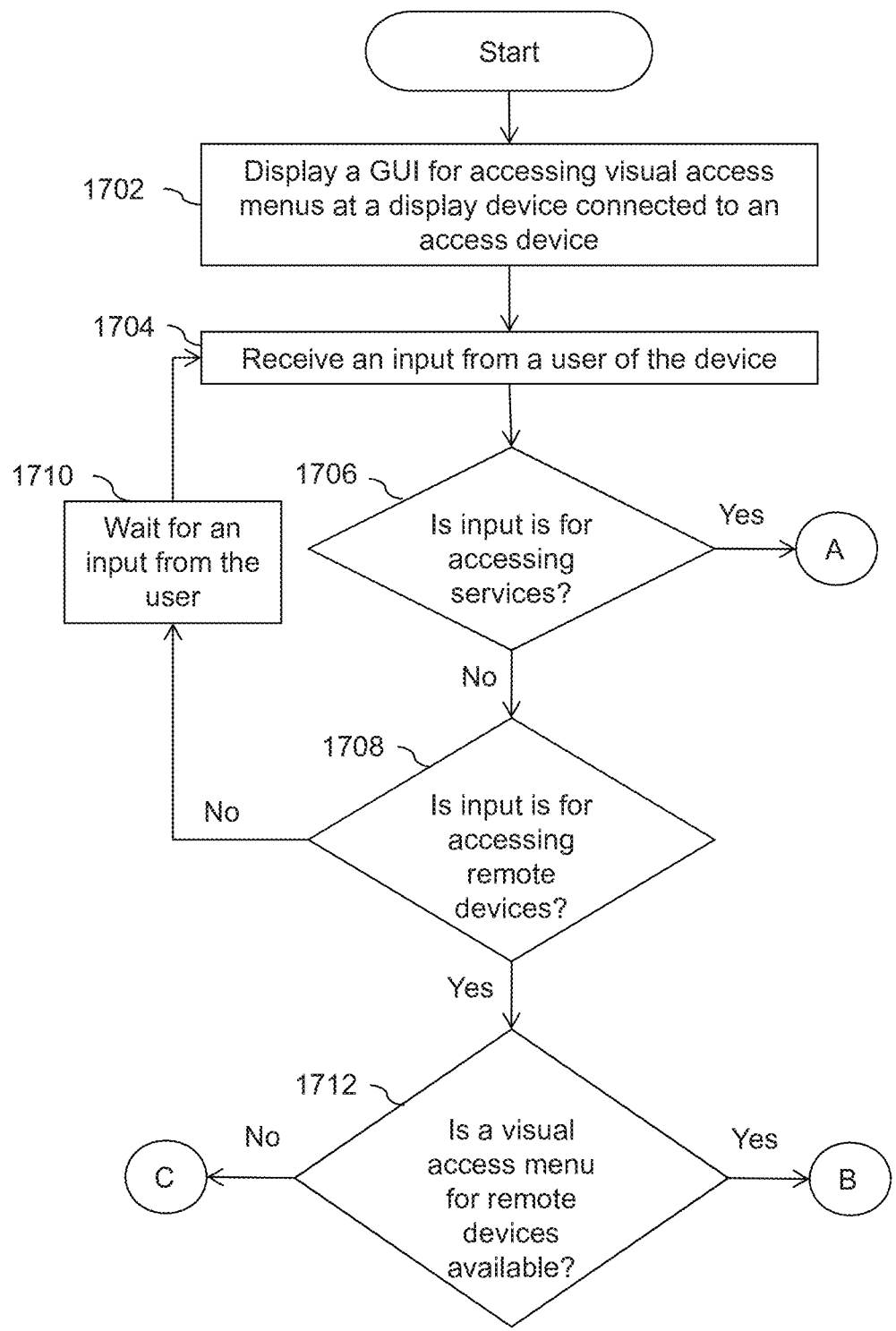
Figure 17B:
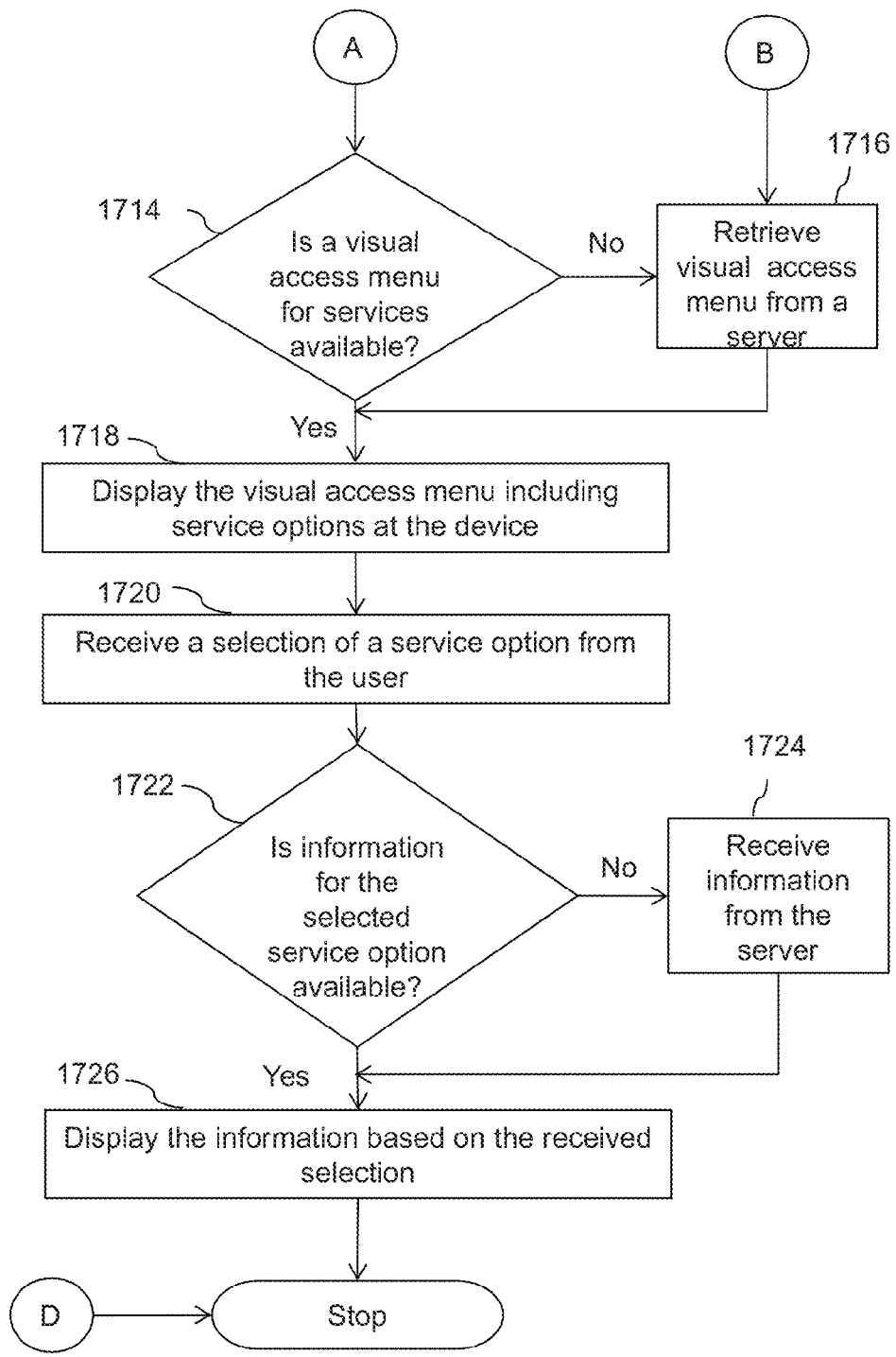
Figure 17C:
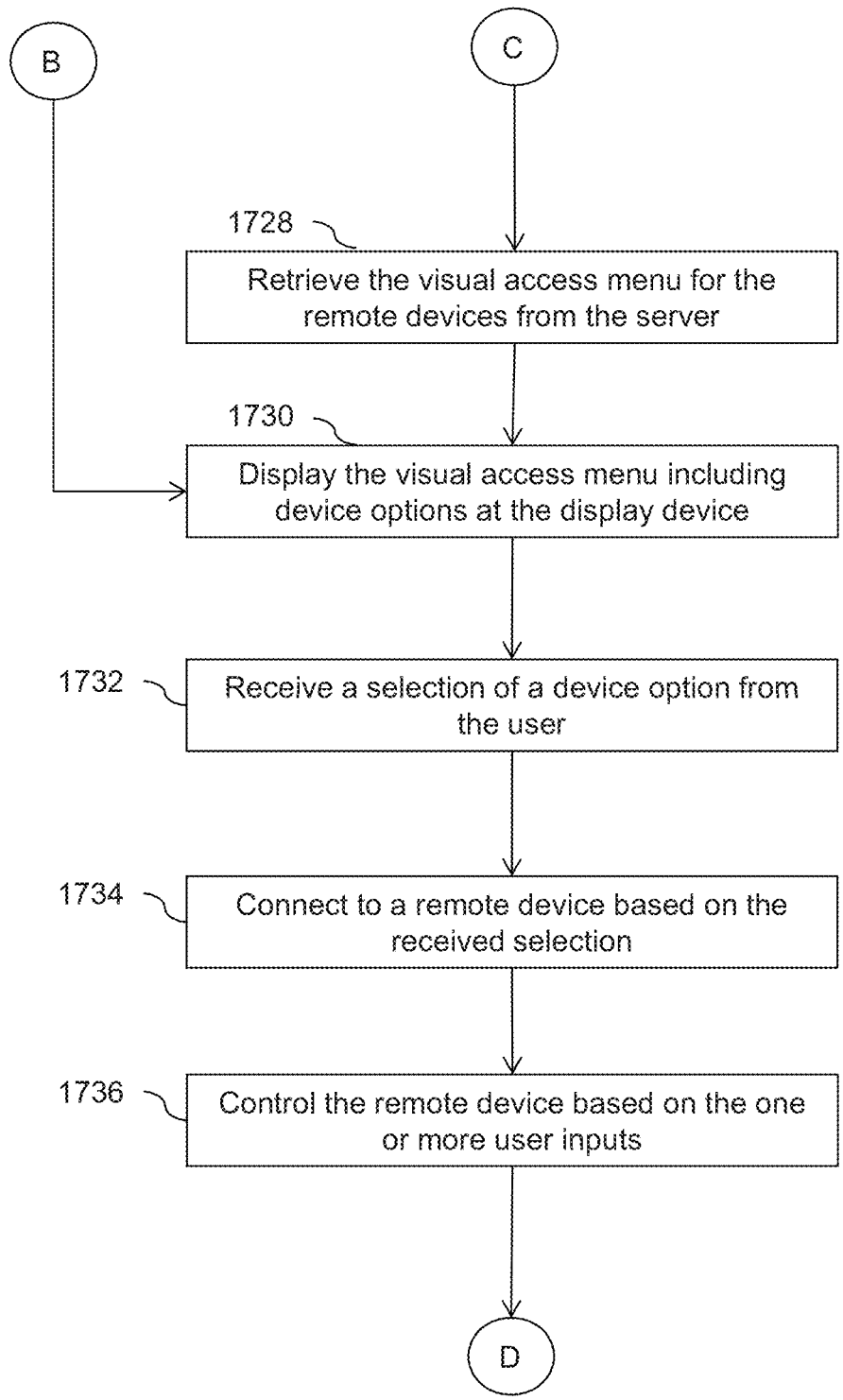
Figure 18A:
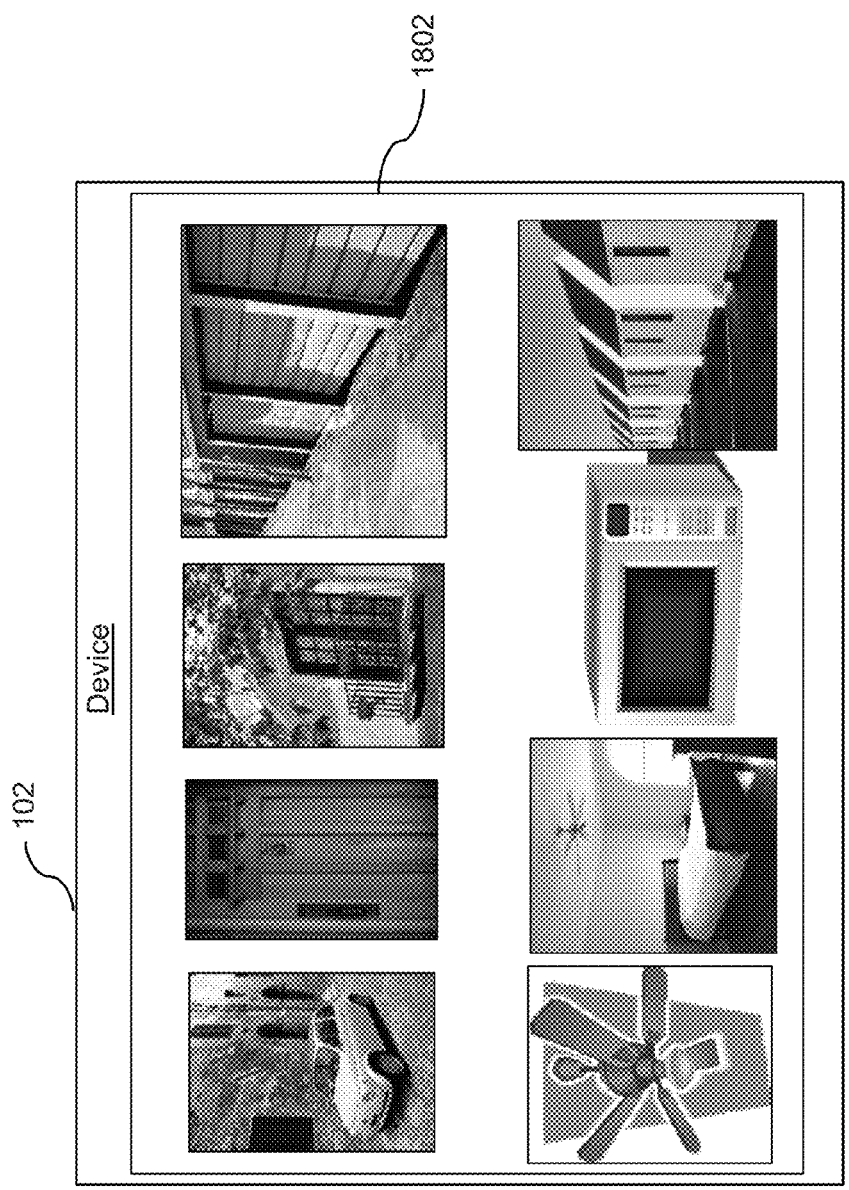
Figure 18B:
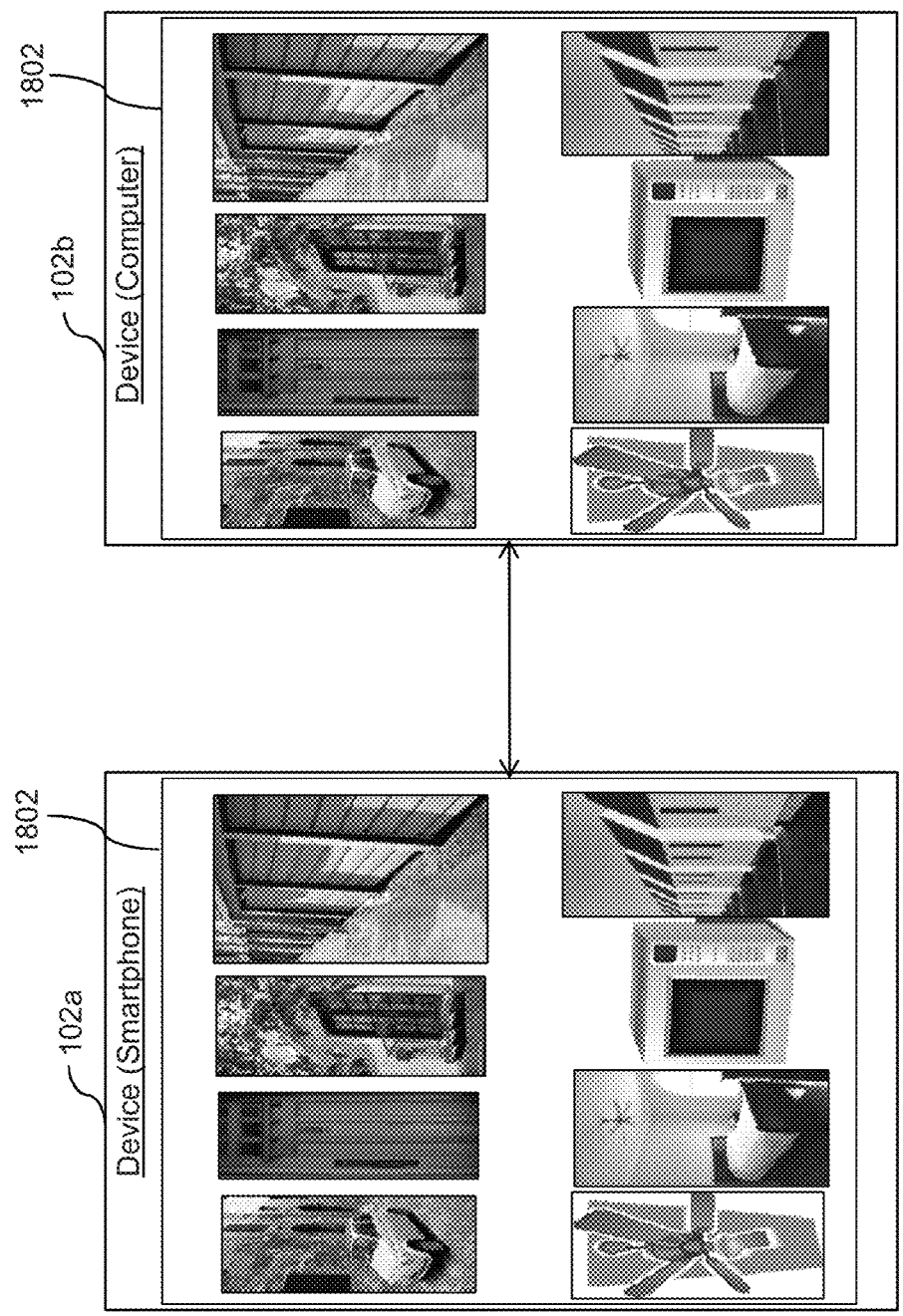
Figure 19:
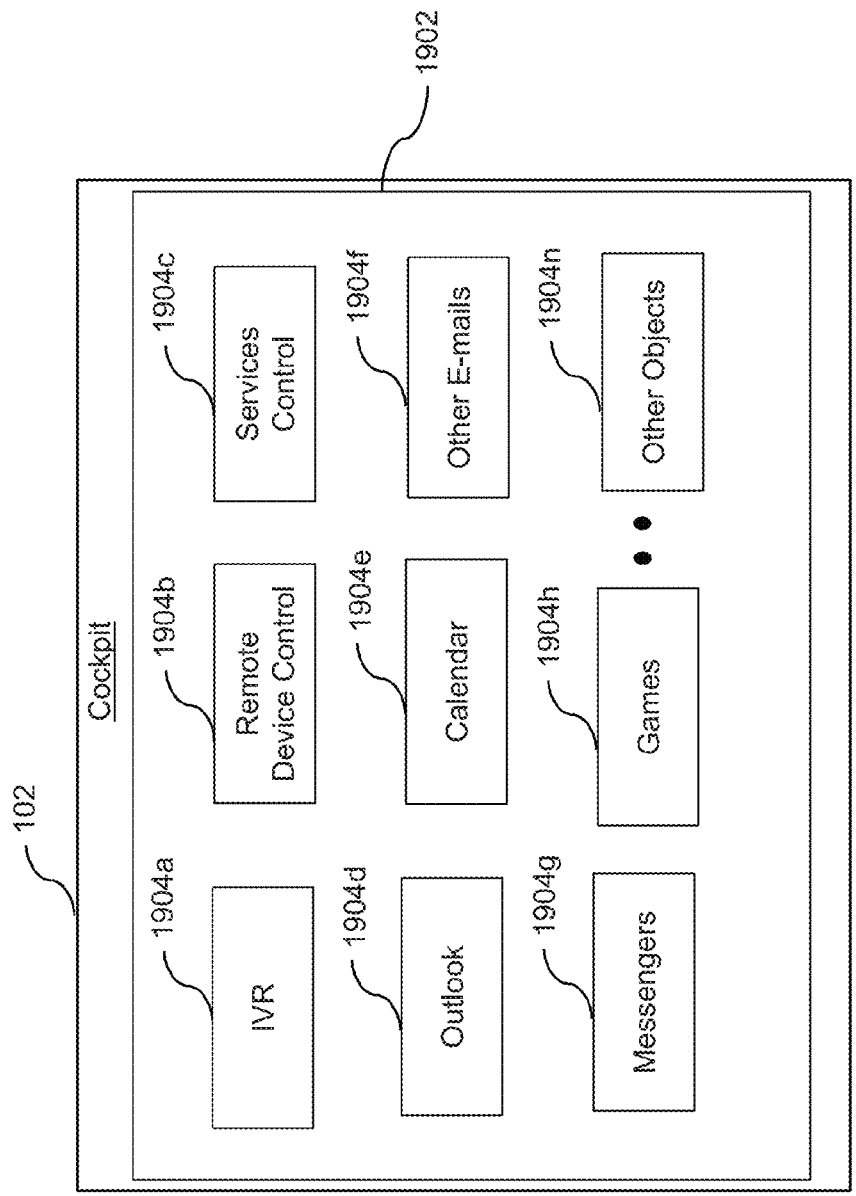
Figure 20A:
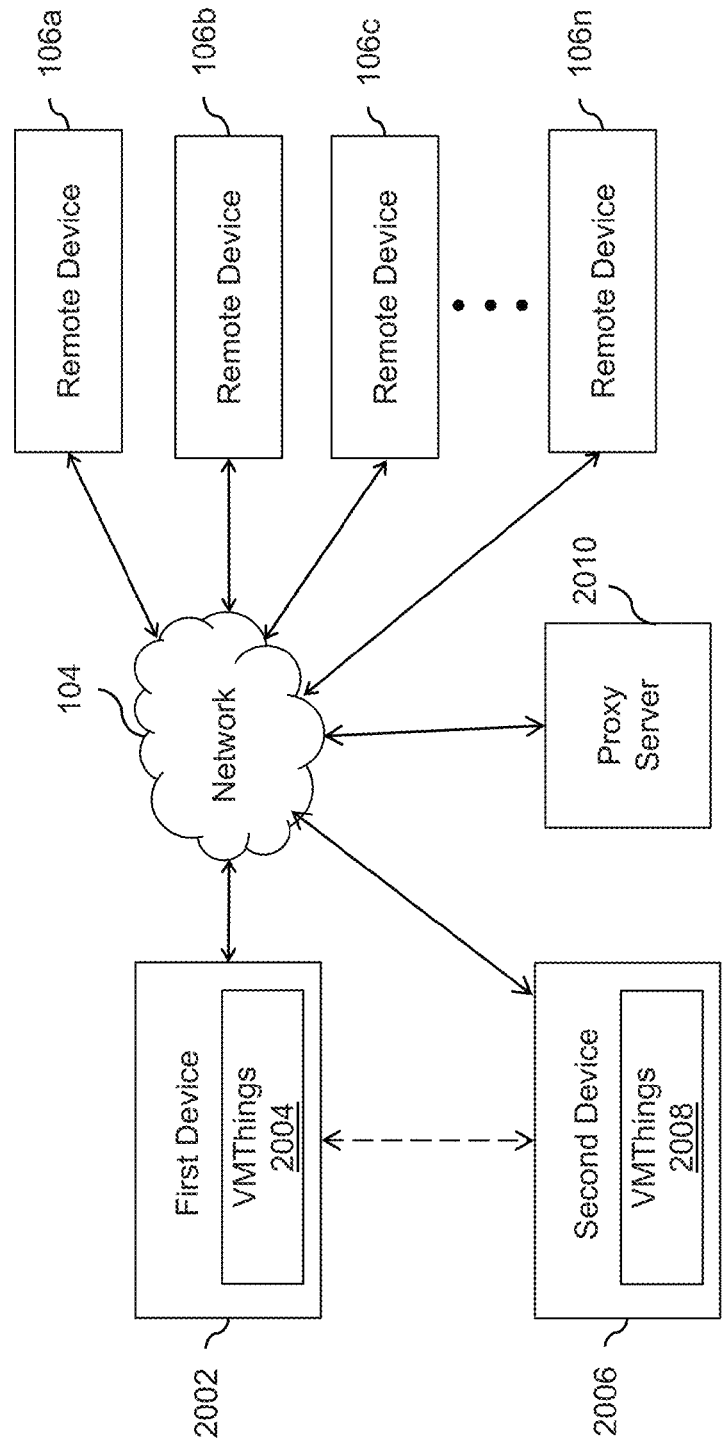
Figure 20B:
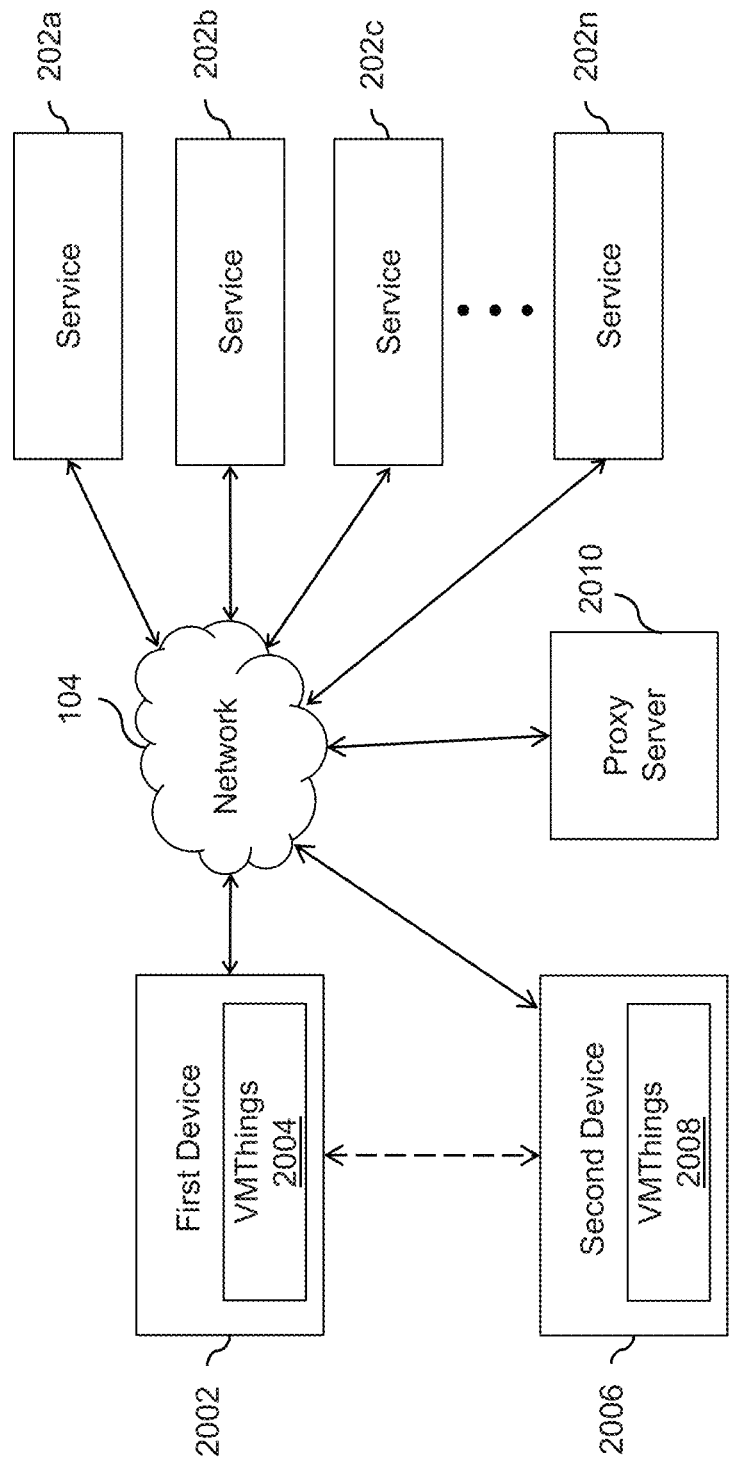
Figure 21:
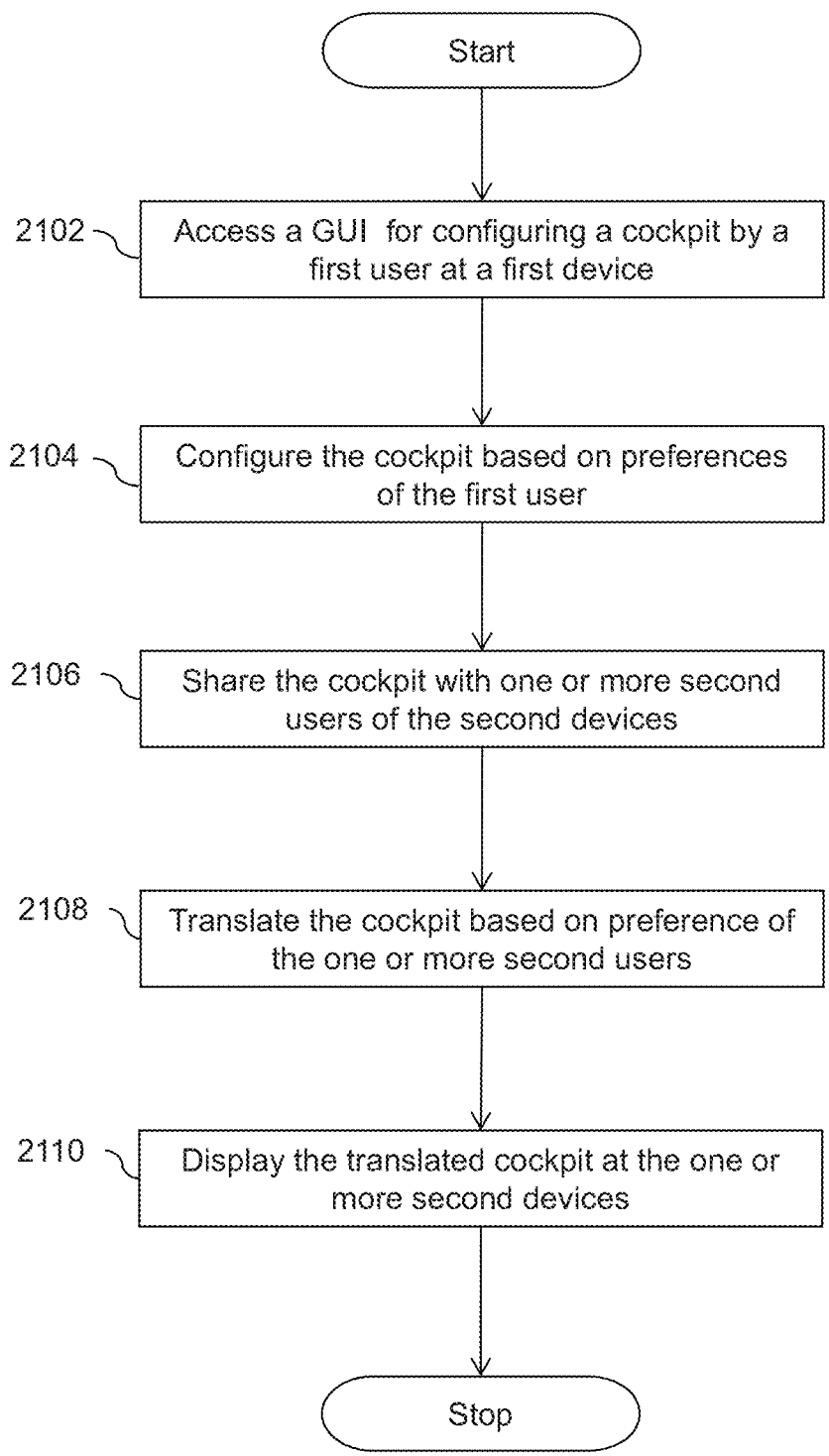
Figure 22A:
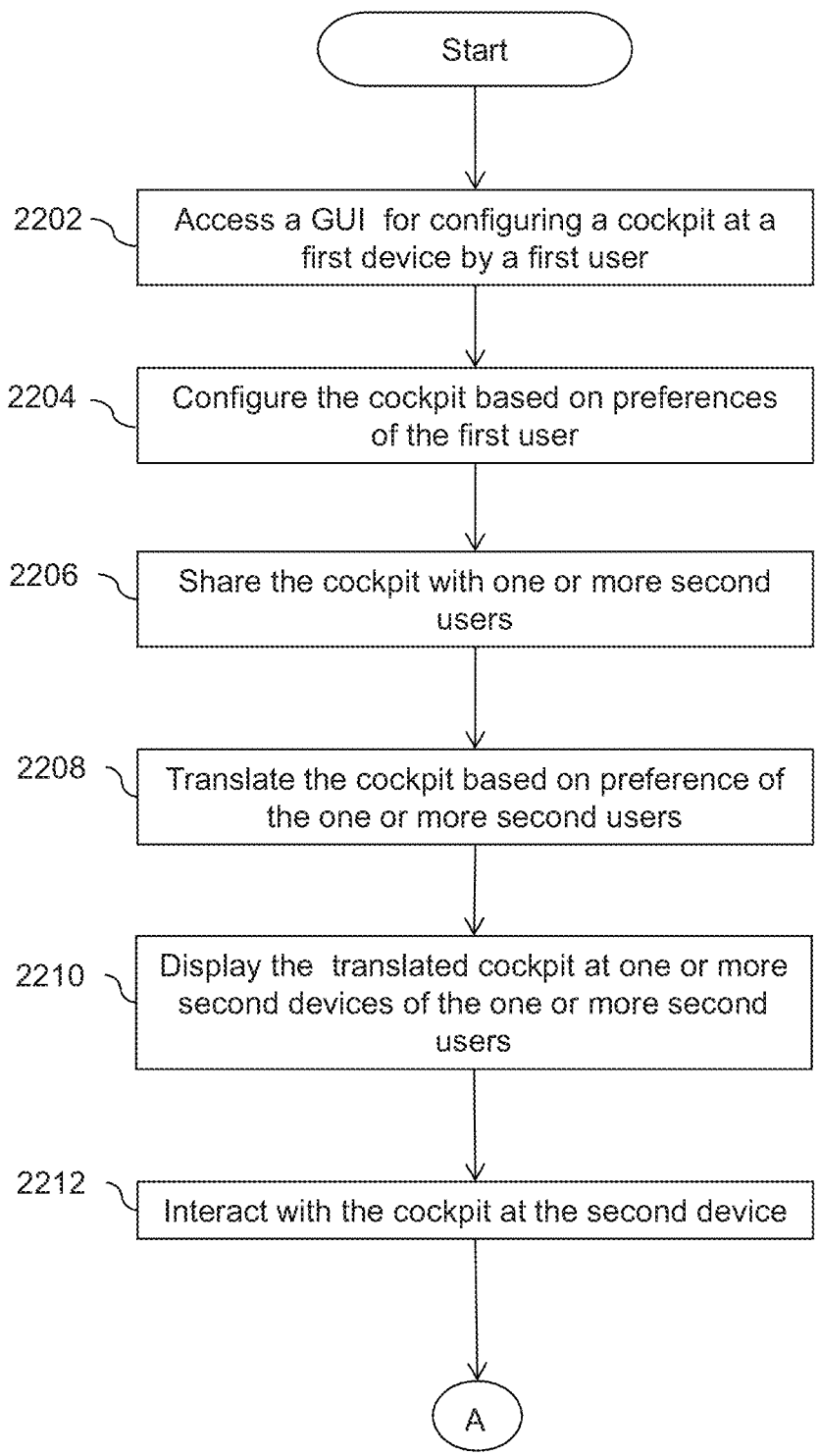
Figure 22B:
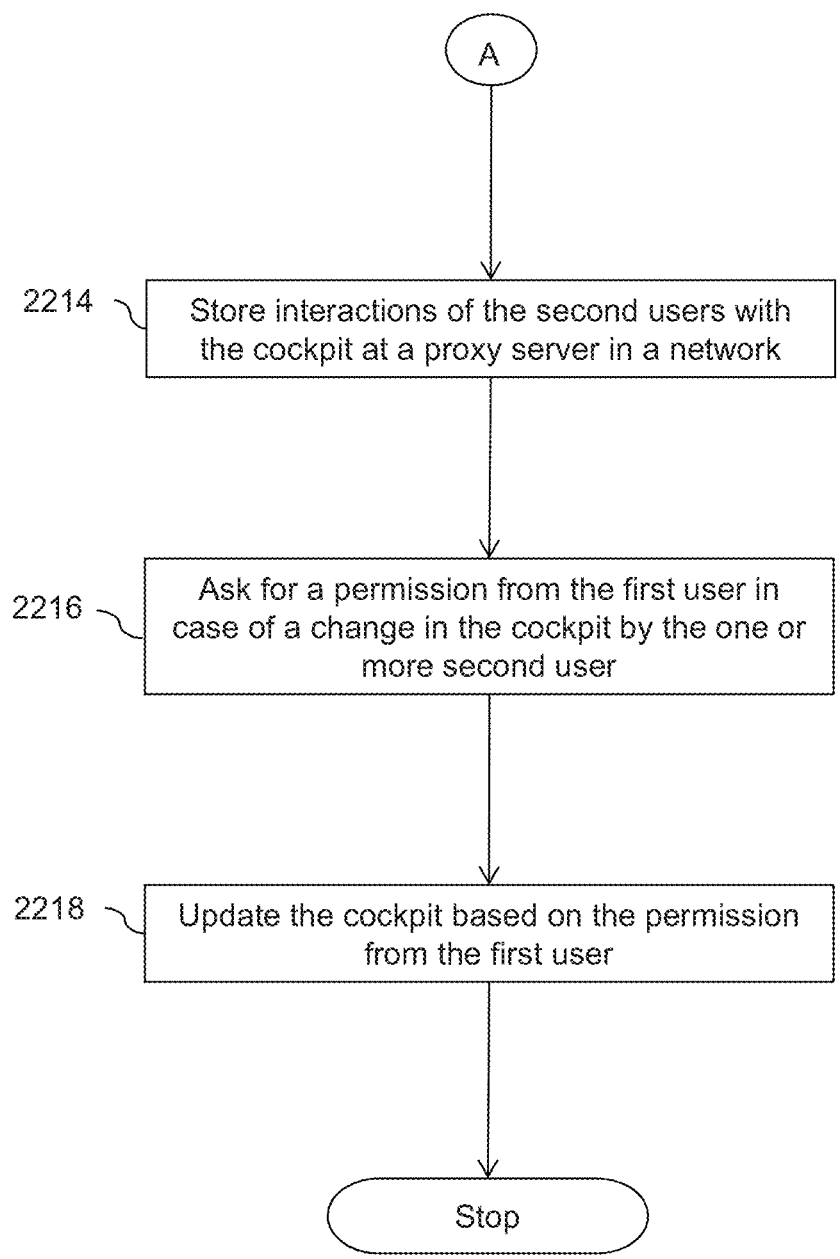

FIG. 6 illustrates exemplary components of a device, in accordance with an embodiment of the invention;

FIG. 7 illustrates exemplary components of an access device, in accordance with an embodiment of the invention;

FIG. 8 illustrates a flow diagram for controlling remote devices, in accordance with an embodiment of the invention;

FIG. 9 illustrates a flow diagram for controlling remote services, in accordance with an embodiment of the invention;

FIGS. 10A, 10B, and 10C illustrate a flow diagram for controlling objects by using a device in a network, in accordance with an embodiment of the invention;

FIG. 11 illustrates a flow diagram for controlling remote devices by using a web browser at a device, in accordance with an embodiment of the invention;

FIG. 12 illustrates a flow diagram for controlling remote services by using a web browser at a device, in accordance with an embodiment of the invention;

FIGS. 13A, 13B, and 13C illustrate a flow diagram for controlling objects in a network through a web browser at a device, in accordance with an embodiment of the invention; and FIG. 14 illustrates a flow diagram for controlling remote devices through a website, in accordance with another embodiment of the invention;

FIG. 15 illustrates a flow diagram for controlling remote devices by using an access device in a network, in accordance with an embodiment of the invention;

FIG. 16 illustrates a flow diagram for controlling remote services by using an access device in a network, in accordance with an embodiment of the invention;

FIGS. 17A, 17B, and 17C illustrate a flow diagram for controlling objects in a network devices through an access device, in accordance with an embodiment of the invention;

FIG. 18A illustrates an exemplary display of images of remote devices, in an embodiment of the invention;

FIG. 18B illustrates transfer of an exemplary display of images from a device to another device, in an embodiment of the invention;

FIG. 19 illustrates an exemplary display of a cockpit at the device, in accordance with an embodiment of the invention;

FIGS. 20A-20B illustrates exemplary environments for providing access of the cockpit of a user to other users, in accordance with an embodiment of the invention;

FIG. 21 illustrates a flow diagram for providing access control of the cockpit to one or more second users, in accordance with an embodiment of the invention; and FIGS. 22A and 22B illustrate a flow diagram for providing access control of the cockpit to one or more second users, in accordance with another embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1A illustrates an exemplary environment 100, in accordance with a first embodiment of the invention. The first embodiment describes functionality of an Internet of Things application i.e. a VMThings 108 for controlling a plurality of remote devices 106a-n. A user may create or configure an Internet of Things menu or cockpit for accessing or controlling the plurality of remote devices 106a-n at a device 102. In an embodiment of the invention, the VMThings 108 may configure or create the Internet of Things menu or the cockpit. The Internet of Things menu may include representations of one or more recognizable or identifiable objects such as, but are not limited to, remote devices 106a-n or services in an Internet or network like structure. The one or more identifiable objects may be physical or virtual objects. In an embodiment of the invention, a graphical user interface (GUI) may be used by the user for creating the Internet of Things Menu. The objects may be the remote devices 106a-n or services. The user may use the device 102 for connecting to a plurality of remote devices 106a-n through a network 104 through the Internet of Things menu. The device 102 may be used by the user to control a plurality of objects in the network 104. The VMThings 108 may control one or more operations of the plurality of objects. In an embodiment of the invention, the objects may include remote devices 106a-n. In another embodiment of the invention, the objects may be services as described in FIG. 2A-I. In yet another embodiment of the invention, the objects may be combination of the remote devices 106a-n and services. In an embodiment of the invention, the device 102 can be a portable device capable of communicating and connecting to other devices such as the remote devices 106a-n. The device 102 may have a display screen. In an embodiment of the invention, the device 102 may have a limited display or may not have a display at all. Example of the device 102 may include a mobile phone, a smart phone, a computer, a personal digital assistant (PDA), a tablet computer, a laptop, and so forth.

The network 104 can be a wired network or a wireless network or a combination of these. The wireless network may use wireless technologies to provide connectivity among various devices. Examples of the wireless technologies include, but are not limited to, Wi-Fi, WiMAX, fixed wireless data, ZigBee, Radio Frequency 4 for Consumer Electronics network (RF4CE), Home RF, IEEE 802.11, 4G or Long Term Evolution (LTE), Bluetooth, Infrared, spread-spectrum, Near Field Communication (NFC), Global Systems for Mobile communication(GSM), Digital-Advanced Mobile Phone Service (D-AMPS). The device 102 is connected to the plurality of remote devices 106a-n through the network 104. Examples of the wired network include, but are not limited to, Local Area Network (LAN), Metropolitan Area Network (MAN), Wide Area Network (WAN), and so forth. In an embodiment of the invention, the network 104 is the Internet.

The plurality of remote devices 106a-n can be electronic equipments such as, but are not limited to, household devices including electric lights, water pump, generator, fans, television (TV), cameras, microwave, doors, windows, computer, or garage locks, security systems, air-conditioners (AC), and so forth. In an embodiment of the invention, the plurality of the remote devices 106a-n can be vehicles such as cars, trucks, vans, and so forth. In an embodiment of the invention, the VMThings 108 may present a standard menu (or a standard visual access menu) for controlling all remote devices 106a-n to the user. The user may be provided with different visual access menus based on the location of the remote devices 106a-n. For example, the user may be displayed with different visual access menus for remote devices present in office, home, factory, and so forth. In another embodiment of the invention, the VMThings 108 may display a customized menu at the device 102 based on user preferences and/or access pattern. In an embodiment of the invention, the user may configure the VMThings 108 to control remote devices 106a-n present in more than one building. The buildings may be present at different locations. Similarly, the user may control the one or more remote devices 106a-n located in his/her office from the home. For example, the user may control door of his/her office cabin, may switch on or switch off his/her office computer/laptop, AC, and so forth. In an embodiment of the invention, the user may control operations of one or more remote devices 106a-n present in a factory from the home. Further, the user may access the plurality of remote devices 106a-n from a remote location by using the device 102. Further, the user may use the same device 102 for controlling the remote devices located at different locations such as office, factory, home, etc. The user doesn't have to carry different or multiple devices for controlling different remote devices 106a-n. The device 102 may include a database including a list of one or more objects. In an embodiment of the invention, the device 102 may include audio or visual menus of the one or more objects i.e. of the remote devices 106a-n. The device 102 may include visual access menus and/or enhanced visual access menus corresponding to various objects. The visual access menu may provide an interface to the user to control the one or more objects such as remote devices 106a-n. The visual access menu may include one or more options such as, but are not limited to a remote devices option, services option, and so forth. In an embodiment of the invention, the visual access menus at the device 102 may be updated regularly at predefined time interval such as after every two days, or once a week. The enhanced visual access menus may include one or more device options. In an embodiment of the invention, the device 102 may include a touch sensitive display. In such a scenario, the user may access the one or more options or the device options by touching the options directly. In an embodiment of the invention, the user may connect to the one or more objects such as the remote devices 106a-n through applications such as, but are not limited to, Skype, Google Talk, Yahoo Messenger, Magic Jack, and so forth.

Further, the device 102 may include the VMThings 108 which is configured to enable the user to access the visual access menus through a Graphical User Interface (GUI) at the device 102. The VMThings 108 may enable the user to control the remote devices 106a-n irrespective of their location through the network 104. The VMThings 108 may display the one or more visual access menus at the device 102. Further, the device 102 may include visual access menus associated with at least two independent objects. In an embodiment of the invention, the two at least two independent objects may be produced by two independent vendors, In an embodiment of the invention, the device may include vendor specific visual access menus or enhanced visual access menus for the remote devices 106a-n. Further, the device 102 may also include standard menu(s) for accessing the objects. The VMThings 108 may display the visual access menu depending on the independent vendor(s) of the one or more objects. In another embodiment of the invention, the VMThings 108 may display a visual access menu which is not provided by either of the at least two independent vendors of the at least two independent objects. In an embodiment of the invention, the user may access and control one or more of the remote devices 106a-n from the remote location by using the device 102. For example, the user may use his smart phone to access and operate a microwave at his/her home from his/her office. Further, the user can use the device 102 at one location to monitor and regulate one or more operations of the remote devices 106a-n present at another location. The one or more operations may be, such as, but are not limited to, switch on, switch off, regulate, and so forth.

Further, the visual access menus may include at least one icon indicating one or more objects such as the remote devices 106a-n. Further, the icon is substantially different than the icons provided in the visual access menu provided by the vendor. Further, the remote devices 106a-n may be grouped into various categories such as, but are not limited to, electronics appliances, home devices, buildings, doors, room appliances, switches, floor wise, and so forth. Further, the remote devices 106a-n may be grouped according to location of the remote devices, such as home devices, office devices, garages devices, factory devices, farm house devices, and so forth. The VMThings 108 of the device 102 may store visual access menus and enhanced visual access menus corresponding to the remote devices 106a-n based on the various categories of the remote devices 106a-n. Each of the remote devices 106a-n may have a unique remote device identity (ID). In an embodiment of the invention, the user may require to register the remote devices 106a-n with the device 102 so that the remote devices 106a-n may be controlled by using the VMThings 108. In an embodiment of the invention, the user may be required to authenticate or prove his/her identity at device 102 or for the remote devices 106a-n before controlling one or more operations of the remote devices 106a-n.

Further, the VMThings 108 may display an enhanced visual access menu corresponding to the remote devices 106a-n. The enhanced visual access menu may include one or more device options. The device options may be displayed as graphics or icons and/or text representations of the remote devices 106a-n. For example, a car may be displayed for representing the car option. The user may control the remote devices 106a-n by selecting a device option from the device options at the device 102. Further, the enhanced visual access menu may display the grouping or categories of the remote devices 106a-n. The VMThings 108 may also translate the visual access menu or the enhanced visual access menu from a first language to a second language. Examples of the first language and the second language may include, but are not limited to, Spanish, French, English, Sanskrit, Hindi, Urdu, Arabic, and so forth. For example, the VMThings may translate an English visual access menu into a French visual access menu and thereafter, it may be displayed at the device 102. The VMThings 108 may display the visual access menu or the enhanced visual access menu at the device 102 based on the user's preferred language.

The user may select an option from the visual access menu or an enhanced visual access menu. Further, the user may select an option (or device options) by using a combination of keys on a keypad of the device 102. In an embodiment of the invention, the user may select an option by clicking the option or the device option by using a mouse device. In an embodiment of the invention, the user may select an option by touching the screen of the device 102. For example, if the user wants to switch on an air conditioner (AC) on way towards home, the user can select or enter an appropriate key combination on the device 102 or may touch (in case of touch sensitive display at the device 102) an option of the visual access menu corresponding to the AC.

In one embodiment, the user can give a voice command to the device 102. Based on the input received by the device 102, the air conditioner may be switched on automatically. Further, the user can also regulate the cooling of the room by changing temperature settings of the air conditioner. After connecting the device 102 to one or more of the remote devices 106a-n, the user can control the one or more operations such as, but are not limited to, switch on, switch off, reduce temperature, and so forth from a distant location without being physically present at the location. In one embodiment, the remote devices 106a-n can be security cameras or alarm station installed at the home location of the user.

In an embodiment of the invention, the user may select an option by making gestures or hand movements at the device. For example, the user may do a thumb up gesture to switch on an appliance at home or may do a thumb down gesture to switch off the same. Similarly, the user may do other gestures such as, but are not limited to, waving a hand, nodding head, smiling, blinking an eye, and so forth. In an embodiment of the invention, the device may include a camera for detecting the gestures or hand movements. In an embodiment of the invention, the VMThings 108 may be configured to analyze and interpret the gestures and hand movements. Further, the VMThings 108 may include stored gestures defined by the user at device 102 and may compare or match the real time gestures with the stored gestures. The device may include a software or hardware such as microphone for detecting the voice commands or audio inputs.

In another embodiment of the invention, the VMThings 108 may be configured to analyze the voice commands and audio inputs received from the user through voice recognition. Further, the user may select the option from an Internet of Things menu through voice command(s) for controlling the remote devices 106a-n. The device 102 may include a list of voice commands and action to be taken corresponding to each command. The VMThings 108 may compare and match the received voice command with the stored list and thereafter may take an action based on the comparison. In an exemplary scenario, the user at office may switch on the AC present at home by accessing the visual access menu and saying "switch off the AC" on the device 102 (or a smart phone). In an embodiment of the invention, speech/voice recognition may be used to analyze the voice instructions or commands received from the user to control the remote devices 106a-n. In an embodiment of the invention, the device 102 may receive a call from the one or more objects such as a remote device. In such a case, the VMThings 108 may display a visual access menu of the calling object.

In an embodiment of the invention, the VMThings 108 may determine location of the device or the plurality of objects such as the remote devices 106a-n. In an embodiment of the invention, the selection of the option may be automatic based on one or more predefined instructions of the user of the device 102. For example, the predefined instruction may be like switch on the AC at 6 PM, switch off the TV at 2 PM, and close the door of the garage. The remote devices 106a-n may be controlled according to these predefined instructions irrespective of the location of the user or the device 102.

In an embodiment of the invention, one or more signals may be generated and transmitted by the device 102 based on the selection of the option or an input received from the user. The signals may be transmitted to the remote devices 106a-n through the network 104. The remote devices 106a-n may be controlled based on the signals received from the device 102. In an embodiment of the invention, the device 102 may receive an alert message(s) regarding the operational condition of the remote devices 106a-n. For example, an alert message like 'Car door left opened' may be received by the user at his/her mobile phone for a car standing in a parking area. In an embodiment of the invention, the alert message may be received through at least one of an SMS, an MMS, an instant message, an e-mail, a phone call, turn on of display of device when it's off, and so forth. In another embodiment of the invention, the user may further receive alert message as pop messages at the device 102, at a GPA system, at a multi function display of a car of the user, at a TV, at a picture frame, and so forth. Thereafter, the user may control or operate the car door through his/her smart phone and from the office itself. There is no need for him to rush to the parking area for closing the door. In an embodiment of the invention, the user may receive alert messages at a predefined time period. For example, the user may receive the alert messages regarding the connected remote devices 106*a-n* after every 1 hour, 2 hour, 30 minutes, and so forth.

Further, the displayed Internet of Things menu or the visual access menu may extend or change based on the user selection of the option from the visual access menu. In another embodiment of the invention, the device 102 may receive images, videos, audios, related to the remote devices 106*a-n* at the predefined time period. Further, the device 102 may receive real-time information, such as, but is not limited to, images, video etc. of the plurality of the remote devices 106*a-n*. In an exemplary scenario, the user can monitor and control real-time operation of the remote devices 106*a-n* such as one or more vehicles based on the information received through the network 104. For example, the user can receive images or videos of the one or more vehicles on the device 102. Further, the VMThings 108 may display these images of remote devices 106*a-n* to the user. The user can send instructions or voice response to the one or more vehicles through the network 104. For example, the user can track position of the one or more vehicles in real-time from the device 102 at another location.

In an embodiment of the invention, the enhanced visual access menus corresponding to the remote devices 106*a-n* may be stored at a server 114 in the network 104. As discussed with reference to FIG. 1B, the user of the device 102 may access the visual access menus corresponding to the remote devices 106*a-n* through a web browser in an exemplary environment 200. The environment 200 may include the device 102 such as a smart phone capable of connecting to the network 104 (or the Internet) via the web browser. In an embodiment of the invention, the remote devices 106*a-n* may be controlled via a local wireless communication or local network. In an embodiment of the invention, the remote devices 106*a-n* may be connected to a bridge device that may further be connected to the Internet. The web browser may be used to connect to the Internet and in turn to the local network. Examples of the web browser include, but are not limited to, Internet Explorer, Google Chrome, Mozilla Firefox, Netscape Navigator, and so forth. The user can enter a Uniform Resource Locator (URL) such as, 'www.ABC.com' in the web browser to access a website including a database. The database at the website may store a plurality of visual access menus or Internet of Things menu or cockpit or enhanced visual access menus associated with the remote devices 106*a-n*. The enhanced visual access menus are visual access menus corresponding to the remote devices 106*a-n*. Each of the enhanced visual access menus may include one or more device options. In an embodiment of the invention, the database may be present in the network 104.

A webpage 110 may be displayed at the device 102 corresponding to the URL entered by the user. The user may be required or asked to authenticate his/her identity before accessing the visual access menus. The displayed webpage 110 may include one or more data request fields 112*a-b* where the user may enter his/her details. In an embodiment of the invention, the user may access various visual access menus by authenticating at the website by entering his/her login details such as, but are not limited to, password, used ID, e-mail ID, date of birth, and so forth, in the one or more data request fields 112*a-b*. Though not shown, but a person skilled in the art will appreciate, that the webpage 110 may include more than two data request fields 112*a-b*. The one or more of options of the visual access menus or the enhanced visual access menus may be displayed to the user at his/her device 102.

In an embodiment of the invention, the user may create personalized visual access menus for controlling his/her personal devices of the remote devices 106*a-n*. In an embodiment of the invention, the user may configure or create an Internet of things menu for controlling remote devices. The Internet of Things menu may include a plurality of representations corresponding to identifiable objects such as the remote devices 106*a-n*. Further, the user may customize the Internet of Things menu based on his/her preferences such as, but not limited to, language preference, theme preference, color preference, font size preference, device preference, service preference, and so forth. The VMThings 108 may display customized or personalized visual access menu at the device 102. In an embodiment of the invention, the VMThings 108 may display visual access menu at a second display connected to the device 102. The user may select an option from the multiple options of the visual access menu. The enhanced visual access menu (or the Internet of Things menu) may be displayed at the device based on the selection of an option by the user at the device 102. In an embodiment of the invention, a connection may be established between the user device 102 and the remote devices 106*a-n* based on the selection of the option by the user. Thereafter, the user can access and control the remote devices 106*a-n* irrespective of a location of the user. The user may not have to be in front of or close to the remote device 106*a-n* for controlling the operations of the remote devices 106*a-n*.

FIG. 1C illustrates another exemplary environment 300, in accordance with the first embodiment of the invention. An access device 116 may be connected to a display device 118. The access device 116 may access and control the plurality of remote devices 106*a-n* connected through the network 104. The access device 116 may be any device capable of data and/or voice communications through the network 104 or the remote devices 106*a-n*. Examples of the access device 116 include, but are not limited to, a router, a telephone, a set top box, a hub, a gateway, a printer, a music system, a mobile phone, a PDA, a smart phone, a picture frame, and so forth. In an embodiment of the invention, the access device 116 may not have a display or may have limited display capability. The access device 116 may include a plurality of ports for connecting to the network 104, and/or the display device 118. The plurality of ports can be such as, but are not limited to, parallel ports, serial ports, DB-2 connector, IEEE 1284, IEEE 1394 ports, 8P8C ports, PS/2 ports, RS-232 ports, Registered Jack (RJ) 45 ports, RJ 48 ports, VGA port, Small Computer System Interface (SCSI) ports, USB ports, DB-25 ports, and so forth.

Examples of the display device 118 may include, but are not limited to, a television, a Liquid Crystal Diode (LCD) display, a Light Emitting Diode (LED) display, a projector screen, a computer, a laptop, a tablet computer, a picture frame, a tablet computer, and so forth. The access device 116 may provide a network interface to the display device 118. The user may use the access device 116 for connecting to the network 104. Moreover, the user can access the remote devices 106*a-n* connected to the network 104 by using the access device 116. In this embodiment of the invention, once connected with the remote devices 106a-n the visual access menus or the Internet of Things menus may be displayed to the user at the display device 118. In an embodiment of the invention, the user may have to authenticate and/or one or more login details before viewing the visual access menus. The user may authenticate or enter his/her personal details at the access device 116. In an embodiment of the invention, the user may authenticate or enter the personal details at the display screen.

In an embodiment of the invention, the access device 116 may be a home controller device. The user may access the VMThings 108 by logging into this home controller and may view the visual access menus at his device 102 or a display device 116. After logging into the home controller the user may control the objects i.e. remote devices or services associated with the home controller. Therefore, the user may control the one or more objects by using a combination of devices such as the home controller, smart phone, another display device, and so forth.

The access device 116 may include an Internet of Things application i.e. VMThings 108 application for accessing the visual access menus and the enhanced visual access menus. The VMThings 108 may display the visual access menus at the display device 120. The user may connect to the remote devices 106a-n by selecting one or more options of the visual access menus. Further, the remote devices 106a-n may be grouped into various categories such as, but are not limited to, electronics appliances, home devices, buildings, doors, room appliances, electric switches, cars, windows, and so forth. Further, the remote devices 106a-n may be grouped according to location, such as home devices, office devices, garages devices, and so forth. The of the access device 116 may store visual access menus and enhanced visual access menus according to the various categories of the remote devices 106a-n at the access device 116. Further, the user may control any remote device from the remote devices 106a-n by selecting one or more options from the visual access menu or the Internet of Things menu. In an exemplary scenario, the user can connect to the network 104 by using a telephone and may view the visual access menu on a screen of the television. Thereafter, the user may access and control the remote devices 106a-n from the telephone by pressing appropriate keys/buttons of the telephone.

In an embodiment of the invention, the user may register the remote devices 106a-n or do some settings at the access device 116 or the remote devices 106a-n, so that the user may control the remote devices 106a-n from the VMThings 108. In an embodiment of the invention, the user may be required to authenticate or prove his/her identity at the access device 116 or for the remote devices 106a-n before controlling one or more operations of the remote devices 106a-n.

FIG. 1D illustrates an environment based on a ZigBee network 120, in accordance with the first embodiment of the invention. As shown, the access device 116 may include the VMThings 108 for displaying a visual access menu or an enhanced visual access menu or an Internet of Things menu at the display device 118. The access device 116 may connect to the remote device 106a-n through the ZigBee network 120. In an embodiment of the invention, the remote devices 106a-n may be connected to the ZigBee network 120 through a local network such as a LAN, a NFC network, a Bluetooth network, and so forth. The local network may be connected to the ZigBee network 120 through some gateway device such as bridge, router, hub, gateway device, switch, and so forth.

FIG. 1E illustrates an environment based on a WiMAX network 122, in accordance with the first embodiment of the invention. As shown, the access device 116 may include the VMThings 108 for displaying the Internet of Things menu or the visual access menu or the enhanced visual access menus at the display device 118. The access device 116 may connect to the remote devices 106a-n through the WiMAX network 122. In an embodiment of the invention, the remote devices 106a-n may be connected to the WiMAX network 122 through a local network such as a LAN, NFC network and so forth. In an embodiment of the invention, the user may require to register the remote devices 106a-n or do some settings at the access device 116 or the remote devices 106a-n, so that the user may control the remote devices 106a-n from the VMThings 108. In an embodiment of the invention, the user may be required to authenticate or prove his/her identity at the access device 116 or for the remote devices 106a-n before controlling one or more operations of the remote devices 106a-n. The user may access the visual access menus and enhanced visual access menus at the access device 116 through a GUI. The VMThings 108 may enable the user to control the remote devices 106a-n irrespective of the location of the remote devices 106a-n. For example, the user may control operations of the air conditioner located in his/her factory by being at home itself. The user may not have to be physically present at the factory or near the air conditioner for controlling the operations of the air conditioner. The user may do the same through the VMThings 108 of the access device 116 (or the device 102).

FIG. 1F illustrates an environment based on a Global System for Mobile Communication (GSM) network 124, in accordance with the first embodiment of the invention. As shown, the access device 116 may be connected to the remote devices 106a-n through the GSM network 124. Though not shown, but a person skilled in the art will appreciate that the access device 116 may be connected to the remote devices 106a-n through other networks, such as, but are not limited to, an RF4CE network, an NFC network, an HSPA network, a LAN, a WAN, a $3^{rd}$ generation network, a $4^{th}$ generation network, a CDMA network, an EV-DO network, and so forth.

FIG. 1G illustrates an environment based on the ZigBee network 120, in accordance with the first embodiment of the invention. As shown, the device 102 may include the VMThings 108. A user may configure an Internet of Things menu by using the VMThings at the device 102. The user of the device 102 may connect to the remote devices 106a-n by using the VMThings 108 through the GUI at the device 102. Further, the device 102 may be connected to the remote devices 106a-n through the ZigBee network 120. In an embodiment of the invention, the device 102 may be connected to other wireless network such as the WiMAX network 122, as shown in FIG. 1H.

FIG. 1I illustrates an environment based on a combination of a local network 126 and the Internet 130, in accordance with the first embodiment of the invention. The remote devices 106 a-n may be connected to a local network 126. The local network 126 can be a private network, a wireless network, and so forth. The local network 126 in turn may be connected to an external or public network such as, but are not limited to, the Internet 130 through a bridge device 128. The device 102 may connect to the remote devices 106a-n through the Internet 130. The local network 126 and the Internet 130 may be connected to each other through other devices such as, but are not limited to, a router, a hub, a switch, a gateway, and so forth.

In an embodiment of the invention, the VMThings 108 may display an advertisement or multiple advertisements along with the visual access menu at the device 102. In an embodiment of the invention, the VMThings may display the advertisement or multiple advertisements along with an Internet of Things menu at the device 102. In an embodiment of the invention, the advertisement(s) are selected and displayed based on the content of the displayed visual access menu or the Internet of Things menu. For example, if the visual access menu is for controlling the home appliances, then the advertisements may be about home appliances such as AC, fans, etc. In an embodiment of the invention, the visual access menu and/or advertisements may be displayed at a second display or a display device such as a picture frame, LCD, television, and so forth connected to the device 102. Further, the visual access menus and the advertisements may be displayed at the display device or the second display through wireless means such as Wi-Fi, Bluetooth, ZigBee, and so forth.

FIG. 2A illustrates an exemplary environment 400, in accordance with a second embodiment of the invention. The user 102 may use the device 102 to connect to a plurality of services 202a-n through the network 104. The user can access the information about the services 202a-n at the device 102. As discussed with reference to FIG. 1A, the device 102 can be a portable or hand-held device capable of communicating and connecting to the network 104 or other devices such as the remote devices 106a-n. Example of the device 102 may include a mobile phone, a smart phone, a computer, a personal digital assistant (PDA), a tablet computer, a laptop etc. The network 104 can be a wired network such as a Local Area Network (LAN) or a Wide Area Network (WAN) or a wireless network such as a WiMAX network or a combination of these. Examples of the services 202a-n include, but are not limited to, banking services, travel services, entertainment services, railways services, movies services, restaurants, and so forth. Further, the banking services may be categorized as insurance services, retail banking services, internet banking services, loans service, NRI banking, and so forth. The entertainment services may be accessed by the user to get information about music, movies, theatre, news, cartoons, or sports. For examples, the user may access movies services to know the new releases in movies. The information about services may be displayed in form of an enhanced visual access menu. The user may interact with the enhanced visual access menu accordingly.

In an embodiment of the invention, the VMThings 108 may display an Internet of Things menu at the device 102. The Internet of things menu may include representations of one or more recognizable or identifiable objects such as, but are not limited to, remote devices 106a-n or services in an Internet or network like structure. The one or more identifiable objects may be physical or virtual objects. A graphical user interface (GUI) may be used by the user for creating the Internet of Things Menu. In an embodiment of the invention, the objects may be the services 202a-n.

Further, the VMThings 108 may highlight a frequently accessed service option or preferred service option in the enhanced visual access menu for the services 202a-n or the Internet of Things menu based on the user's previous access patterns. In an embodiment of the invention, the VMThings 108 may highlight one or more frequently accessed device options or preferred device options in the enhanced visual access menu for the remote devices 106a-n. Further, the VMThings 108 may store the user access pattern at the device 102. In an embodiment of the invention, the VMThings 108 may present a standard menu (or a standard visual access menu) for controlling all services 202a-n to the user. In another embodiment of the invention, the VMThings 108 may display a customized menu of services 202a-n at the device 102 based on user preferences and/or access pattern.

The device 102 may include a Graphical User Interface (GUI) to enable the user to access the services 202a-n. In an embodiment of the invention, the device 102 may include audio or visual menus of the services 202a-n. The device 102 may include visual access menus and/or enhanced visual access menus corresponding to the services 202a-n. The enhanced visual access menu may include one or more service options. The service options may be displayed as graphics or icons or text representing the services 202a-n. The user may control and get more information about the services 202a-n by selecting a service option from the service options at the device 102. In an embodiment of the invention, the user may select a service option by touching the screen of the device 102. For example, if the user wants more information about the travelling service, the user may select the travel service option. In one embodiment, the user can give a voice command to the device 102 for selecting a service option from the enhanced visual access menu. Further, the user may select an option by using a combination of keys on a keypad of the device 102. Further, the user may select a service option by using a mouse device. In an embodiment of the invention, the selection of the service option may be automatic based on the one or more predefined instructions of the user of the device 102. In an embodiment of the invention, the user may have to register him/her or the device 102 to access the services 202a-n. In an embodiment the user may have to authenticate his identity prior to accessing the services 202a-n. In an embodiment of the invention, the user may receive alert messages related to the services 202a-n. For example, the user may receive reminders about making a payment for his/her credit card bill. In another embodiment of the invention, the user may receive the alert messages regarding the connected services 202a-n at a predefined time period such as, but are not limited to, after every 1 hour, 2 hour, 30 minutes, and so forth. In an embodiment of the invention, the VMThings 108 may alert the user through at least one of by turning on the display of the device 102 from an off state and present a menu (visual access menu or Internet of Things menu or cockpit), presenting a menu in a pop up window, sending Short Messaging Service (SMS) message, sending a Multimedia Messaging Service (MMS) message, initiating a telephone call, and so forth. Further, the user may receive alert message as a pop up message at his/her Global Positioning System (GPS) device or a multi function display of his/her car or at screen of a television or at a mobile phone of the user, and so forth.

In another embodiment of the invention, the device 102 may receive images, videos, audios, related to the services 202a-n at the predefined time period. In an embodiment of the invention, the user may access or control the services 202a-n by giving voice commands or voice inputs. In an embodiment of the invention, the user may connect to the services 202a-n through applications such as, but are not limited to, Skype, Google Talk, Yahoo Messenger, Magic Jack, and so forth.

Further, the device 102 may include visual access menus associated with at least two independent objects or services. In an embodiment of the invention, at least two independent objects/services may be produced by at least two independent vendors. In an embodiment of the invention, the device 102 may include vendor specific Internet of Things menus or visual access menus or enhanced visual access menus for the services 202a-n. Further, the device 102 may also include standard menu(s) for accessing the objects. The VMThings 108 may display the visual access menu depending on the independent vendor(s) of the one or more objects. In another embodiment of the invention, the VMThings 108 may display a visual access menu which is not provided by either of the at least two independent vendors of the at least two independent objects. Further, the visual access menus may include at least one icon indicating the one or more services 202a-n. Further, the icon is substantially different than the icons provided in the visual access menu or the Internet of Things menu provided by the vendor. The VMThings 108 may display customized or personalized visual access menu or the Internet of Things menu at the device 102. In an embodiment of the invention, the VMThings 108 may display visual access menu or the Internet of Things menu at a second display connected to the device 102.

In an embodiment of the invention, speech/voice recognition may be used to analyze the voice instructions or commands received from the user to access the services 202a-n. In an embodiment of the invention, the device 102 may receive a call from the services 202a-n. In such a case, the VMThings 108 may display a visual access menu and/or an Internet of Things menu of the calling service. Further, the Internet of Things menu may include one or more options for interacting with the service from which call is received.

FIG. 2B illustrates another exemplary environment 500, in accordance with the second embodiment of the invention. In an embodiment of the invention, the visual access menus or the Internet of Things menu corresponding to the services 202a-n may be stored at the server 114 in the network 104. The user at the device 102 may access an enhanced visual access menu corresponding to the services 202a-n by using a web browser. The device 102 may be configured to connect to the network 104 (or the Internet) by entering a URL or a website address in the web browser. Examples of the web browser include, but are not limited to, Apple Safari, Internet Explorer, Google Chrome, Mozilla Firefox, Netscape Navigator, and so forth. The user can enter a URL or a website address in the web browser to access a database including a plurality of enhanced visual access menus corresponding to the services 202a-n. In an embodiment of the invention, the database may be present in the network 104.

A webpage 110 including the one or more data request fields 112a-b may be displayed at the device 102 based on the entered URL. The user may enter his/her details in the data request fields 112a-b for getting access to the database. Thereafter, at least one enhanced visual access menus to access the services 202a-n may be displayed to the user at the device 102. The user may access information about the one or more services 202a-n by interacting with the displayed enhanced visual access menus. In an embodiment of the invention, the webpage 110 may include at least one of images, audio/video files, text, hyperlinks, and so forth In an embodiment of the invention, a new visual access menu or a new Internet of things menu may be displayed when the user is directed to a new web site based on the user's input or selection. The new visual access menu may be an IVR menu or an Internet of Things menu associated with the new web site. Further, the new visual access menu may include options associated with the new web site.

FIG. 2C illustrates yet another exemplary environment 600, in accordance with the second embodiment of the invention. As discussed with reference to FIG. 1C, the user may use the access device 116 to access or control services 202a-n. The access device 116 may be any device capable of data and/or voice communications through the network 104. In an embodiment of the invention, the access device 116 may not have a display or may have limited display capabilities. The access device 116 can be such as, but are not limited to, a router, a telephone, a set top box, a hub, a gateway, a printer, a mobile phone, a smart phone, a PDA, a tablet computer, a walkie-talkie, and so forth. Further, the access device 116 may include a plurality of ports for connecting to the network 104 or the display device 118 such as a television or an LCD display. Examples of the plurality of ports include, but are not limited to, parallel ports, serial ports, DB-2 connector, IEEE 1284, IEEE 1394 ports, 8P8C ports, PS/2 ports, RS-232 ports, Registered Jack (RJ) 45 ports, RJ 48 ports, VGA port, Small Computer System Interface (SCSI) ports, USB ports, DB-25 ports, and so forth.

The access device 116 may provide a network interface to the display device 118. The user may use the access device 116 for accessing the one or more of the services 202a-n through the network 104. An enhanced visual access menu or an Internet of Things menu corresponding to the services 202a-n may be displayed to the user. Thereafter, the user may access the information about the services 202a-n accordingly. In an embodiment of the invention, the user may have to enter one or more login details for authenticating himself/herself to gain access to the one or more visual access menus. In an exemplary scenario, the user can connect to the network 104 by using a telephone and may view the visual access menu on a television screen. Thereafter, the user may access and control the services 202a-n from the telephone by selecting or dialing or pressing one or more combination of keys at the telephone.

In an embodiment of the invention, the VMThings 108 may display an advertisement or multiple advertisements along with the visual access menu at the display device 118. In an embodiment of the invention, the advertisement(s) are selected and displayed based on the content of the displayed visual access menu. For example, if the visual access menu is for controlling the banking services, then the advertisements may be about insurance and opening accounts. In an embodiment of the invention, the visual access menu and/or advertisements may be displayed at a second display or the display device 118 such as a picture frame, LCD, television, and so forth connected to the access device 116. Further, the visual access menus and the advertisements may be displayed at the display device 118 or the second display through wireless means such as Wi-Fi, Bluetooth, ZigBee, and so forth.

FIG. 2D illustrates an environment based on the ZigBee network 120, in accordance with the second embodiment of the invention. As shown, the access device 116 may include the VMThings 108 for displaying a visual access menu or an enhanced visual access menu including one or more service options at the display device 118. The access device 116 may access and/or connect to the services 202a-n through the ZigBee network 120. Examples of the services 202a-n include, but are not limited to, banking services, travel services, entertainment services, railways services, movies services, restaurants, hotels, and so forth. In an embodiment of the invention, the services 202a-n may be accessed through the ZigBee network 120 and the local network 126 such as a LAN, an NFC network, a Bluetooth network, virtual private network (VPN), and so forth. The local network may be privately monitored network with no or limited access to outside users. The local network 126 may be connected to the ZigBee network 120 through some gateway device such as the bridge device 128, a router, a hub, a gateway, a switch, and so forth.

FIG. 2E illustrates an environment based on the WiMAX network 122, in accordance with the second embodiment of the invention. As shown, the access device 116 may include the VMThings 108 for displaying a visual access menu or an enhanced visual access menu including one or more service options at the display device 118. The access device 116 may connect to the services 202*a-n* through the WiMAX network 122 Examples of the services 202*a-n* include, but are not limited to, banking services, travel services, entertainment services, railways services, movies services, restaurants, and so forth. In an embodiment of the invention, the services 202*a-n* may be connected to the WiMAX network 122 through a local network such as a LAN, an NFC network, and so forth. The local network 126 may be connected to the WiMAX network 122. In an embodiment of the invention, the user may require to register to the services 202*a-n* or do some settings at the access device 116 or the remote devices 106*a-n*, so that the user may control the services 202*a-n* (or remote devices 106*a-n*) from the access device 116. In an embodiment of the invention, the user may be required to authenticate or prove his/her identity at the access device 116 or the services 202*a-n* before accessing the services 202*a-n*. The user may access visual access menus and enhanced visual access menus at the access device 116 through a GUI. The VMThings 108 may enable the user to access and control the services 202*a-n* irrespective of the location of the user.

FIG. 2F illustrates an environment based on the Global System for Mobile Communication (GSM) network 124, in accordance with the second embodiment of the invention. As shown the access device 116 may be connected to the services 202*a-n* through the GSM network 124. Though not shown, but a person skilled in the art will appreciate that the access device 116 may be connected to the services 202*a-n* through other networks, such as, but are not limited to, an RF4CE network, an NFC network, an HSPA network, a LAN, a WAN, a $3^{rd}$ generation network, a $4^{th}$ generation network, a Code Division Multiple Access (CDMA) network, an EV-DO network, and so forth.

FIG. 2G illustrates an environment based on the ZigBee network 120, in accordance with the first embodiment of the invention. As shown, the device 102 may include the VMThings 108 for configuring or customizing or displaying an Internet of Things menu at the device 102 by a user. The Internet of Things menu may include representations of one or more recognizable or identifiable objects such as, but are not limited to, remote devices 106*a-n* or services in an Internet or network like structure. The one or more identifiable objects may be physical or virtual objects. A graphical user interface (GUI) may be used by the user for creating the Internet of Things Menu. The device 102 can be a portable device capable of communicating and connecting to the network 104 or other devices such as the remote devices 106*a-n*. Example of the device 102 may include, but are not limited to, a mobile phone, a telephone, a smart phone, a computer, a personal digital assistant (PDA), a tablet computer, a laptop, and so forth. A user of the device 102 may access to the services 106*a-n* by using the VMThings 108 through the GUI at the device 102. Further, the device 102 may be connected to the services 202*a-n* through the ZigBee network 120. In an embodiment of the invention, the device 102 may be connected to other wireless network such as the WiMAX network 122, as shown in FIG. 2H.

FIG. 2I illustrates an environment based on a combination of a local network and the Internet, in accordance with the first embodiment of the invention. The services 202*a-n* may be interconnected through the local network 126. The local network 126 can be a private network, a wireless network, a VPN and so forth. The local network 126 in turn may be connected to an external or public network such as, but are not limited to, the Internet 130 through a bridge device 128 or a router, or a switch or a gateway device, and so forth. The user of the device 102 may connect or access the services 202*a-n* through the Internet 130. Further, the VMThings 108 may display information about services in a preferred language set by the user. For example, if the user wants the information in English, the VMThings may display the information about the services 202*a-n* in English language, and if the user is interested in getting information in Spanish language, the VMThings may display the information about the services 202*a-n* in Spanish language. VMThings is configured to display the visual access menu or the enhanced visual access menu in different languages such as, but are not limited to, English, Spanish, French, German, Sanskrit, Hindi, and so forth. Further, the user may have to register himself or the device 102 (or the access device 116) at the website before accessing the services 202*a-n*. In an embodiment of the invention, the services 202*a-n* may be accessed through the web browser or the web page 110 as shown in FIG. 2B FIG. 3A illustrates an exemplary visual access menu 308 and an enhanced visual access menu 310 at a device 102, in accordance with the first embodiment of the invention. As discussed with reference to FIG. 1A, the device 102 may include a graphical user interface (GUI) for accessing the visual access menus. Further, the VMThings 108 may display the visual access menu 308 (or the Internet of Things menu) at the device 102 so as to enable the user to control the remote devices 106*a-n*. A visual access menu 308 may include one or more options. The options may be a remote devices 302 option and services 304 option. Though not shown, but a person skilled in the art will appreciate that the visual access menu 308 (or the Internet of Things menu) may include more than two options. A user of the device 102 may select an option of these options from the displayed visual access menu 308 (or the Internet of Things menu). Further, the user may select an option by any of the following ways, but are not limited to, touching an option, through a voice command, through a gesture or hand movement, through an audio input, by pressing one or more keys at the device 102, and so forth. Further, the VMThings 108 may use voice recognition to enable the user to make selection of an option or icon from the visual access menu 308 (or the Internet of Things menu) through a voice command. The device 102 may include a voice recognition module to process and analyze the voice command(s).

Thereafter, an enhanced visual access menu 310 (or an enhanced Internet of Things menu) may be displayed based on the selection of the option from the visual access menu 308. For example, if the user has selected the remote devices 302 option, then the enhanced visual access menu 310 including one or more device options 306*a-n* may be displayed to the user at the device 102. The one or more device options may include options corresponding to the remote devices 106*a-n* such as, but are not limited to, a vehicle 306*a*, an air conditioner (AC) 306*b*, camera 306*c*, microwave 306*n*, and so forth. The user may select a device option of the device options 306*a-n*. For example, the user may select and control a microwave by selecting the microwave option 306*n*. For example, if the user may control the operations such as switch off, switch on, regulate, and so forth through the enhanced visual access menu. Further, the remote devices 106*a-n* may include some predefined settings so that the user may access and control the remote devices 106*a-n* from a remote location. In an embodiment of the invention, the predefined settings may be done by the user. The VMThings 108 may store these pre-defined settings at the access device 116 (or the device 102). In an embodiment of the invention, the device 102 may be connected to the services based on the local communication protocol based on nearby communication and proximity such as NFC, the Bluetooth, and so forth. Further, the user may have to authenticate his/her identity before accessing the remote devices 106*a-n*. The device 102 may connect to the remote devices based on the predefined settings. Further, in an embodiment of the invention, each remote device of the remote devices 106*a-n* may have a unique remote device identity (ID) to distinguish from other remote devices. Further, the user may be allowed to access the remote devices 106*a-n* based on registration and/or authentication.

In an embodiment of the invention, the user may personalize or customize the visual access menus or the Internet of Things menu displayed to him/her according to his/her preferences. For example, the user may select remote devices such as car, garage, home doors, fans, and lights of his/her house. Now the user may be displayed with a visual access menu corresponding to his/her preferred remote devices of the remote devices 106*a-n*. Through this visual access menu or the Internet of Things menu the user may access and control one or more operations of the personal remote devices. Similarly, the user may define his/her preferences for accessing the remote devices present at his/her office or factory, and so forth. Therefore, multiple visual access menus may be stored at the devices based on the preferences of the user. In an embodiment of the invention, more than one user may use the device 102 for accessing remote devices 106*a-n*. For example, in a home, 4 users may be using same smart phone for controlling the multiple devices of home. The VMThings 108 allows different users to access remote devices (or services) according to their own preferences at the device 102 (or the access device 116). The VMThings 108 may also store the different preferences corresponding to the different users. The VMThings 108 may identify different users based on their unique user ID or details. Further, the VMThings 108 may highlight few frequently selected or previously selected options of the visual access menu. Further, the VMThings may display a menu for communicating with the one or more objects made by a vendor. In an embodiment of the invention, the menu is not provided by the vendor. Further, the one or more objects may comprise at least two objects produced by two independent vendors.

Further, the user may provide a language preference or a display preference. For example, the VMThings 108 may display the visual access menu (or the Internet of Things menu) in Spanish language based on the user's Spanish language preference. In an embodiment of the invention, the visual access menu (or the Internet of Things menu) may be displayed by the VMThings 108 on a bigger display screen in vicinity of the device 102, such as, but are not limited to a projector screen, an LCD display, an LED display, a television, and so forth based on the user's display preference. Further, the VMThings 108 may store the usage or access pattern for the users based on his/her selections of options from the visual access menus or the enhanced visual access menus (or the Internet of Things menus) at the device 102. In an embodiment of the invention, the device 102 may store usage patterns for more than one user at the device 102.

In an embodiment of the invention, the user may select an option from the one or more options at the device 102 (or the access device 116) through voice inputs. For example, the user may switch on a microwave present at home by saying "Switch On the Microwave" or just by saying "Switch On". In another embodiment of the invention, the user may provide inputs at the device 102 by using different gestures or hand movements. For example the user may switch on an air conditioner by showing a gesture of a thumb up at the device 102. In an embodiment of the invention, the device 102 may include a camera. Further, the user may provide inputs regarding controlling remote devices (or services) at the device 102 by clicking an image. In an embodiment of the invention, the VMThings 108 may store a list of voice commands or gestures or hand movements for selecting options from the visual access menus or the enhanced visual access menus (or the Internet of Things menus). The VMThings 108 may store the actions to be taken corresponding to these commands or gestures or hand movements.

FIG. 3B illustrates an exemplary visual access menu 308 and an enhanced visual access menu 312 of services 202*a-n* at the device, in accordance with second embodiment of the invention. The user may access information about one or more services by selecting the services 304 option from the visual access menu 308 (or the Internet of Things menu for services 202*a-n*). An enhanced visual access menu 312 or an enhanced Internet of Things menu corresponding to the services 202*a-n* may be displayed to the user by the VMThings 108. The enhanced visual access menu 312 may include one or more service options 314*a-n* for different types of services such as, but are not limited to, entertainment 314*a*, travel 314*b*, banking 314*c*, hotels 314*n*, movies, airlines, and so forth.

In an embodiment of the invention, the user can further expand the visual access menu for any of the services by selecting a service option from the service options 314*a-n*. For example, the user may access more information about banking services by selecting a banking option 314*c*. In an embodiment of the invention, the user may customize the visual access menu displayed to him by providing his/her preferences about the services (or remote devices) he/she would like to access or control. For example, the user may select preferred services such as entertainment, banking, and hotels. Therefore, now the user will be displayed an extended visual access menu including options for these three preferred services only. In an embodiment of the invention, the device 102 may be connected to the services based on the local communication protocol based on nearby communication and proximity such as NFC, Bluetooth, and so forth. Further, the user may have to authenticate his/her identity before accessing the services 202*a-n*. Further, in an embodiment of the invention, each service of the services 202*a-n* may have a unique service identity (ID) to distinguish from other services. Similarly, every user may have a unique user ID. In an embodiment of the invention, the user may be authenticated based on the user ID. Further, the user may be allowed to access the services 202*a-n* based on registration and/or authentication.

In an embodiment of the invention, the user may access the remote devices 106*a-n* and services 202*a-n* through a web browser as shown in FIG. 2B. FIG. 3C illustrates another exemplary visual access menu and an enhanced visual access menu at the device 102 when a web browser is used to access the visual access menus for controlling the remote devices 106a-n. The visual access menus may be stored at the server 114 in the network 104. In an embodiment of the invention, the VMThings may update the database at the device 102 (or the access device 116) at a regular interval. Further, the database may store a category attribute for each of the one or more objects i.e. the remote devices 106a-n and a standard menu according to each category attribute. Similarly, the database may store other attributes or properties such as, but not limited to, location, device name, and so forth, associated with the plurality of objects. In an embodiment of the invention, the user can access the visual access menu including the various device options 306a-n through the web browser. The user may enter a URL in the web browser. A web page 110a including a visual access menu may be displayed at the device based on the entered URL. The visual access menu at the web page 110 may include options such as, but are not limited to, remote devices option 302, and services option 304 In an embodiment of the invention, the user may be asked to enter his/her personal details for authentication prior to getting access to the visual access menu(s). The user may select an option from the remote devices option 302 and the services option 304.

The display of the device 102 may switch from the webpage 110a to webpage 110b when the user selects the remote devices option 302. The webpage 110b may include an enhanced visual access menu including the device options 306a-n. The device options 306a-n may be graphics or icon and/or text options representing the remote devices 106a-n such as, but are not limited to, a vehicle, an air conditioner (AC), a camera, a door, a microwave, a window, and so forth. Examples of the device options 306a-n include, but are not limited to, a vehicle 306a, an AC 306b, a camera 306c, a microwave 306n, and so forth. In an embodiment of the invention, when the user selects the services option 304 from the webpage 110a, the display of the device 102 may change from the webpage 110a to a webpage 110c as shown in FIG. 3D. The webpage 110c may include an enhanced visual access menu including the service options 314a-n. The services options 314a-n may include options for accessing the services such as, but are not limited to, entertainment 314a, travel 314b, banking 314c, hotels 314n, food, and so forth. The information may be displayed to the user based on his/her selection accordingly. Further, the information may be displayed to the user in a language based on the user's language preference.

FIG. 4 illustrates an exemplary enhanced visual access menu 402 (or the Internet of Things menu for remote devices 106a-n) including one or more device options 404a-1, in accordance with an embodiment of the invention. A visual access menu 402 may include the one or more device options 404a-1. The device options 404a-1 may be such as, but are not limited to, a vehicle 404b, an AC 404d, a camera 404e, a microwave 404f, a car 404g, a truck 404h, and so forth. In an embodiment of the invention, the user of the device 102 may select a device option such as a vehicle option 404b from the device options 404a-1 by touching the vehicle option 404b. In another embodiment of the invention, the user may enter a voice command or play an audio at the device 102 or at some other device nearby to select a device option of the device options 404a-1 from the enhanced visual access menu 402 (or an enhanced Internet of Things menu for the remote devices 106a-n). In another embodiment of the invention, the user may select device options 404a-l through gestures or hand movements such as a thumb up, a thumb down, a waving hand, a head nod, and so forth. The enhanced visual access menu 402 includes device options 404a-l. The user may close the door of the car by selecting the Close option 404l. Similarly, the user may regulate the temperature of the microwave by selecting the regulate option 404i. Though not shown, a person ordinarily skilled in the art will appreciate that the enhanced visual access menu 402 may include different device options and more than device options 404a-l. Further, the device options 404a-l may differ based on the user's preferences such as language, remote devices, and so forth.

FIG. 5 illustrates an exemplary visual access menu 502 (or the Internet of Things menu) including one or more service options 504a-k, in accordance with an embodiment of the invention. The enhanced visual access menu 502 may include a plurality of service options 504a-k. Though not shown but a person skilled in art will appreciate that the enhanced visual access menu 502 may include more service options than shown. The service options 504a-k may include services such as, but are not limited to, banking 504b, entertainment 504c, travel 504d, and so forth. Further, the service options 504a-k may differ based on the user's preferences such as language, services of interest, and so forth.

The user may select a service option of the service options 504a-k. In an embodiment of the invention, the user of the device 102 may select the banking 504b option from the service options 504a-k by touching the banking 504b option. In an embodiment of the invention, the user may select the banking 504b option by using a combination of keys such as '12'. The user can enter the key combination by using an input device such as a keyboard connected to the device 102 or through keypad of the device 102. In another embodiment of the invention, the user may enter a voice command or music through a microphone of the device 102 to select a service option from the service options 504a-k of the visual access menu 502. In yet another embodiment of the invention, the user may select or control a service through gestures or hand movements. The user may get information about credit cards by selecting the credit cards 504h option. Similarly, the user may retrieve more information about his/her credit card bill by selecting the check bill 504k option from the visual access menu 502.

In an embodiment of the invention, the user may access the local services available in nearby area or are in vicinity with respect to the device 102 through the VMThings 108. For example, if the user is nearby some services, and have the device 102 or the access device 116, then the VMThings 108 may enable the user to communicate and connect to the local service. Further, the VMThings 108 may provide some suggestion(s) regarding the local services and offerings. For example, the device 102 or the user may communicate with the nearby Bank, Coffee shop, or train station.

Further, the user may have to authenticate his/her identity before accessing or using the services. For example, the user may be asked to enter his personal details for authentication prior to connecting or accessing the services. The authentication process prevents unauthorized users from accessing the services. Further, each service may be identified through its unique service ID.

FIG. 6 illustrates exemplary components of the device 102, in accordance with an embodiment of the invention. The device 102 may include a system bus 622 to connect the various components. Examples of the system bus 622 include several types of bus structures including a memory bus, a peripheral bus, or a local bus using any of a variety of bus architectures. As discussed with reference to FIG. 1A, the device 102 can be a communication device capable of connecting to other devices such as the remote devices 106*a-n* through the network 104. Example of the device 102 may include a mobile phone, a smart phone, a computer, a personal digital assistant (PDA), a tablet computer, a laptop etc. The remote devices 106*a-n* can be devices such as, but are not limited to, home appliances, vehicles, doors, lights, security systems, garage locks, and so forth. Further, the user may access the remote devices 106*a-n* from a remote location by using the device 102. In an embodiment of the invention, the remote devices 106*a-n* may be devices present at home location. In another embodiment of the invention, the remote devices 106*a-n* may be devices present at an office location. In yet another embodiment of the invention, the remote devices 106*a-n* may be present at a factory location.

The device 102 can connect to the network 104 through a network interface 616. An Input/Output (IO) interface 618 of the device 102 may be configured to connect to external or peripheral devices such as a memory card 620*a*, a keyboard 620*b*, a mouse 620*c*, and a Universal Serial Bus (USB) device 620*d*. Although not shown, various other devices can be connected through the IO interface 618 to the device 102. In an embodiment of the invention, the device 102 may be connected to a hub that provides various services such as voice communication, network access, television services and so forth. For example, the hub may be a Home Gateway device that acts as a hub between the device 102 and the network 104.

The device 102 may include a display 602 to output graphical information or the visual access menus or the Internet of Things menus to the user of the device 102. In an embodiment of the invention, the display 202 may include a touch sensitive screen. Therefore, the user can provide inputs to the device 102 by touching the display 602 or by point and click using the mouse 620*c*. The user can interact with the visual access menu (or the Internet of Things menu) by pressing a desired button from the keyboard 620*b*. For example, the user can press a '3' key from the keyboard 620*b* to select a node 3 in the visual access menu. Further, the user can directly select the node 3 of the visual access menu from the display 602, in case of a touch sensitive screen.

A memory 606 of the device 102 may store various programs, data and/or instructions that can be executed by a processor 604 of the device 102. Examples of the memory 606 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by the device 102. The memory 606 may include a graphical user interface (GUI) 608 for accessing the enhanced visual access menus (or the enhanced Internet of Things menu) for the remote devices 106*a-n* and/or services 202*a-n*. The memory 606 may include a database 610 for storing the enhanced visual access menus corresponding to the remote devices 106*a-n* and/or the plurality of services 202*a-n*. Further, the database 610 may store user preferences related to the enhanced visual access menus of the remote devices 106*a-n* and the plurality of services 202*a-n*. Further, the database 610 may include a category attribute for each of the objects i.e. the services 202*a-n* or the remote devices 106*a-n* and a standard menu according to each category attribute. Further, the database 610 may store the alert and reminder messages. In an embodiment of the invention, the database 610 may store information about various services 202*a-n* and remote devices 106*a-n*. Further, the database 610 may be updated at a predefined time interval. For example, the database 610 may be updated after every 2 days, once in a week, monthly, and so forth. In an embodiment of the invention, the updates may be received from the server 114 as shown in FIG. 1B. In another embodiment of the invention, the updates about the visual access menus may be received from the network 104.

In an embodiment of the invention, the VMThings 612 may update the database 610 based on crowd sourcing. It means the database 610 may be updated based on feedback or reviews or thoughts of other users. For example, if 10 users out of 15 users visiting a website and accessing the visual access menus says that there is some error in the system of controlling a particular object, then based on the ratings provided by these users, the record or the menu for the particular object in the database 610 may be updated. The VMThings 612 may also learn the problem associated with the visual access menus or the device or the objects from many other sources and may find a solution based on many other users. Examples of the other sources include, but are not limited to, other network devices, remote devices 106*a-n*, services 202*a-n*, users, server, and so forth.

In an embodiment of the invention, the database 610 may be created based on the information of a yellow pages directory. The plurality of objects may be categorized based on the category mentioned in the yellow pages. Further, the visual access menus in the database may be created based on the categories of the objects according to the yellow pages. In an embodiment of the invention, the database 610 may be created by a human operator or an automatic application.

Further, the memory 606 may store an Internet of Things application such as a VMThings 612 for displaying visual access menus corresponding to the objects such as remote devices 106*a-n* or the services 202*a-n* at the device 102. Further, the VMThings 612 may be configured to connect the device 102 to the one or more of the remote devices 106*a-n*. In an embodiment of the invention, the VMThings 612 may be used to connect to the services 202*a-n* remotely. The VMThings 612 may be configured to display a visual representation in form of enhanced visual access menus of the remote devices 106*a-n* or the services 202*a-n* at the display 602. The device 102 may further include a radio interface 614 configured for wireless communications with other devices in the network 104. The visual access menus may include multiple device options or service options. The user can select one or more options from the visual access menu. Further, the VMThings 612 may connect the user to the remote devices 106*a-n* or services based on the selection of the options. Further, the VMThings 612 may be configured to enable the device 102 to receive images, videos, and so forth of the connected remote devices 106*a-n* and service 202*a-n* irrespective of their location. In an embodiment of the invention, the images are real-time images. In an embodiment of the invention, the VMThings 612 may be implemented as software or firmware or hardware or a combination of these at the device 102.

In an embodiment of the invention, the user VMThings 612 may store one or more selection of options made by the user (s) in the database 610. Further, the VMThings 612 may bookmark the options based on the past history of the user activity with the visual access menu. The database 610 may store personalized visual access menus or enhanced visual access menu for different users. The database 610 may be updated based on user instructions. The user instructions may be provided by the user through commands such as, but are not limited to, voice commands, gestures, selection of keys, and so forth. In an embodiment of the invention, the VMThings 612 is also configured to analyze and process the voice commands based on the context of the voice command.

Further, the database 610 may store visual access menu of the one or more objects based on category of the objects. In another embodiment of the invention, the database may store the visual access menus based on the vendors of the one or more objects. In an embodiment of the invention, the visual access menus may be stored based on one or more properties of the objects such as, but not limited to, location, type, distance and so forth. The database 610 may also store advertisements related to the one or more objects. In an embodiment of the invention, the VMThings 612 may display at least one advertisement along with the visual access menu at the device or display device. The advertisements may be related to the content of the visual access menu. In an embodiment of the invention, the advertisements may be related to the one or more objects, remote devices 106*a-n*, services 202*a-n*, and so forth. In another embodiment of the invention, the advertisements may be related to a location of the device 102 or of the one or more objects. In an embodiment of the invention, the advertisements may be displayed to the user based on one or more preference of the user. For example, the user may prefer to view advertisements of electronic devices like computers, etc. Further, the VMThings 108 may highlight the one or more options in the visual access menu. In an embodiment of the invention, the one or more options may be highlighted based on the users' previous selection of options. Further, the VMThings 612 may keep a record of user activity on the device 102. The VMThings 612 may store the user profile and access patterns of the user for accessing the visual access menu or interacting with the device 102.

In an embodiment of the invention, the database 610 may be updated based on addition or deletion of the one or more objects. For example, if a new remote device is added to the list of devices to be controlled then the visual access menu will be updated accordingly. Further, the VMThings 612 may detect errors which may occur during the user interaction with the visual access menu. The VMThings 612 may also report to the user about these errors. In an embodiment of the invention, the errors may occur due to some other reasons such as technical reasons, network failure, and so forth.

In an embodiment of the invention, the user may receive a call from the controlled one or more objects. Also, the user may be presented with a visual access menu associated with the object from which the call is received. The VMThings 612 may display the visual access menu associated with the object from which call is received at the device 102.

Depending on the complexity or number of device options and/or service options in the visual access menu the size of the visual access menu may differ. Moreover, size of the display 602 may be limited or small. As a result, all the options of the visual access menu may not be displayed together on the display 602. In such a case, the VMThings 612 may allow the user to navigate by scrolling horizontally and/or vertically to view options on the visual access menu. Further, the VMThings 612 may detect the capability of the device 102 before displaying the visual access menu. For example, in case the device 102 is a basic mobile phone with limited functionality of the display screen. Therefore, the application may display the visual access menu in form of a simple list. Similarly, a list may be displayed in case of fixed line or wired telephones. Moreover, in case the device 102 includes a high capability screen, such as, but are not limited to as of an iPad, a television then the visual access menu may be displayed in form of graphics.

Further, the memory 606 may include other applications that enable the user to communicate/interact with the remote devices 106*a-n* through the network 104. Examples of other applications include, but are not limited to, Skype, Google Talk, Magic Jack, and so forth. Other applications may be stored as software or firmware on the device 102. Further, the memory 606 may include an Operating System (OS) (not shown) for the device 102 to function properly.

Though not shown, the device 102 may include a camera, a microphone, a speaker, and so forth. The user may provide voice commands by using the microphone. Further, the user may provide the input or select the option by clicking an image by using the camera. The user may control one or more operations of the remote devices 106*a-n* by making gestures or hand movements in front of the camera of the device 102. The speaker may be used to output music and voice responses to the user. Further, the VMThings 612 may record voice commands received from the user. These recorded commands then may be stored at the device 102. The user may input one or more key or key combinations using the keyboard 620*b*. The keyboard 620*b* may be a physical keyboard or a virtual keyboard displayed on a touch screen display 602 of the device 102. In an embodiment, the keyboard 620*b* is a keypad on the device 102. Subsequently, after some processing by the application, the enhanced visual access menu corresponding to the remote devices 106*a-n* and/or the services 202*a-n* based on the user inputs or selection is searched and displayed on the display 602.

In an embodiment of the invention, the visual access menu or the enhanced visual access menu may be provided in real-time to the user. In another embodiment of the invention, the visual access menus (or the Internet of Things menus) may be downloaded and stored at the device 102 and may be accessed by the user later. In an embodiment of the invention, the visual access menu may be provided by a messaging service such as a Short Messaging Service (SMS). In an embodiment of the invention, customized visual access menus may be displayed to the user based on one or more preferences of the user. In an embodiment of the invention, the visual access menu may be customized based on the profile of the user. In an embodiment of the invention, the profile may be generated based on access pattern of user or the data capture by a hub connected to the device 102. Further, in an embodiment of the invention, the VMThings 108 may convert the format of the message including the visual access menu into another format based on the user preference related to the format. For example, the VMThings 108 may convert the format of the visual access menu received in an SMS format to an e-mail format based on user preference.

In an embodiment, the memory 606 may include a web browser to access and display web pages from the network 104 and/or other computer networks. The user may use the web browser to open a website for accessing the visual access menu (or the Internet of Things menu). In an embodiment, the user may store the login details for the website(s) at the device 102. Therefore, the user can connect to the remote devices 106*a-n* or services 202*a-n* from the web browser automatically and may not have to enter his/her login details every time to login to the website. The user may navigate through the web site and may select a hyperlink embedded in the webpage of the website. Based on the selection of the hyperlink by the user, he/she may be directed to another webpage. In such a scenario, the VMThings 612 may display a new Internet of Things menu associated with the new web site. In an embodiment of the invention, the VMThings 612 may display a new visual access menu associated with the new web page.

FIG. 7 illustrates exemplary components of the access device 116, in accordance with an embodiment of the invention. The access device 116 may include a system bus 720 to connect the various components. Examples of system bus 720 include several types of bus structures including a memory bus, a peripheral bus, or a local bus using any of a variety of bus architectures. As discussed with reference to FIGS. 1C and 2C, the access device 116 may be any device capable of data and/or voice communications through the network 104 or the remote devices 106*a-n*. Examples of the access device 116 include, but are not limited to, a router, a printer, a music system, a telephone, a set top box, a hub, a gateway, a mobile phone, and so forth. In an embodiment of the invention, the access device 116 may not have or may have limited display capability. The access device 116 may include a plurality of ports 722 for connecting to the network 104, and/or the display device 118. Examples of the ports 722 may include, but are not limited to, parallel ports, serial ports, DB-2 connector, IEEE 1284, IEEE 1394 ports, 8P8C ports, PS/2 ports, RS-232 ports, Registered Jack (RJ) 45 ports, RJ 48 ports, VGA port, Small Computer System Interface (SCSI) ports, USB ports, DB-25 ports, and so forth. The access device 116 may be connected to a display device 118. Further, the access device 116 may connect to the remote devices 106*a-n* through the network 104. The access device 116 may access and control the remote devices 106*a-n* and service 202*a-n*. In an embodiment of the invention, the access device 116 may have a unique access device identity (ID). The access device 116 may be authorized based on this unique access device ID.

The access device 116 can connect to the network 104 through a network interface 714. An Input/Output (10) interface 716 of the device 102 may be configured to connect external or peripheral devices such as a memory card 718*a*, a keyboard 718*b*, a mouse 718*c*, and a Universal Serial Bus (USB) device 718*d*. Although not shown, various other devices can be connected through the 10 interface 716 to the access device 116. In an embodiment of the invention, the access device 116 may be connected to a hub or gateway device that provides various services such as voice communication, network access, television services and so forth. For example, the hub may be a Home Gateway device that acts as a hub between the access device and the network 104.

The access device 116 may use the screen of the display device 118 to output graphical information to the user of the access device 116. Further, the access device 116 may include a memory 704 to store various programs, data and/or instructions that can be executed by a processor 702. Examples of the memory 704 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by the access device 116. The memory 704 may store a graphical user interface (GUI) 706 for accessing the visual access menus of the remote devices 106*a-n* and/or services 202*a-n*. The GUI may provide an interface to the user(s) to access the visual access menus or enhanced visual access menus. In an embodiment of the invention, the GUI may be used to configure or create the Internet of Things menus. The Internet of Things menu may include representations of one or more recognizable or identifiable objects such as, but are not limited to, remote devices 106*a-n* or services in an Internet or network like structure. The one or more identifiable objects may be physical or virtual objects.

The memory 704 may include a database 708 to store the visual access menus or the Internet of Things menus corresponding to the remote devices 106*a-n* and/or the services 202*a-n*. Further, the database 708 may store user preferences related to the remote devices 106*a-n* and the services 202*a-n*. Further, the database 708 may store the alert and reminder messages. In an embodiment of the invention, the database 708 may store information about the services 202*a-n*. Further, the database 708 may be updated at a predefined time interval. For example, the database 708 may be updated after every 4 days, once in a week, monthly, and so forth. In an embodiment of the invention, the updates related to the visual access menus and remote devices 106*a-n* or services 202*a-n* may be received from the server 114 as shown in FIG. 2B. In an embodiments of the invention, the updates may be received from the network 104

Further, the memory 704 may store an application such as a VMThings 710 to connect to the remote devices 106*a-n* and the services 202*a-n* remotely. Further, the VMThings 710 may connect the access device 116 to the display device 118. The VMThings 710 may display a visual representation in form of visual access menus or the Internet of Things menus of the remote devices 106*a-n* or services 202*a-n* at the display device 118. The display device 118 may further include a radio interface 712 configured for wireless communications with other devices. The user can select one or more option from the visual access menu or the Internet of Things menu to connect to a particular service. Further, the VMThings 710 may connect the user to the remote devices 106*a-n* or the services 202*a-n* based on the selection of the options. Further, the VMThings 710 may be configured to enable the device 102 to receive images, videos, and so forth related to the remote devices 106*a-n* or services 202*a-n* irrespective of their location. In an embodiment of the invention, the VMThings 710 may be implemented as software or firmware or hardware or a combination of these at the access device 116.

In an embodiment of the invention, the display device 118 may include a touch sensitive screen. Therefore, the user can provide inputs or may select an option from the visual access menu or the Internet of Things menu by touching the screen of the display device 118 or by point and click using the mouse 718*c*. The user can interact with the visual access menu or the Internet of Things menu by pressing a desired key or combination or keys from the keyboard 718*b*. For example, the user can press a '3' key from the keyboard 620*b* to select a node 3 in the visual access menu or the Internet of Things menu. Further, the user can directly select the node 3 of the visual access menu or the Internet of Things menu, in case of a touch sensitive screen.

Further, the size of the visual access menu or the Internet of Things menu may differ depending on the number of service options. As a result, all the service options of the visual access menu or the Internet of Things menu may not be displayed together on the screen of the display device 118. In such a case, the VMThings 710 may allow the user to navigate by scrolling horizontally and/or vertically to view various service options in the visual access menu or the Internet of Things menu. Further, the VMThings 710 may detect the capability of the screen of the display device 118 before displaying the visual access menu or the Internet of Things menu. For example, in case the display device 118 is a basic mobile phone with limited functionality of the display screen, various device options or the service options of the enhanced visual access menu or the Internet of Things menu may be displayed as a list including one or more options.

In an embodiment of the invention, the database 708 may be updated based on the feedback of the one or more users or based on error report received from the other sources. In an embodiment of the invention, the VMThings 710 may update the database 708 based on crowd sourcing. It means the database 708 may be updated based on feedback or reviews or thoughts of other users. For example, if 80 users out of 100 users visiting a website and accessing the visual access menus says that there is some error in the system of controlling a particular object, then based on the ratings provided by these users, the record or the menu for the particular object in the database 708 may be updated. The VMThings 710 may also learn the problem associated with the visual access menus or the device or the objects from many other sources and may find a solution based on many other users. Examples of the other sources include, but are not limited to, other network devices, remote devices 106a-n, services 202a-n, users, server, and so forth.

Further, the memory 704 may include other applications that enable the user to communicate/interact with the services 202a-n through the network 104. Examples of other applications include, but are not limited to, Skype, Google Talk, Magic Jack, and so forth. Other applications may be stored as software or firmware on the display device 118. Further, the memory 704 may include an Operating System (OS) (not shown) for the access device 116 to function.

Though not shown, the access device 116 may include a camera, a microphone, a speaker, and so forth. In an embodiment of the invention, the display device 118 may include the camera or the speaker or the microphone, and so forth. The user may provide voice commands by using the microphone. Further, the user may provide the input or select the option by clicking an image through a camera. The user may control one or more operations of the remote devices 106a-n by making gestures or hand movements in front of the camera of the device 102. The speaker may also be used to output music and voice responses to the user. The user may input one or more key or key combinations using the keyboard 718b. The keyboard 718b may be a physical keyboard or a virtual keyboard displayed on a touch screen display of the display device 118. In an embodiment, the keyboard 718b may be a keypad on the access device 116 or the display device 118. Subsequently, after some processing by the VMThings 710, an enhanced visual access menu corresponding to the services 202a-n based on the user inputs or selection is searched and displayed on the screen of the display device 118.

In an embodiment of the invention, the VMThings 710 may be configured to recognize the context of the voice inputs received from the users or other sources. The VMThings 710 may take an action based on the context of the voice inputs.

Further, the user may forward or move the display of the device to another device by providing a selection or input. In an embodiment of the invention, the VMThings 710 may forward or transfer the display from a device to another device based on the user inputs. For example, the user may transfer the visual menu displayed on his/her smart phone to another smart phone by tapping at the display of the smart phone. The input for doing so may be a voice command, a selection of one or more keys, touching the display, gesture, and so forth. In an embodiment of the invention, the user may transfer the display from a device to a wall.

In an embodiment, the memory 704 may include a web browser to display web pages from the network 104 and/or other computer networks. The user may use the web browser to open a website for accessing the visual access menu(s). In an embodiment, the user may store the login details for the website(s) at the device. Therefore, the user can connect to the services 202a-n from the web browser automatically and may not be required to enter his/her login details every time to login to the website.

In an embodiment of the invention, the database 708 may be updated based on addition or deletion of the one or more objects. For example, if a new remote device or service is added to the list of devices or services to be controlled then the visual access menu in the database may be updated accordingly. Further, the VMThings 710 may detect errors which may occur during the user interaction with the visual access menu. The VMThings 710 may also report to the user about these errors. In an embodiment of the invention, the errors may occur due to some other reasons such as technical reasons, network failure, and so forth. In an embodiment of the invention, the errors may be reported in form of such as, but not limited to, text report, images, an MMS, a SMS, an E-mail, voice messages, and so forth. In another embodiment of the invention, the VMThings 710 may maintain and store a log of errors reported and actions taken to correct them in the database 708.

In an embodiment of the invention, the database 708 may be created by a human operator or an automatic application. The human operator may listen to various options of the audio menus of the one or more objects and may create a visual access menu or visual Internet of Things menus accordingly. In an embodiment of the invention, the database 708 may be created based on one or more instructions of the users by the human operator.

In an embodiment of the invention, the database 708 may be created based on the information of a yellow pages directory. The plurality of objects may be categorized based on the category mentioned in the yellow pages. Further, the visual access menus or the Internet of Things menus in the database may be created based on the categories of the objects according to the yellow pages.

FIG. 8 illustrates a flowchart for controlling remote devices when the visual access menus or the Internet of Things menus are accessed through an access device, in accordance with an embodiment of the invention. As discussed with reference to FIGS. 1A and 2A, the user of the device such as a smart phone may connect to a plurality of objects in the network such as remote devices and services. In an embodiment of the invention, the objects may be a combination of the remote devices and services. Further, the device may control one or more operations of the remote devices. The device may include an Internet of Things application such as a VMThings configured to display graphical information to the user. The VMThings may display visual access menus (or enhanced visual access menus) or the Internet of Things menus at the device for controlling remote devices or services irrespective of the location of the remote devices or services. In an embodiment of the invention, the Internet of Things menu may include representations of one or more recognizable or identifiable objects such as, but are not limited to, remote devices or services in an Internet or network like structure. The one or more identifiable objects may be physical or virtual objects. In an embodiment of the invention, a graphical user interface (GUI) may be used by the user for creating the Internet of Things menu. The objects may be the remote devices or services. In an embodiment of the invention, the device may be connected to a display device such as an LCD screen, a TV, an LED screen, a projector screen and so forth. In an embodiment of the invention, the device or remote devices may be connected to each other through a local network such as a wireless network like Bluetooth, RF4CE network, and so forth or through a wired network like Local Area Network (LAN).

At step 802, a database including visual access menus may be accessed through a graphical user interface (GUI) at the device. In an embodiment of the invention, the GUI may be accessed at the device by the user. At step 804, a visual access menu or the Internet of Things menu may be displayed at the device. In an embodiment of the invention, the VMThings may display the visual access menus and the Internet of Things menu at the device. The visual access menu may include one or more options such as, but are not limited to, a remote devices option, a services option, and so forth. The user may select an option from these options. The VMThings may receive an input from the user. The input may be a selection of option by the user. In an embodiment of the invention, the device may include a touch sensitive screen. In an embodiment of the invention, the user may select an option by touching the screen of the device. In another embodiment of the invention, the user may select an option by making a gesture or hand movement or through a voice command. The gestures, hand movements or the voice commands may be detected by the display device. In an embodiment of the invention, the VMThings may detect the gestures or hand movements or the voice commands. Further, the VMThings of the device may understand and accept voice inputs from the user in different languages irrespective of the device language. Therefore, the user may control the remote devices by giving voice commands in different languages such as, but are not limited to, English, Spanish, French, Hindi, Chinese language, Japanese language, Hawaiian, German language, and so forth.

At step 806, an enhanced visual access menu or an enhanced Internet of Things menu for remote devices based on a selection of an option by a user may be displayed at the display device when the user selects the remote devices option from the visual access menu. The enhanced visual access menu for devices may include one or more device options. In an embodiment of the invention, the VMThings of the device may display a visual access menu or an enhanced visual access menu or an Internet of Things menu in different languages. Further, the device or the remote devices may have one language and the user may want to control and communicate in a different language, the user may do this via the VMThings application. The user may select a service option from these service options. At step 808, a selection of a device option may be received from the user. The user may provide the selection by touching the screen of the display device or by making some gestures or through hand movements in front of the display device or the access device. In an embodiment of the invention, the user may select a service option through a voice command or instruction.

At step 810, the user may be connected to a remote device based on the selection of a device option. In an embodiment of the invention, the VMThings may also check whether the remote device corresponding to the device selected by the user is registered to be monitored by the user or not. In another embodiment of the invention, the user may be required to authenticate his/her identity before accessing or connecting to the remote devices 106*a*-*n*. Thereafter, at step 812, the user may control one or more operations of the remote device based on the selection of the device option.

For example, the user may view real time pictures of the remote device, the user may switch on the remote device, and so forth.

FIG. 9 illustrates a flowchart for controlling services when the visual access menus, in accordance with an embodiment of the invention. As discussed with reference to FIGS. 1C and 2C, the services may be accessed and/or controlled by using an access device. At step 902, a graphical user interface (GUI) for accessing or creating an Internet of Things menu or a visual access menu may be displayed at the device. In an embodiment of the invention, the VMThings may display the GUI at the device. In an embodiment of the invention, the GUI may be accessed or opened by the user of the device. The visual access menu or the Internet of Things menu may include one or more options such as, but are not limited to, a remote devices option and a services option. The user may select any of these options.

At step 904, an input including an option selected by the user is received at the device. In an embodiment of the invention, the device may include a touch sensitive screen. In another embodiment of the invention, the user may select an option by making a gesture or hand movement or through a voice command. The gestures may be such as, but are not limited to, a thumb up, a head nod, a smile, a laughter, a thumb down, showing two fingers, and so forth. In an embodiment of the invention, the VMThings of the device may detect the gestures or hand movements or the voice commands and may receive a selection of the option. Further, the VMThings of the device may understand and accept voice inputs from the user in different languages irrespective of the device language.

At step 906, an enhanced visual access menu or an enhanced Internet of Things menu for services based on a selection of an option by a user may be displayed at the device when the user selects the services option from the visual access menu. The enhanced visual access menu for services may include one or more service options. In an embodiment of the invention, the VMThings of the device may display the enhanced visual access menu in different languages as per the user's instruction or convenience. Further, the device or the remote devices may have one language and the user may control and communicate in a different language via the VMThings. In such a scenario, the VMThings may display the visual access menu at the device in a language(s) preferred by the user. The VMThings will do the required translation of language. In an embodiment of the invention, the VMThings may display more than one visual access menus at the screen of the device. The multiple visual access menus may be displayed in different languages. The user may select a service option from these service options. At step 908, a selection of a service option may be received from the user. In an embodiment of the invention, the user may select a service option through a voice command or instruction.

At step 910, the user may be connected to a service based on the selection of the service option. The VMThings may also check whether the information for the selected service option is available at the device. If the information is not available, then the information may be requested and/or received from a server. Thereafter, at step 912, information about the service may be displayed at the display device based on the selection of the service option. The user may interact with the information accordingly. In an embodiment of the invention, the information may include text, graphics, audio, video, or hyperlinks.

FIGS. 10A, 10B, and 10C illustrate a flow diagram for controlling objects by using a device in a network, in accordance with an embodiment of the invention. As discussed with reference to FIGS. 1A and 2A, the user of the device such as a smart phone may connect and control various objects in the network. In an embodiment of the invention, the objects may include remote devices such as a car, a washing machine, door, truck, and so forth. In another embodiment of the invention, the objects may be services such as entertainment, banking, hotels, and so forth as described in FIG. 2A-I. In yet another embodiment of the invention, the objects may be combination of the remote devices and services. Further, the device may control one or more operations of the remote devices. The user at the device may also view information about various services. The device may include an Internet of Things application i.e. VMThings configured to display graphical information at the device. In an embodiment of the invention, the VMThings may display the visual access menus at the device for controlling remote devices or services irrespective of location of the remote devices or services.

At step 1002, a graphical user interface (GUI) for accessing or configuring an Internet of Things menu or a visual access menu may be displayed at the device. In an embodiment of the invention, the VMThings may display the GUI at the device. In an embodiment of the invention, the GUI may be opened by the user of the device. The visual access menu may include one or more options such as, but are not limited to, a remote devices option and a services option. The user may select any of these options.

At step 1004, an input including an option selected by the user is received at the device. At step 1006, it is checked whether the input is for accessing services. The input is for accessing services when the user selects the services option. If the input is for accessing services then the process control goes to step 1014, else the process control goes to step 1008.

At step 1008, it is checked whether the input is for accessing the remote devices. In an embodiment of the invention, the input is for accessing remote devices such as car, microwave, garage, doors, and so forth, when the user selects the remote devices option from the visual access menu. If the input is for accessing the remote devices then the control goes to step 1012, else the process waits for an input from the user at the device at step 1010.

At step 1014, it is checked whether a visual access menu or an Internet of Things menu for services is available at the device. If not available then at step 1016, the visual access menu of the services may be retrieved from a server in the network else the process continues to step 1018. At step 1018, the visual access of the services menu including one or more service options may be displayed at the device. The service options may be graphics icons and/or text representing services. The user may select an option(s) from the service options. At step 1020, a selection of a service option may be received from the user at the device. Thereafter, at step 1022, it is checked whether, information corresponding to the selected service option is available at the device. If not available the information may be requested and received from the server at step 1024. Then, at step 1026, the information may be displayed at the device based on the received selection of the service option. For example, the user may check his/her credit card bill through banking service option and may also know different ways of making the payment and information about nearby payment office.

When at step 1008 the input is for accessing the remote devices then at step 1012, it is checked whether a visual access menu for remote devices is available at the device. If not available then the visual access menu of the remote devices is retrieved from the server at step 1028. Then at 1030, the visual access menu including one or more device options may be displayed at the device. The device options may be graphics icons and/or text representing remote devices. The user may select a device option(s) from the visual access menu of the remote devices. Further, at step 1032, information corresponding to the user's selection may be received. At step 1034, a connection between the device and a remote device is established based on the received selection. Thereafter, at step 1036, the user may control the remote device(s) irrespective of location of the remote devices.

FIG. 11 illustrates a flowchart for controlling remote devices while accessing the visual access menu or the Internet of Things menu through a web browser, in accordance with an embodiment of the invention. As discussed with reference to FIGS. 1B and 2B, the user of the device 102 may access the remote devices and/or services by using a web browser such as Google Chrome, Internet Explorer at the device. In an embodiment of the invention, the user may access the web browser at the access device connected to the display device.

At step 1102, the user may open a website through a web browser at the device. The user may open the website by entering a Uniform Resource Locator (URL) of a website at the web browser. The website may allow the user to access visual access menus. In an embodiment of the invention, the website is displayed at the display device. At step 1104, the user may authenticate his/her identity by entering one or more details in one or more fields on the web page. The VMThings may check whether the user is an authorized user or not based on a unique user ID of the user. The VMThings may store the user IDs at the device. In an embodiment of the invention, the website may maintain the database of user IDs authorized to access the remote devices or the services. At step 1106, a visual access menu including one or more options is displayed at the device. In an embodiment of the invention, an Internet of Things menu may be displayed. The Internet of Things menu may include representations or icons of one or more recognizable or identifiable objects such as, but are not limited to, remote devices 106*a-n* or services in an Internet or network like structure. In an embodiment of the invention the VMThings may display the visual access menu or the Internet of Things menu at the device. In another embodiment of the invention the VMThings may display the visual access menu at the display device connected to the access device. The one or more options can be such as a remote devices option, a services option, and so forth. The user may select an option from these options. At step 1108, an input regarding the selection of the option may be received from the user at the device.

At step 1110, an enhanced visual access menu for the remote devices may be displayed at a screen of the device or the web browser when the user selects the remote devices option from the visual access menu. In an embodiment of the invention, an enhanced Internet of Things menu for the remote devices may be displayed at a screen of the device or the web browser when the user selects the remote devices option from the visual access menu. As shown in FIG. 3C, the display of the device may switch based on the selection of the option. In an embodiment of the invention the enhanced visual access menu or the Internet of Things menu for the remote devices may be retrieved from the server. The enhanced visual access menu for the remote devices may include one or more device options. In an embodiment of the invention, the enhanced Internet of Things menu for the remote devices may include one or more representations corresponding to the remote devices. The user may select a device option from the displayed enhanced visual access menu of the remote devices. Each device option may represent a remote device which the user can control. Further, the options, service options, and device options may be represented as graphics or/and text on the visual access menus. At step 1112, a selection of a device option may be received from the user at the device. In an embodiment of the invention, the VMThings may detect the selection received from the user. In an embodiment of the invention, the user may select the device option by touching the device option at display of the device. In an embodiment of the invention, the user may provide the selection of the device option through voice inputs or commands and/or gestures or hand movements such as, but are not limited to, a thumb up, a head nod, and so forth. Further, the voice inputs or commands may be in different languages such as English, Spanish, and so forth. The VMThings may detect, understand and translate the voice commands into a language which can be understood by the device.

At step 1114, a connection between the device and the remote device(s) is established by the VMThings. Thereafter, at step 1116, the user may control one or more operations of the connected remote devices irrespective of their location. For example, the user may switch on an AC located at his/her home while driving back to home. In an embodiment of the invention, the VMThings at the device may change the voice commands into text and may respond or control the remote devices accordingly.

FIG. 12 illustrates a flowchart for controlling services while accessing the visual access menu through a web browser, in accordance with an embodiment of the invention. As discussed with reference to FIGS. 1B and 2B, the user of the device 102 may access the services by using a web browser such as Google Chrome, Internet Explorer at the device. In an embodiment of the invention, the user may access the web browser at the access device connected to the display device.

At step 1202, the user may open a website through a web browser at the device. The user may open the website by entering a Uniform Resource Locator (URL) of a website at the web browser such as Google Chrome. The web site may allow the user to access visual access menus. In an embodiment of the invention, the website is displayed at the display device. At step 1204, the user may authenticate his/her identity by entering one or more details in one or more fields on the web page. At step 1206, a visual access menu including one or more options is displayed at the device. In an embodiment of the invention, an Internet of Things menu may be displayed at the device. In an embodiment of the invention the VMThings may display the visual access menu at the device. In another embodiment of the invention the VMThings may display the visual access menu at the display device connected to the access device. The user may select an option from the options such as a remote devices option or the services option of the visual access menu. At step 1208, an input from the user may be received at the device.

At step 1210, an enhanced visual access menu for the services may be displayed at a screen of the device or the web browser when the user selects the services option from the visual access menu. In an embodiment of the invention, an enhanced Internet of Things menu for the services may be displayed at a screen of the device or the web browser when the user selects the services option from the Internet of Things menu. As shown in FIG. 3D, the display of the device may switch based on the selection of the option. In an embodiment of the invention, the enhanced visual access menu or the enhanced Internet of Things menu for the services including the one or more service options may be retrieved from the server. The user may select a device option from the displayed enhanced visual access menu of the services. Each service option may represent a service. At step 1212, a selection of a service option may be received from the user at the device. In an embodiment of the invention, the VMThings may detect the selection received from the user. In an embodiment of the invention, the user may select the service option by touching the service option at display of the device. In an embodiment of the invention, the user may provide the selection of the service option through voice inputs or commands and/or gestures or hand movements such as, but are not limited to, a thumb up, a head nod, and so forth. Further, the voice inputs or commands may be in different languages such as English, Spanish, and so forth. The VMThings may detect, understand and translate the voice commands into a language which can be understood by the device or the services At step 1214, a connection between the device and the remote device(s) may be established by the VMThings. Thereafter, at step 1216, the user may control one or more operations of the connected remote devices irrespective of their location. For example, the user may switch on an AC located at his/her home while driving back to home. In an embodiment of the invention, the VMThings at the device may change the voice commands into text and may respond or access the services accordingly. Further, the VMThings may store the voice commands in different languages at the device (or the access device). The VMThings also stores the list of actions corresponding to the various voice commands, gestures, hand movements, and so forth.

FIGS. 13A, 13B, and 13C illustrate a flowchart for controlling objects in a network while accessing the visual access menu through a web browser, in accordance with an embodiment of the invention. As discussed with reference to FIGS. 1B and 2B, the user of the device 102 may access various objects such as, but are not limited to, remote devices and/or services by using a web browser such as Google Chrome, Internet Explorer at the device. In an embodiment of the invention, the user may access the web browser at the access device connected to the display device.

At step 1302, the user may open a website through a web browser at the device. The user may open the website by entering a Uniform Resource Locator (URL) of a website at the web browser. The web site may allow the user to access visual access menus. In an embodiment of the invention, the website is displayed at the display device. At step 1304, the user may authenticate his/her identity by entering one or more details in one or more fields on the web page. At step 1306, a visual access menu comprising one or more options is displayed at the device. In an embodiment of the invention the VMThings may display the visual access menu at the device. In another embodiment of the invention the VMThings may display the visual access menu at the display device connected to the access device. The one or more options can be such as a remote devices option, a services option, and so forth. The user may select an option from these options. At step 1308, an input from the user may be received at the device. Then at step 1310, it is checked whether the input is for accessing services. If outcome of the step 1310 is true then the control goes to step 1316, else step 1312 is followed.

At step 1312, it is checked whether the input received at step 1308 is for accessing remote devices. If true then the control goes to step 1330 else the process waits for an input at the user at step 1314. At step 1316, it is checked whether, an enhanced visual access menu for services is available at the device. If the enhanced visual access menu is not available then at step 1318, the enhanced visual access menu may be retrieved from the server else step 1320 is executed. Then at step 1320, the enhanced visual access menu including one or more service options such as for banking, entertainment etc. is displayed at the device. The user may select a service option from the service options. At step 1322, a selection of a service option from the user may be received. Then at step 1324, it is checked whether information for selected service option is available at the device. If not available then the information may be requested and received from the server at step 1326. Then at step 1328, the information may be displayed at the device based on the received selection.

If at step 1312, the input is for accessing the remote device, then at step 1330, it is checked whether an enhanced visual access menu for the remote services is available at the device. If not available, then at step 1332, the enhanced visual access menu for the remote devices including the one or more device options may be retrieved from the server else step 1334 may be executed. At step 1334, the enhanced visual access menu including the device options may be displayed at the device or the web browser. In an embodiment of the invention, the enhanced visual access menu may be displayed at the display device connected to the display device or the access device.

The user may select a device option from the displayed enhanced visual access menu of the remote devices. Each device option may represent a remote device. Further, the options, service options, and device options may be represented as graphics or/and text on the visual access menus. At step 1336, a selection of a device option may be received from the user. In an embodiment of the invention, the user may select the device option by touching the device option at display of the device. In an embodiment of the invention, the user may provide the selection of the device option through voice inputs or commands and/or gestures or hand movements such as, but are not limited to, a thumb up, a head nod, and so forth. The VMThings may detect, understand and translate the voice commands into a language which can be understood by the device. In an embodiment of the invention, the VMThings at the device may change the voice commands into text and may respond or control the remote devices accordingly.

At step 1338, a connection between the device and the remote device(s) is established by the VMThings. Thereafter, at step 1340, the user may control one or more operations of the connected remote devices irrespective of their location. For example, the user may switch on an AC located at his/her home while driving back to home.

FIG. 14 illustrates a flow diagram for controlling the remote devices through a website, in accordance with another embodiment of the invention. At step 1402, the user may open a website through a web browser at the device. The website is for accessing the remote devices or visual access menus corresponding to the remote devices. The user may open the website by entering a Uniform Resource Locator (URL) of the website in the web browser. The web site may allow the user to access visual access menus of the remote devices (or services as explained in FIG. 12). In an embodiment of the invention, the website is displayed at the display device. Each of the remote devices may have an associated unique ID. Similarly, the device may also have a unique device ID. The remote devices are registered with the device. Further, the user may have to register him/her so as to be able to access the remote devices.

At step 1404, a visual access menu including one or more options may be displayed at the device. In an embodiment of the invention the VMThings may display the visual access menu at the device. In another embodiment of the invention the VMThings may display the visual access menu display device connected to the access device. The one or more options can be such as a remote devices option, a services option, and so forth. The user may select an option from these options. At step 1406, an input including a selection of the option may be received at the device from the user.

At step 1408, an enhanced visual access menu for the remote devices may be displayed at a screen of the device or as the web page when the user selects the remote devices option from the visual access menu. As shown in FIG. 3C, the display of the device may switch based on the selection of the option. In an embodiment of the invention the enhanced visual access menu for the remote devices including the one or more device options may be retrieved from the server. The user may select a device option from the displayed enhanced visual access menu of the remote devices. Each device option may represent a remote device which can be controlled. Further, the options, service options, and device options may be represented as graphics or/and text on the visual access menus.

At step 1410, a selection of a device option may be received from the user at the device. In an embodiment of the invention, the VMThings may detect the selection received from the user. In an embodiment of the invention, the user may select the device option by touching the device option at display screen of the device. In an embodiment of the invention, the user may provide the selection of the device option through voice inputs or commands and/or gestures or hand movements such as, but are not limited to, a thumb up, a head nod, and so forth. Further, the voice inputs or commands may be in different languages such as English, Spanish, and so forth. The VMThings may detect, understand and translate the voice commands into a language which can be understood by the device. At step 1412, a connection between the device and the remote device(s) is established by the VMThings. Thereafter, at step 1414, the user may control one or more operations of the connected remote devices irrespective of their location. For example, the user may switch on an AC located at his/her home while driving back to home. In an embodiment of the invention, the VMThings at the device may change the voice commands into text and may respond or control the remote devices accordingly.

FIG. 15 illustrates a flowchart for controlling remote devices when the visual access menus are accessed through an access device, in accordance with an embodiment of the invention. As discussed with reference to FIGS. 1C and 2C, the remote devices may be controlled by using an access device. The access device may be any communication device capable of connecting to a network or a local network. In an embodiment of the invention, the access device may have limited display capabilities or no display capabilities. Examples of the access device include, but are not limited to, a set top box, a home gateway, a hub, a router, a bridge, a mobile phone, a smart phone, a printer, a scanner, a computer, a PDA, a pager, a watch, a tablet computer, a music player, an IPod, a telephone, and so forth. The access device may include an Internet of Things application such as a VMThings application for displaying visual access menus for controlling the remote devices or services at the display device. The access device may be connected to a display device such as an LCD screen, a projector screen, a television, and so forth. The display device may be a device including a display (or a large display screen). The access device may further include an application VMThings configured to display visual access menus and information to the user. In an embodiment of the invention the access device may act as the device itself. In another embodiment of the invention, the device may also be connected to the display device.

At step 1502, a database including visual access menus may be accessed through a graphical user interface (GUI) at the access device. In an embodiment of the invention, the GUI may be accessed via the access device by the user. At step 1504, a visual access menu may be displayed at the display device. In an embodiment of the invention, the VMThings may display the visual access menus at the display device. The visual access menu may include one or more options such as, but are not limited to, a remote devices option, a services option, and so forth. The user may select an option from these options. The VMThings may receive an input from the user. The input may be a selection of option by the user. In an embodiment of the invention, the display device may include a touch sensitive screen. In an embodiment of the invention, the user may select an option by touching the screen of the display device. In another embodiment of the invention, the user may select an option by making a gesture or hand movement or through a voice command. The gestures, hand movements or the voice commands may be detected by the display device. In an embodiment of the invention, the VMThings of the access device may detect the gestures or hand movements or the voice commands. Further, the VMThings of the access device may understand and accept voice inputs from the user in different languages irrespective of the device language. Therefore, the user may control the remote devices by giving voice commands in different languages such as, but are not limited to, English, Spanish, French, Hindi, Chinese language, Japanese language, Hawaiian, German language, and so forth.

At step 1506, an enhanced visual access menu for remote devices based on a selection of an option by a user may be displayed at the display device when the user selects the remote devices option from the visual access menu. The enhanced visual access menu for devices may include one or more device options. In an embodiment of the invention, the VMThings of the access device may display visual access menu or enhanced visual access menu in different languages. Further, the access device or the remote devices may have one language and the user may want to control and communicate in a different language, the user may do this via VMThings application. The user may select a service option from these service options. At step 1508, a selection of a device option may be received from the user. The user may provide the selection by touching the screen of the display device or by making some gestures or through hand movements in front of the display device or the access device. The gestures may be such as, but are not limited to, a thumbs up, a head nod, a smile, a laughter, a thumbs down, showing two fingers, and so forth. In an embodiment of the invention, the user may select a service option through a voice command or instruction.

At step 1510, the user may be connected to a remote device based on the selection of a device option. In an embodiment of the invention, the VMThings may also check whether the remote device corresponding to the device selected by the user is registered to be monitored by the user or not. Thereafter, at step 1512, the user may control one or more operations of the remote device based on the selection of the device option. For example, the user may view real time pictures of the remote device, the user may switch on the remote device, and so forth.

FIG. 16 illustrates a flowchart for controlling services when the visual access menus are accessed through an access device, in accordance with an embodiment of the invention. As discussed with reference to FIGS. 1C and 2C, the services may be accessed and/or controlled by using an access device. At step 1602, a database including visual access menus may be accessed through a graphical user interface (GUI) at the access device. In an embodiment of the invention, the GUI may be accessed via the access device by the user.

At step 1604, a visual access menu may be displayed at the display device. In an embodiment of the invention, the VMThings of the access device may display the visual access menus at the display device. The visual access menu may include one or more options such as, but are not limited to, a remote devices option, a services option, and so forth. The user may select an option from these options. The VMThings may receive an input from the user. The input may be a selection of option by the user. In an embodiment of the invention, the display device may include a touch sensitive screen. In an embodiment of the invention, the user may select an option by touching the screen of the display device. In another embodiment of the invention, the user may select an option by making a gesture or hand movement or through a voice command. The gestures, hand movements or the voice commands may be detected by the display device. In an embodiment of the invention, the VMThings of the access device may detect the gestures or hand movements or the voice commands. Further, the VMThings of the access device may understand and accept voice inputs from the user in different languages irrespective of the device language. Therefore, the user may control the remote devices by giving voice commands in different languages such as, but are not limited to, English, Spanish, French, Hindi, Chinese language, Japanese language, Hawaiian, German language, and so forth.

At step 1606, an enhanced visual access menu for services based on a selection of an option by a user may be displayed at the display device when the user selects the services option from the visual access menu. The enhanced visual access menu for services may include one or more service options. In an embodiment of the invention, the VMThings of the access device may display visual access menu or enhanced visual access menu in different languages. Further, the access device or the remote devices may have one language and the user may want to control and communicate in a different language. The user may select a service option from these service options. At step 1608, a selection of a service option may be received from the user. In an embodiment of the invention, the user may select a service option through a voice command or instruction.

At step 1610, the user may be connected to a service based on the selection of a service option. The VMThings may also check whether the information for the selected service option is available at the device. If the information is not available, then the information may be requested and/or received from a server. Thereafter, at step 1612, information about the service may be displayed at the display device based on the selection of the service option. The user may interact with the information accordingly. In an embodiment of the invention, the information may include text, graphics, audio, video, or hyperlinks.

FIGS. 17A, 17B and 17C illustrate a flow diagram for controlling various objects in a network through an access device, in accordance with an embodiment of the invention. At step 1702, a GUI for accessing the visual access menus may be displayed at the display device. The VMThings may display the visual access menus at the display device. The visual access menu may include one or more options such as, but are not limited to, a remote devices option, a services option, and so forth. The user may select from these options. At step 1704, an input from the user may be received. The input may be a selection of option by the user. In an embodiment of the invention, the display device may include a touch sensitive screen. In an embodiment of the invention, the user may select an option by touching the screen of the display device. In another embodiment of the invention, the user may select an option by making a gesture or hand movement or through a voice command. At step 1706, it is checked whether, the input is for accessing the services. If the input is for accessing services then process control goes to step 1714 else step 1708 is executed. At step 1708, it is checked whether, the input received at step 1704 is for accessing remote device(s). If the input is for accessing remote devices then step 1712 is executed, else the process waits for input from user at the access device.

At step 1714, it is checked whether, a visual access menu of the services is available at the access device. If the visual access menu for accessing services is available then process control goes to step 1718, else step 1716 is executed. At step 1716, the visual access menu for accessing the services is received from a server in the network. Examples of the services may include, but are not limited to, banking services, entertainment service, tours and travel services, and so forth.

At step 1718, the visual access menu including one or more service options for accessing the services may be displayed at the screen of the display device. The user may select a service option from these service options. At step 1720, a selection of a service option may be received from the user. The user may provide the selection by touching the screen of the display device or by making some gestures in front of the display device or the access device. In an embodiment of the invention, the user may select a service option through a voice command or instruction.

At step 1722, it is checked whether the information for the selected service option is available at the device. If the information is not available, then the information may be requested and/or received from the server at step 1724, else step 1726 is executed. At step 1726, the information of the selected services may be displayed at the display device. Thereafter, the user may interact with the visual access menu for accessing services accordingly.

If at step 1708, the input is for accessing the remote devices, then step 1712 is executed. At step 1712, it is checked whether, a visual access menu of the remote devices is available at the access device. If the visual access menu for the remote device is available then step 1730 is executed, else the visual access menu of the remote devices is retrieved from the server at step 1728. At step 1730, the visual access menu including one or more device options is displayed at the display device. The device options may be graphics icons and/or text representing remote devices. The user may be enabled to select a device option(s) from the visual access menu of the remote devices, at step 1732. At step 1734, a connection between the device and a remote device is established based on the received selection. Thereafter, at step 1736, the user may control the remote device(s) irrespective of a location of the remote devices. For example, the user sitting in his/her office may regulate the temperature of the microwave located at home without being physically present at home.

FIG. 18A illustrates an exemplary display of images, in accordance with an embodiment of the invention. As discussed before, the device 102 may receive images of the remote devices 106*a-n* (or services 202*a-n*) in real-time. In an embodiment of the invention, the access device 116 may receive the images of the remote devices 106*a-n* in real-time. In an embodiment of the invention, the images may be received at pre-defined time interval. In another embodiment of the invention, the VMThings 108 may retrieve the images in real-time or based on user's instructions. The images of more than one remote device may be displayed at the device as shown in FIG. 18A. The image display 1802 includes images of multiple remote devices 106*a-n*. Therefore, the user may not have to connect to different remote devices individually to see their images. In an embodiment of the invention, the device 102 may receive video or audio of the remote devices 106*a-n*. Therefore, the remote devices 106*a-n* are registered with the device 102 (or the access device 116). The images may be received and stored at the device 102 which can be accessed by the user as per his/her convenience. Further, the remote devices 106*a-n* may be grouped into various categories such as, but are not limited to, electronics appliances, home devices, buildings, doors, room appliances, switches, and so forth. Further, the VMThings 108 may display the images of multiple objects such as remote devices 106*a-n*, services 202*a-n* at a single interface or display. Further, the remote devices 106*a-n* may be grouped based on the information about the remote devices 106*a-n* in a yellow pages directory.

Further, the remote devices 106*a-n* may be grouped according to location, such as home devices, office devices, garages devices, and so forth. In an embodiment of the invention, the remote devices may be grouped based on other criteria such as, but are not limited to, functions of the remote device, utility of the remote device, type of the remote device, and so forth. The VMThings 108 of the device 102 may store visual access menus and enhanced visual access menus corresponding to the remote devices based on the various categories of the remote devices 106*a-n*. In an embodiment of the invention, the user may require to register at the remote devices 106*a-n* so as to be able to control the remote devices 106*a-n* from the VMThings 108. In an embodiment of the invention, the user may be required to authenticate or prove his/her identity at device 102 or for the remote devices 106*a-n* before controlling one or more operations of the remote devices 106*a-n*. The VMThings 108 may also display the images of the multiple devices based on these groupings of the remote devices 106*a-n*. In an embodiment of the invention, the image display 1802 may include images of the remote devices located in kitchen of the home. In an embodiment of the invention, the VMThings 108 may display one or more advertisements related to the content of the display 1802. Further, the advertisements may be displayed based on user preferences such as user interest, etc.

FIG. 18B illustrates transfer of an exemplary display of images from a device to another device, in an embodiment of the invention. In an embodiment of the invention, the VMThings 108 may connect a device 102*a* to one or more devices such as a device 102*b* and transfer the displayed content such as display 1802 from the device 102*a* to the device 102*b*. As shown in FIG. 18B, the device 102*b* can be a smart phone, a mobile phone, a picture frame, an LCD display, an LED display, a GPS screen, a PDA, a TV, a tablet computer, a projector screen, a computer, a laptop, and so forth. The VMThings 108 of the device 102a may transfer display 1802 to the display of the device 102b. Therefore, the display 1802 including one or more images of the remote devices 106a-n or objects may be displayed at the device 102b. Further, the VMThings 108 may transfer any display such as a visual access menu displayed at the device 102a or device 102 to the device 102b. In an embodiment of the invention, the device 102b may also include an Internet of Things application such as VMThings. In an embodiment of the invention, the display 1802 is transferred to the device 102b based on at least one input from the user. Examples of the at least one input may include, but are not limited to, a touch, a voice command, a gesture, a hand movement, a selection of one or more keys at the device 102, and so forth. For example, in case of a touch sensitive screen at the device 102a, a user may transfer the displayed content at the display of the device 102b by touching the screen of the device 102a. In an embodiment of the invention, the user may provide the selection through dual tone multi frequency (DTMF) tones. In an embodiment of the invention, the display 1802 may be transferred based on the user input to a projection screen or a wall.

FIG. 19 illustrates an exemplary display of a cockpit 1902 at the device 102, in accordance with an embodiment of the invention. The cockpit 1902 is an interface which enables a user to access various services, devices or objects. The cockpit 1902 may include a plurality of icons 1904a-n representing various objects which a user or users can access or control. The tabs 1904a-n may be icons or text or combination of these. The cockpit 1902 may include a tab 1904a which is an icon representing Interactive Voice Response System (IVR). The user may select the IVR tab 1904a to access various application and interfaces for interacting with IVR systems of various destinations. The destinations may be organizations or companies or individual services implementing IVR systems. In an embodiment of the invention, the user of the device 102 may connect to any of these destinations by dialing a telephone number of a destination. A tab 1904b is an icon corresponding to interface for controlling remote devices 106a-n. The user may select the Remote devices tab 1904b for viewing an enhanced visual access menu for controlling remote devices 106a-n. The remote device may be home equipments, cars, doors, electronic appliances, windows, and so forth. A tab 1904c is an icon corresponding to interface for controlling services 202a-n. The user may select the Services tab 1904c for viewing visual access menu for accessing or controlling services 202a-n.

Further, the cockpit 1902 include tabs 1904d-n representing other objects such as, but are not limited to, an Outlook 1904d, a Calendar 1904e, Personal E-mails 1904f, Messengers 1904g, Games 1904h, and so forth. The user may use the Outlook tab 1904d to check his/her professional or outlook mails. The user may select calendar tab 1904e to view calendar, and to plan his/her day. The user may use the calendar tab to do many other routine tasks such as, setting timings for meetings and appointment etc. In an embodiment of the invention, the user may be connected to an online calendar when he/she selects the calendar tab 1904e. In another embodiment of the invention, the user may be displayed with an offline calendar. The user may also set reminders about meetings, occasions such as anniversary, birthdays etc. using the calendar tab 1904e.

FIG. 20A-B illustrates exemplary environments for providing access of the cockpit 1902 of a user to other users, in accordance with an embodiment of the invention. As shown in FIG. 19, a user may be displayed with the cockpit 1902 for accessing various objects. Further, in an embodiment of the invention, the user may create or configure the cockpit 1902 by using various predefined controls or settings. The cockpit 1902 may include the plurality of tabs 1904a-n for enabling the user to access the various objects such as remote devices 106a-n, services 202a-n, and so forth. In an embodiment of the invention, the user may set up the cockpit 1902 according to his/her preferences such as language preferences, theme preferences, and so forth. The user may customize the cockpit 1902 according to his/her convenience or preferences.

In an embodiment of the invention, a first user of a first device 2002 may set up a cockpit such as the cockpit 1902 for accessing various objects at the first device 2002. The first device 2002 may include an IVR application VMThings 2004. The user may create the cockpit 1902 by using the VMThings 2004. Further, the first user may provide the access of the cockpit 1902 to one or more second users. The one or more second users are associated with one or more second devices such as a second device 2006. The second device 2006 may include an IVR application VMThings 2008. The VMThings 2008 may display the cockpit 1902 of the first user at the second device 2006. In an embodiment of the invention, the first device 2002 and the second device 2006 can be a portable device capable of communicating and connecting to other devices such as the remote devices 106a-n. Examples of the first device 2002 and the second device 2006 may include, but are not limited to, a mobile phone, a smart phone, a computer, a personal digital assistant (PDA), a tablet computer, a laptop, and so forth.

Further, the first device 2002 and the second device 2006 are connected to each other through a network 104. The network 104 can be a wired network or a wireless network or a combination of these. The wireless network may use wireless technologies to provide connectivity among various devices. Examples of the wireless technologies include, but are not limited to, Wi-Fi, WiMAX, fixed wireless data, ZigBee, Radio Frequency 4 for Consumer Electronics network (RF4CE), Home RF, IEEE 802.11, 4G or Long Term Evolution (LTE), Bluetooth, Infrared, spread-spectrum, Near Field Communication (NFC), Global Systems for Mobile communication (GSM), Digital-Advanced Mobile Phone Service (D-AMPS). The device 102 may connect to the plurality of remote devices 106a-n through the network 104. Examples of the wired network include, but are not limited to, Local Area Network (LAN), Metropolitan Area Network (MAN), Wide Area Network (WAN), and so forth. In an embodiment of the invention, the network 104 is the Internet.

Further, the cockpit 1902 may include visual access menu for controlling the plurality of remote devices 106a-n or services 202a-n. As shown in FIG. 20A, the first user may connect and control the plurality of remote devices 106a-n through the network 104. Examples of the remote devices include, but are not limited to, household devices including electric lights, water pump, generator, fans, television (TV), cameras, microwave, doors, windows, computer, or garage locks, security systems, air-conditioners (AC), lights, and so forth. In an embodiment of the invention, the plurality of the remote devices 106a-n can be vehicles such as cars, trucks, vans, and so forth. Once set up, the first user may access the cockpit 1902 at the first device 2002. In an embodiment of the invention, the user may access the cockpit 1902 through a website or web browser. The user(s) may have to authenticate before accessing the cockpit. In an embodiment of the invention, the cockpit 1902 may be stored at a proxy server

2010. Further, the proxy server 2010 may also store cockpits of other users. In an embodiment of the invention, the proxy server 2010 may maintain a record of the interaction of the users with the cockpits. Further, the proxy server 2010 may include a list of users and information about access control over various cockpits. In an embodiment of the invention, the access control permissions of the cockpit 1902 may be provided to the one or more second users by the proxy server 2010. In an embodiment of the invention, the proxy server 2010 may send a message to the first user to ask for a permission regarding some changes in his/her cockpit 1902 by the one or more second users. Thereafter, the cockpit 1902 may be changed or updated based on the permission from the first user. Further, the proxy server 2010 may monitor the cockpit 1902 of the first user and see if there are unauthorized requests to control the cockpit 1902 or the remote devices 106a-n. In case there are unauthorized request, the proxy server 2010 may report to the owner of the cockpit 1902 such as the first user. In an embodiment of the invention, the proxy server 2010 may report about unauthorized access to a security designated entity. Thereafter, either the security designated entity or the first user may take an action to handle the unauthorized access. For example, the first user may block the users from which unauthorized access requests are received.

In an embodiment of the invention, the user may create or configure an Internet of Things menu including representations of one or more identifiable objects. The identifiable objects may be virtual or physical objects. The user may share the Internet of Things menu with other user such as friends or relatives.

In an embodiment of the invention, different users may request access to cockpit 1902 of other users. In an embodiment of the invention, the one or more second users may request to get control over first user's cockpit 1902. For example, a wife may request her husband to get access on his cockpit. The one or more second users may get access of the cockpit 1902 of the first user based on the permission granted by the first user. In an exemplary scenario, the reverse control may allow the service provider to get more information and control of the cockpit of the users. The service provider can be a telecom service provider, a grocery provider, a movie rental service provider, an internet provider, and so forth.

FIG. 21 illustrates a flow diagram for providing access control of the cockpit to one or more second users, in accordance with an embodiment of the invention. As illustrated in FIG. 20A-B, the first user may configure or customize the cockpit 1902 at the first device 2002. The first user may communicate with the one or more second users over the network 104 such as the Internet. The first device 2002 may connect to the second device 2006 through the network 104.

At step 2102, the first user may access a graphical user interface (GUI) for configuring the cockpit 1902 at the first device 2002. At step 2104, the user may configure the cockpit 1902 based on his/her one or more preferences. Examples of the preferences may include, but are not limited to, language selection, font size, and selection of remote devices, favorite services, pictures, icons, themes, and so forth. For example, the user may select a color and theme for his/her cockpit 1902.

At step 2106, the first user may share the cockpit 1902 with the one or more second users. For example, the first user such as John may share the cockpit 1902 of managing and controlling his home devices with his wife Marie or son Paul so that they may also control the home devices. Further, the user may provide limited or full control of the cockpit 1902 to the second users. Further, the control to the cockpit 1902 including different tabs representing objects such as remote devices may be provided to different second users. In an embodiment of the invention, the access to the cockpit 1902 may be provided on an event basis. For example, the first user may provide access to the second user for two days, or till Christmas. In an embodiment of the invention, the first user may provide an access to the cockpit 1902 based on time for example, such as for 4 hours, 3 hours, and so forth.

In an embodiment of the invention, the first user may receive one or more alert messages about the remote devices, services or other objects of the cockpit 1902. In an embodiment of the invention, the VMThings 2004 may send these alert messages or control of the cockpit 1902 to the first user when he/she is available. In another embodiment of the invention, the VMThings 2004 may send the alert messages or control of the cockpit 1902 to the other second users when the first user is not available. Further, the user may set up a list of second users to whom the control of the cockpit 1902 may be passed in absence of the first user.

Further, the VMThings 2008 at the second device 2006 may translate language of the cockpit 1902 based on language preference of the second user, at step 2108. In an embodiment of the invention, the VMThings 2008 may translate the cockpit 1902 of the first user based on the configuration of the second device 2006. For example, the VMThings 2008 may translate the cockpit 1902 into Russian language if the second user understands Russian. Then at step 2110, the cockpit 1902 or a menu of the cockpit 1902 may be displayed at the second device 2006. In an embodiment of the invention, the cockpit 1902 may be downloaded at the second device 2006. Thereafter, the second user may interact with the cockpit 1902. Further, the VMThings 2008 may change the display of the second device 2006 to a menu of the shared cockpit 1902. Further, the displayed visual access menu or the cockpit 1902 will be according to the second user's preference(s).

FIGS. 22A and 22B illustrate a flow diagram for providing access control of the cockpit to one or more second users, in accordance with another embodiment of the invention. As illustrated in FIG. 20A-B, the first user may configure or customize the cockpit 1902 at the first device 2002. The first user may communicate with the one or more second users over the network 104 such as the Internet. The first device 2002 may connect to the second device 2006 through the network 104.

At step 2202, the first user may access a graphical user interface (GUI) for configuring the cockpit 1902 at the first device 2002. The first device 2002 may be a mobile phone, a smart phone, a computer, a personal digital assistant (PDA), a tablet computer, a laptop, and so forth. At step 2204, the user may configure the cockpit 1902 based on his/her one or more preferences. Examples of the one or more preferences may include, but are not limited to, language preference, font size, and preferred remote devices, favorite services, pictures, icons, themes, and so forth. For example, the user may select a font size for his/her cockpit 1902.

At step 2206, the first user may share the cockpit 1902 with the one or more second users. For example, the first user such as John may share the cockpit 1902 for managing and controlling his home devices with his wife Marie or son Paul so that they may also control the home devices. In an embodiment of the invention, the second users may also provide control of the cockpit 1902 to one or more third users after getting control of the cockpit 1902. The one or more second users are the users associated with one or more second devices such as the second device 2006. Further, the user may provide partial or full control of the cockpit 1902 to the second users. Further, the control to the cockpit 1902 including different objects or remote devices may be provided to the second users. Further, the access control of the objects may differ for different users. For example, first user may provide complete control i.e. viewing, controlling and modifying permission to his/her cockpit 1902 to a User A, and may give partial/limited control such as just viewing and controlling permission to a User B.

In an embodiment of the invention, the access to the cockpit 1902 may be provided on an event basis. For example, the first user may provide access to the second user for two days, or till Christmas. In an embodiment of the invention, the first user may provide an access to the cockpit 1902 based on time. For example, such as for 4 hours, 3 hours, till 5:30 PM, and so forth.

In an embodiment of the invention, the first user may receive one or more alert messages about the remote devices, services or other objects of the cockpit 1902. In an embodiment of the invention, the VMThings 2004 may send these alert messages or control of the cockpit 1902 to the first user when he/she is available. In another embodiment of the invention, the VMThings 2004 may send the alert messages or control of the cockpit 1902 to the other second users when the first user is not available. Further, the user may set up a list of second users to whom the control of the cockpit 1902 may be passed in absence of the first user.

Further, at step 2208, the VMThings 2008 at the second device 2006 may translate the cockpit 1902 based on language preference of the second user. For example, the VMThings 2008 may translate the cockpit 1902 into Russian language if the second user understands Russian or wants to view the cockpit 1902 in Russian. In an embodiment of the invention, the VMThings 2008 may translate language of the cockpit 1902 of the first user based on the configuration of the second device 2006. For example, the VMThings 2008 may translate the cockpit 1902 which is in English language into a Russian language cockpit if the second user understands or wants to view the cockpit in Russian language. Then at step 2210, the cockpit 1902 or a menu of the cockpit 1902 may be displayed at the second device 2006. Further, the VMThings 2008 may change the display of the second device 2006 to a visual menu of the shared cockpit 1902. Further, the displayed menu will be according to the second user's preference.

Thereafter, at step 2212 the one or more second users may interact with the cockpit 1902 at their respective one or more second devices. The second user(s) may view and control the one or more objects in the cockpit 1902 from the second device 2006 itself. For example, the second user may use his/her smart phone to switch off the microwave associated with a home of the first user. Further, the first user may receive notifications regarding events at the first device 2002. The events may be such as, but not limited to, switch on, switch off, theft, and so forth. In an embodiment of the invention, the first user may receive notifications about changes done by the one or more second user to his/her cockpit 1902. Further, messages asking to approve these changes by the second users may be received by the first user at the first device 2002.

Further, the proxy server 2010 may maintain a record of interactions with the cockpit 1902 by different users. Further, the proxy server 2010 may have some level of control related to the sharing of the cockpit 1902 with other users. In an embodiment of the invention, the first user may provide some instructions to the proxy server 2010 regarding sharing of the cockpit. The proxy server 2010 may know to whom to send the request and when to send the request if it does not work for any reason. Further, the proxy server 2010 may maintain records related to managing ownership of the control of the cockpit 1902. The proxy server 2010 may also decide to whom to give control and how much control of the cockpit 1902 of the first user. In an embodiment of the invention, the proxy server 2010 may decide about giving control to other users based on predefined settings received from the first user (or the users). Further, the proxy server 2010 may save the access pattern of the first user or the one or more second users. Further, the proxy server 2010 may also store profile information such as name, age, and profession etc. of the users. Furthermore, the proxy server 2010 may provide control to the second users based on one or more parameters such as, but are not limited to, time, event, availability of a user at the device and so forth. Further, the proxy server 2010 may maintain a record of all the changes done to the cockpit 1902 by the one or more second users. In an embodiment of the invention, the first user may roll back all the changes done by the other second users based on the record of the changes maintained at the proxy server 2010.

In an embodiment of the invention, different users may request access to cockpit of other users. In an exemplary scenario, the one or more second users may request to get control over first user's cockpit 1902. For example, a daughter may request her mom to get access on her cockpit 1902. Therefore, the one or more second users may get access of the cockpit 1902 of the first user based on the permission granted by the first user. The request for sharing the cockpit may be received by the users in form of SMS, MMS, instant message, e-mails, and so forth at their respective devices. The first user may provide complete access or limited access to the one or more users. In an exemplary scenario, the reverse control may allow the service provider to get more information and control of the cockpit 1902 of users. Further, the proxy server 2010 may monitor the cockpit 1902 of the first user and see if there are unauthorized requests to control the cockpit 1902. In case there are unauthorized request, the proxy server 2010 may report to the owner of the cockpit 1902 such as the first user. In an embodiment of the invention, the proxy server 2010 may report about unauthorized access to a security designated entity. In an embodiment of the invention, the proxy server 2010 may itself handle the unauthorized access requests.

At step 2214, the interactions with the cockpit 1902 of the first user may be stored at the proxy server 2010. The proxy server 2010 may store the interactions in form of list, records, text, audio, video and so forth. At 2216, the proxy server 2010 may send a message to the first user to ask for a permission regarding some changes in his/her cockpit 1902 by the one or more second users. Thereafter, at 2218, the cockpit 1902 may be changed or modified or updated based on the permission received from the first user.

In another embodiment of the invention, a server may provide functionality of the VMThings. Further, the server may maintain all the information which is otherwise was provided by the VMThings. The server may maintain the information regarding the one or more visual access menus, users, devices, remote devices, services, display device, access device, and so forth. A user at the device such as a telephone may request information from the server. Further, the server may send the information to the requesting device over a network. The network may be a wired or a wireless network. The connection between the device and the server may be a wired or a wireless connection. Further, the server may send the information to the requesting device(s) by using technologies such as, but are not limited to, SMS, MMS, e-mail, and so forth. Based on the received information, the content may be displayed at the device. For example, if the user has requested the information regarding controlling remote devices, then information of visual access menu related to remote devices may be received from the server. Further, the server may display the visual access menu at the device. In an embodiment of the invention, the server may also provide other functions or features of the VMThings 108 as explained in the FIGS. 1A-2G. The user may respond or select an option from the displayed visual access menus through DTMF tones. The device may be a telephone or a simple mobile phone.

In an embodiment of the invention, the user may access the functionalities as described above by logging into a second device such as a home controller. The user may see and control devices associated with the home controller.

Further, the VMThings may store the user activity such as selection of options from the visual access menus at the device. This user activity information may be used by the VMThings for displaying the visual access menu to the same user next time.

An aspect of the invention allows the user to share his/her cockpit of controlling one or more objects with other users.

Another aspect of the invention allows the users to request permission to access or control the one or more objects of the cockpit from the other users.

Another aspect of the invention provides a cockpit including multiple interfaces for controlling multiple objects by a user.

Yet another aspect of the invention is to enable a user to control one or more operations of the remote devices or services through voice commands or gestures or hand movements. For example, the user may switch on an air conditioner (AC) by showing a thumb up gesture in front of the device. The device may include a camera to detect the gesture. The VMThings at the device (or access device) may analyze the gesture and control a remote device based on the analysis.

An advantage of the invention relates to visual access menus that may ask for voice commands. This GUI is for some user harder to use due to accent or other problems. The database could be provided with the option as been described before for the system to output voice command according to user selection of the options or the device options or the service options. The device may include a microphone for detecting the voice commands. VMThings may analyze the voice commands and may take the actions accordingly. Further, the disclosed system and methods allow the user to give voice commands in different languages. For example, the user may select an option by giving a voice command in French language. Furthermore, the user may select an option (or device options or service options) from the visual access menu through one or more gestures or hand movements. In an embodiment of the invention, the user may store one or more gestures for one or more actions. For example, the user may use a thumb up gesture to switch on the AC. Similarly the user may store a thumb down gesture to switch off an electronic appliance such as microwave.

Another advantage of the invention relates to providing visual access menus and enhanced visual access menus in different language(s). In an embodiment of the invention, the VMThings of device or the access device may display visual access menu or enhanced visual access menu in different languages. Further, the device may have one language and the user may want to control and communicate in a different language. Similarly, the VMThings may understand and accept voice inputs from the user in different languages irrespective of the device language. Therefore, the user may control the remote devices by giving voice commands in different languages such as, but are not limited to, English, Spanish, French, Hindi, Chinese language, Japanese language, Hawaiian, German language, and so forth. In an embodiment of the invention, the device may not support or understand a particular language such as Spanish, but still the VMThings can display the visual access menus in Spanish language.

Another aspect of the invention is to provide information about various services to the user using a device such as a smart phone anytime anywhere.

Further aspect of the invention is to enable a user to control operations of the remote devices through a device including VMThings application. The user may not have to be physically present near the remote devices to control them.

Yet another aspect of the invention is to allow users to see the images of remote devices in real-time irrespective of the location of the remote devices. For example, the user may see the remote devices such as home appliances present at his/her home by being present at the office.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A user device to enhance interaction of a user with a plurality of remote Internet connected devices, the user device comprising:
   a processor;
   a connection to the Internet; and
   a memory coupled to said processor, said memory comprising instructions that, when executed by the processor;
      connect to a database comprising a mapping of a plurality of vendor specific menus, which correspond to the plurality of remote Internet connected devices, to one or more standardized menus, wherein said plurality of remote Internet connected devices comprise at least two different menus produced by at least two independent vendors;
      replace, within at least one user interface of at least one of the plurality of remote Internet connected devices, each of the plurality of vendor specific menus present on the at least one user interface with at least one of the one or more standardized menus based on the database mapping; and
      upon receiving a selection of a standardized menu from a user, utilize the database to determine the plurality of vendor specific menus mapped to the selected standardized menu and send a corresponding selection to the plurality of vendor specific menus that are mapped to the selected standardized menu, wherein said one or more standardized menus each comprise at least one icon, and
   wherein said at least one standardized menu's icon is different from the information in said database with respect to at least one icon of said plurality of vendor specific menus.

2. The user device of claim 1, wherein said plurality of remote Internet connected devices can at least be a plurality of electronic devices, a plurality of kitchen appliances, a plurality of vehicles, a plurality of doors, a plurality of door knobs, a plurality of windows, a plurality of locks, a plurality of switches, a plurality of security systems, a plurality of electrical machines or a combination thereof.

3. The user device of claim 1, wherein said user device is a server.

4. The user device of claim 1, wherein said user device is a mobile device.

5. The user device of claim 1, wherein said memory further comprising an instruction, executable by said processor, to record said user's selection in said memory along with time of said selection.

6. The user device of claim 1, wherein said database comprises a category attribute for each of said plurality of Internet connected devices and a standard menu for said category.

7. The user device of claim 1, wherein said memory further comprising instructions, executable by said processor, for voice recognition to enable said user to make selection from said standard menu through a voice command.

8. The user device of claim 1, wherein said memory further comprising instructions executable by said processor for:
   enabling said user to share at least one of said vendor specific menu or said standard menu, with one or more other users, wherein at least one of said vendor specific menu or said standard menu is shared based on time or occurrence of an event for enabling said other users to manage said plurality of Internet connected devices.

9. The user device of claim 1, wherein said memory further comprising instructions, executable by said processor, to group said plurality of Internet connected devices based on at least one of location, functionality or type of each of said plurality of Internet connected devices.

10. The user device of claim 1, wherein said memory further comprising instructions, executable by said processor, to enable said user to utilize said vendor specific menus to control said plurality of Internet connected devices located at different locations.

11. The user device of claim 1, wherein said memory further comprising instructions executable by said processor to translate language of said standard menu into a different language based on preferences of said user.

12. A non transitory tangible computer readable medium comprising instructions for the execution by the processor according to claim 1.

* * * * *